(12) United States Patent
Patel

(10) Patent No.: US 9,086,489 B2
(45) Date of Patent: Jul. 21, 2015

(54) PERSONAL AND AREA SELF-INDICATING INSTANT RADIATION ALERT DOSIMETER

(75) Inventor: Gordhabhai N. Patel, Middlesex, NJ (US)

(73) Assignee: JP Laboratories, Inc, Middlesex, NJ (US)

( * ) Notice: Subject to any disclaimer, the term of this patent is extended or adjusted under 35 U.S.C. 154(b) by 623 days.

(21) Appl. No.: 13/371,619

(22) Filed: Feb. 13, 2012

(65) Prior Publication Data

US 2012/0181453 A1 Jul. 19, 2012

Related U.S. Application Data

(60) Division of application No. 11/930,529, filed on Oct. 31, 2007, now Pat. No. 8,115,182, which is a continuation-in-part of application No. 10/545,796, filed as application No. PCT/US2004/005860 on Feb. 26, 2004, now Pat. No. 7,476,874.

(60) Provisional application No. 60/450,267, filed on Feb. 27, 2003.

(51) Int. Cl.
*G01T 1/04* (2006.01)
*G01T 1/06* (2006.01)

(52) U.S. Cl.
CPC .... *G01T 1/04* (2013.01); *G01T 1/06* (2013.01)

(58) Field of Classification Search
USPC ............... 250/474.1, 482.1, 484.4, 484.5
See application file for complete search history.

(56) References Cited

U.S. PATENT DOCUMENTS

| | | |
|---|---|---|
| 2,680,816 A | 6/1954 | Stern |
| 2,824,234 A | 2/1958 | Schulte et al. |
| 3,053,983 A | 9/1962 | Faulkner et al. |
| 3,290,499 A | 12/1966 | Lester et al. |
| 3,787,687 A | 1/1974 | Trumble |
| 3,894,238 A | 7/1975 | Cox et al. |
| 3,999,946 A | 12/1976 | Patel et al. |

(Continued)

FOREIGN PATENT DOCUMENTS

| | | |
|---|---|---|
| EP | 0 117 390 | 5/1984 |
| EP | 0 325 863 | 11/1990 |

OTHER PUBLICATIONS

Gordon K. Reil and Charles Woodruff, Low Cost Self Indicating Dosimeter (LCSID), International Conference on Low-Level Radiaton Injury and Medical Countermeasures, Nov. 8-10, 1999 Bethesda MD.

(Continued)

*Primary Examiner* — Mark R Gaworecki
(74) *Attorney, Agent, or Firm* — Barbara V Maurer

(57) ABSTRACT

Described is a self-indicating instant radiation dosimeter (1001) for monitoring high energy radiations, such as X-ray. The dosimeter contains a radiation sensitive, color changing, indicating composition (10), e.g., a diacetylene (R—C≡C—C≡C—R', where R and R' are substituents groups) or a radiochromic dye, a polymeric binder (20) and optionally a shelf life extender (50) or an activator (40). The radiation sensitive composition (10) changes color instantly when exposed to high energy radiation. The dose is estimated by comparing the color with a color reference chart or more accurately with a spectrophotometer or an optical densitometer. The radiation sensitive composition (10) is protected from low energy radiation such as UV light, by a layer of low energy absorbing materials, such as UV absorbers.

5 Claims, 16 Drawing Sheets

(56) References Cited

U.S. PATENT DOCUMENTS

| | | |
|---|---|---|
| 4,179,614 A | 12/1979 | Felice et al. |
| 4,377,751 A | 3/1983 | Kronenberg et al. |
| 4,389,217 A | 6/1983 | Baughman et al. |
| 4,507,226 A | 3/1985 | Noakes et al. |
| 4,698,296 A | 10/1987 | Lewis |
| 4,705,741 A | 11/1987 | Lewis |
| 4,705,742 A | 11/1987 | Lewis |
| 4,734,355 A | 3/1988 | Lewis et al. |
| 4,784,934 A | 11/1988 | Lewis et al. |
| 4,864,144 A | 9/1989 | McLaughlin et al. |
| 4,918,317 A | 4/1990 | Hess et al. |
| 4,952,244 A | 8/1990 | Lewis et al. |
| 4,954,428 A | 9/1990 | Lewis et al. |
| 4,970,137 A | 11/1990 | Lewis et al. |
| 5,002,852 A | 3/1991 | Lewis et al. |
| 5,028,792 A | 7/1991 | Mullis |
| 5,051,597 A | 9/1991 | Lewis et al. |
| 5,084,623 A | 1/1992 | Lewis et al. |
| 5,099,132 A | 3/1992 | Ueno et al. |
| 5,137,964 A | 8/1992 | Lewis et al. |
| 5,139,927 A | 8/1992 | Liu et al. |
| 5,139,928 A | 8/1992 | Lewis et al. |
| 5,147,787 A | 9/1992 | Lewis et al. |
| 5,149,617 A | 9/1992 | Liu |
| 5,153,106 A | 10/1992 | Liu |
| 5,179,281 A | 1/1993 | Tawil et al. |
| 5,206,118 A | 4/1993 | Sidney et al. |
| 5,215,869 A | 6/1993 | Liu |
| 5,215,870 A | 6/1993 | Liu et al. |
| 5,232,820 A | 8/1993 | Lewis et al. |
| 5,359,200 A | 10/1994 | Donahue et al. |
| 5,451,792 A | 9/1995 | Maguire et al. |
| 5,612,541 A | 3/1997 | Hoffmann et al. |
| 5,637,876 A | 6/1997 | Donahue et al. |
| 5,731,112 A | 3/1998 | Lewis |
| 5,767,520 A | 6/1998 | Donahue et al. |
| 5,777,341 A | 7/1998 | Seiwatz et al. |
| 5,891,682 A | 4/1999 | Yoshida et al. |
| 6,177,578 B1 | 1/2001 | Lewis et al. |
| 6,198,108 B1 | 3/2001 | Schweitzer et al. |
| 6,268,602 B1 | 7/2001 | Seiwatz et al. |
| 6,284,198 B1 | 9/2001 | Kirollos et al. |
| 6,285,031 B1 | 9/2001 | Listl et al. |
| 2003/0193032 A1 | 10/2003 | Marshall |

OTHER PUBLICATIONS

Gordon Riel, Low Cost Self Indicating Dosimeter (LOCSID), American Chemical Society, 1st Technology Transfer Fair, Aug. 21-22, 2000, Washington DC.

G.K. Riel and R.D. Rogalski, 36th Annual Midyear Meeting "Radiation Safety Aspects of Homeland Security and Emergency REsponse". Jan. 26, 2003-Jan. 29, 2003.

Quality Assurance RadTag(r) 15/50 Gy Indicators, RadTag Technologies, Sep. 18, 2002.

Test Protocol for Evaluation of Indicators, Jun. 28, 2001.

Azam Niroomand-Rad et al. AAPM Report No. 63, RAdiochromic Film Dosimetry, Reprinted from Medical Physics, vol. 25, Issue 11, Nov. 1988, American Association of Physicists in Medicine, Dec. 1998.

PERSONAL AND AREA SELF-INDICATING INSTANT RADIATION ALERT DOSIMETER

CROSS-REFERENCE TO RELATED APPLICATIONS

This invention is a divisional applicant of U.S. patent application Ser. No. 11/930,529 filed Oct. 31, 2007, now U.S. Pat. No. 8,115,182, issued Jan. 14, 2012, which is, in turn, a continuation-in-part application of pending U.S. patent application Ser. No. 10/545,796 filed Aug. 16, 2005 which claims priority to PCT/US04/05860 filed Feb. 26, 2004 which claims priority to U.S. Provisional Patent Application No. 60/450,267 filed Feb. 27, 2003 all of which are incorporated herein by reference.

STATEMENT OF FEDERAL FUNDING

This invention was made in part with government support under contract # N00024-95-C-4052, N00167-03-M-0037 and W91CRB-04-C-0001 awarded by the US Department of Defense and Technical Support Working Group (TSWG) with funding also provided by the Department of Homeland Security, Department of State and Department of Justice through TSWG.

BACKGROUND OF THE INVENTION

1. Field of the Invention

This invention relates to radiation sensitive devices, such as a film, sticker or badge for monitoring a dose of high-energy radiations, such as ultraviolet (UV) radiation, electrons, X-rays, protons, alpha particles and neutrons utilizing radiation sensitive materials, such as diacetylenes.

2. Brief Description of Prior Art

High energy radiations, including those having energy higher than 4 eV, such as UV light, X-rays, gamma rays, electrons, protons, alpha particles, neutrons, and laser radiation are used for a variety of applications, such as sterilization of medical supplies and perishables, curing of coatings and cross-linking of polymers, recording of images and information, radiography, nondestructive testing and diagnostic and radiation therapy. Their exposure needs to be monitored. Electronic equipment for monitoring radiation is expensive. There is a need for a simple dosimeter which can be used for monitoring a very low dose to a very high dose, such as 0.1 rad to 10 megarads (Mrads) of radiation having energy of 4 eV to 100 MeV.

In the case of a terrorist attack with a radiological dispersion device often referred to as "dirty bomb", an accident at a nuclear power plant or nuclear powered ship/submarine, or a nuclear explosion, the first responders and people affected by them want to know, "Did I receive a lethal exposure to ionizing radiation or will I be OK?" Medical personnel treating the victims need to quickly assess the radiation dose each individual has received to ensure that treatment is provided first to those who need it the most. We have developed a credit card-sized radiation dosimeter that answers those questions quickly and cheaply. The badge can be worn for months to years. When exposed to radiation from a "dirty bomb", or nuclear detonation, the sensing material changes color providing the wearer or medical personnel instantaneous information on cumulative radiation exposure of the victim. It can take days to get that information by other methods.

The following is the list of some exposure limits and symptoms for various dosages of high energy radiation (mRem=millirem and mSv=milli Sievert):

| | |
|---|---|
| Public dose limits due to licensed activities | 100 mRem/year |
| Lumbar/spinal x-rays | 130 mRem/exposure |
| Pelvis/Hip x-ray | 170 mRem/exposure |
| Upper GI series | 245 mRem/exposure |
| Cumulative Natural Background | 300 mRem/year |
| Lower GI series | 405 mRem/exposure |
| Occupational Exposure Limits for Minors | 500 mRem/year |
| Occupational Exposure Limits for Fetus | 500 mRem |
| Occupational Limits- DDE | 5,000 mRem/year |
| Occupational Limits - SDE (skin) | 50,000 mRem/year |
| Occupational Limits- SDE (extremities) | 50,000 mRem/year |
| Occupational Limits - LDE (lens of eye) | 15,000 mRem/year |
| Diagnostic thyroid exam | 90,000 mRad/exposure |
| Therapeutic thyroid exam | 1,000,000 mRad/exposure |
| Dose to cause acute radiation sickness | ~1000 mSv |
| Dose leading to a 50% chance of death from acute symptoms | >4500 mSv |

It is well established that high dose ionizing radiation can cause cancer. The effect and symptoms of a high dose are well known.

| | |
|---|---|
| 0 to 25 rads | No easily detectable clinical effect in humans. However, at about 15 rads there could be temporary sterility (Testis). |
| 25 to 100 rads | Slight short-term reduction in blood cells. Disabling sickness not common. |
| 100 to 200 rads | Nausea and fatigue. Vomiting if dose is greater than 125 rads. Longer-term reduction in number of some types of blood cells. |
| 200 to 300 rads | Nausea and vomiting on the first day of exposure. Up to a two-week latent period followed by appetite loss, general malaise, sore throat, pallor, diarrhea, and moderate emaciation. Recovery in about three months unless complicated by infection or injury. |
| 300 to 600 rads | Nausea, vomiting, and diarrhea in first few hours. Up to a one-week latent period followed by loss of appetite, fever, and general malaise in the second week. Followed by bleeding, inflammation of mouth and throat, diarrhea, and emaciation. Some deaths in two to six weeks. Eventual death for 50% if exposure is above 450 rems. Others recover in about six months. |
| Over 600 rem | Nausea, vomiting, and diarrhea in the first few hours. Followed by rapid emaciation and death in $2^{nd}$ week. Eventual death of nearly 100%. High dose could lead to death. |

There is no doubt that radiation can cause cancer. The question is what level of radiation it takes to cause cancer. The risk for radiation exposure has been very widely studied. The general consensus of opinion for the induction of cancer by ionizing radiation is 10% increase in cancer rate/Sv when the dose is given over a short time with a decrease to 5% when the dose is protracted over an extended time period. One Sv is equal to 1000 mSv and one mSv is equal to 100 mRem. Therefore a 10% increase in cancer is related to a dose of 100,000 mRem with 5% if the dose is protracted over a longer period of time. If one receives a harmful level of dose of ionizing radiation (e.g., 1-1,000 rads), one needs to know immediately so that proper medical care can be given. Dosimeters for dose higher than a few thousand rads have been reported (Standards on Dosimetry for Radiation Processing, ASTM International, 100 Barr Harbor Drive, West Conshohochen, Pa., 2002). However, they are not in form of a badge. There is a need for a radiation dosimeter in the form of a badge, bandage, tape, sticker, label, etc, which changes color instantly and wherein dose can be estimated from the intensity of the color using a color reference chart.

For monitoring high energy radiation, mainly two types of dosimeter badges are primarily used. One type contains a piece of silver halide film commonly known as a film dosimeter. The other contains a thermoluminescence material commonly known as a TLD dosimeter.

The main advantage of silver halide film is that very high final quantum yield and exposure can be stored permanently. However, silver halide film has many disadvantages and drawbacks: (a) making an emulsion of silver halide is a multi-step and expensive process, (b) the film requires protection from ambient light until fixed, (b) the developing and fixing processes are "wet" chemical based, and the concentrations of individual solutions and chemicals, time and temperature of developing and fixing must be strictly controlled. The badge needs to be sent to a processing lab for estimation of radiation dose exposure.

When a strong energy source (such as ionizing radiation) hits a thermoluminescence (TL) material, electrons are freed from some atoms and moved to other parts of the material, leaving behind "holes" of positive charge. Subsequently, when the TL material is heated, the electrons and the "holes" re-combine, and release the extra energy in the form of light. The light intensity can be measured, and related to the amount of energy initially absorbed through exposure to the energy source.

Neither the TLD nor the film dosimeters are instant. They need either developing or heating and expensive equipment to read the dose. The TLD type dosimeter can be read only one time. Once a TLD dosimeter is read, the dose information is lost for ever.

Hence, it is desirable to have a highly sensitive, self-developing, dry fixing film and dosimeter, which is not affected by ambient conditions, and which leaves a record of the result to confirm the dose. We have developed, such as film and dosimeter using radiochromic materials.

Any material, such as a diacetylene, a radiochromic dye, a mixture of leuco and/or pH sensitive dyes with an acid producing compound and the like, or mixture thereof, which undergoes at least one noticeable or monitorable change, such as change in color, fluorescence, opacity and magnetic resonance, is referred herein to as "radiation sensitive compound", "radiation sensitive material" "radiochromic material" or "radiation sensitive formulation".

One class of materials that can be used in the system comprises conjugated alkynes and are referred to as diacetylenes, $R-C\equiv C-C\equiv C-R$, where R is a substituent group. Diacetylenes polymerize in the solid state either upon thermal annealing or exposure to high-energy radiation [Adv. Polym. Sci., vol. 63, 1 (1984)]. The term diacetylene(s) is used herein to designate a class of compounds having at least one $-C\equiv C-C\equiv C-$ functionality group. The solid monomers are colorless or white. The partially polymerized diacetylenes are blue or red. Polydiacetylenes appear metallic typically having a copper or gold color. Polydiacetylenes are highly colored because the "π" electrons of the conjugated backbone are delocalized. The color intensity of the partially polymerized diacetylenes is proportional to the percent polymer conversion. Diacetylenes which develop blue color are referred to as blue diacetylenes and those develop red color are referred to as red diacetylenes herein.

Diacetylenes are known to crystallize into more than one crystallographic modification or phase. A phase which polymerizes rapidly is referred to as an active phase or active form. A phase which does not polymerize is referred to as an inactive phase or inactive form. Some phases show little or no polymerization upon thermal annealing. Such phases are referred to as thermally inactive phases. A phase which polymerizes rapidly upon irradiation is referred to as a radiation active phase. By selecting a proper solvent system, some diacetylenes, such as diacetylene-344 [$R-C\equiv C-C\equiv C-R$ where $R=OCONH(CH_2)_3CH_3$] can be crystallized into a phase which would have extremely low thermal reactivity to provide long shelf-life and high radiation reactivity to monitor low dose, such as a few rads, by developing a noticeable color.

A number of patents have been issued on the synthesis and use of conjugated polyacetylenic compositions as radiation dosimeters, temperature monitors, and time temperature indicators.

The use of diacetylenes in photographic and other related arts is disclosed in several U.S. patents, such as, U.S. Pat. Nos. 3,501,297 and 3,679,738 (issued to Cremeans), U.S. Pat. No. 3,501,302 (issued to Foltz), U.S. Pat. No. 3,501,303 (issued to Foltz et al), U.S. Pat. No. 3,501,308 (issued to Adelman) and U.S. Pat. Nos. 3,743,505; 3,844,791 & 4,066,676 (all three issued to Bloom). These patents disclose dispersions in resin, gelatin, or gum matrices of certain diacetylene crystals for directly imaging photo-reactive compositions. Light exposed areas are evidenced by a color change.

Diacetylenes are not sensitive to visible, long wavelength, radiation. Luckey and Boer in U.S. Pat. No. 3,772,027 disclose a diacetylenic photosensitive element containing inorganic salts such as titanium dioxide, zinc oxide, cadmium iodide, and cadmium sulfide as sensitizers to make the element sensitive to visible radiation. Another similar patent (U.S. Pat. No. 3,772,028), issued to Fico and Manthey, discloses a photosensitive element sensitized to visible radiation by the addition of pyrylium salts including thiapyrylium and selenapyrylium salts. Amplification of poorly imaged crystalline diacetylenic compositions are obtained in U.S. Pat. No. 3,794,491, issued to Borsenberger et al. Faint images are enhanced through post-exposure irradiation. These patents describe formulations and processes for making diacetylenes sensitive to longer wavelength, lower energy, radiation, such as visible radiation so that the film can be used as a photographic film for visible light. U.S. Pat. No. 5,420,000 reports on the sensitization of diacetylenes to shorter wavelength, higher energy, radiation, such as UV, X-rays, electrons and alpha particles. Such sensitization to higher energy radiation is desirable for making, for example, diagnostic X-ray film.

Lewis, Moskowitz, and Purdy in U.S. Pat. No. 4,734,355 disclose a processless recording film made from crystalline polyacetylenic compounds. They also disclosed a process of dispersing crystalline polyacetylenic compounds in a non-solvating medium to a concentration of about 2% to 50% polyacetylene crystalline solids and aging the dispersion before drying on a substrate. The sensitivity of the obtained film is low and hence exposure of at least ten Gy of radiation is required to produce the image.

Guevara and Borsenberger describe, in U.S. Pat. No. 3,772,011, printout elements and methods using photoconductors and crystalline polyacetylenic compounds in contact with a photoconductive layer. Visible images are obtained when these layers are contacted with the application of an electric potential. In the absence of an applied potential, the elements described are stable under normal room-light handling conditions. Guevera et al., in U.S. Pat. No. 3,772,011, provides a diacetylenic composition, which undergoes direct imagewise photo-polymerization to a highly colored polymeric product when elaborated into a layer of micro-crystals contiguous to a photoconductive layer. Such polymerization takes place upon exposure during the application of an electric potential across the layers. In some cases, an organic photoconductor may be included in the layer of crystalline polyacetylenes.

Patel in U.S. Pat. Nos. 4,235,108; 4,189,399; 4,238,352; 4,384,980 has disclosed a process of increasing the rate of polymerization by cocrystallization of diacetylenes. Patel and others in U.S. Pat. Nos. 4,228,126 and 4,276,190 have described an inactive form of diacetylene for storing, and a method of rendering them active prior to use by solvent, vapor and/or melt recrystallization.

Mong-Jon Jun at el., U.S. Pat. No. 3,836,368 describe 2,4-hexadiyn-1,6-bis(n-hexyl urethane), referred to here in as "166", which turns red upon short wavelength UV irradiation. They prepared a coating formulation by adding water to a solution of 166 in polyvinylpyrrolidone in methanol. U.S. Pat. No. 5,420,000 described a highly sensitive coating of 166. Although 166 is sensitive to UV radiation, the reactivity is not sufficient to use it for applications, such as diagnostic X-ray film.

In order to monitor a low dose one needs a relatively thick, e.g., more than about 25 microns, coating. The later mentioned patents don't describe a method or formulation for obtaining a thick coating, film, plaque and/or block and the processes of making them, which can be used for radiation monitoring and imaging, e.g., (1) personal dosimeter, (2) radiographic film and (3) imaging of radiation sources.

Silver halide film is not very sensitive to diagnostic X-ray radiation. X-ray images are amplified by placing the film between two fluorescence screens known as intensifying screens. Intensifying screens are luminescent materials and usually consist of a crystalline host material to which is added a trace of an impurity. Luminescence in inorganic solids usually originates at defects in the crystal lattice (Thomas F. Soules and Mary V. Hoffman, Encyclopedia of Science and Technology, Vol. 14, 1987, pp 527-545). The phosphor of the fluorescence screen absorbs X-rays and emits white light. Intensifying screens made with calcium tungstate phosphors have been in use since the time of Roentgen. Around 1972, a new phosphor, gadolinium oxysulfide was developed which emits in the green region and film sensitized to absorb green light was also developed. About the same time other phosphors, such as barium fluorochloride and lanthanum oxybromide, which emit in the blue region, were developed. A large number of phosphors have been reported in the literature including terbium activated rare earth oxysulfide ($X_2O_2S$ where X is gadolinium, lanthanum, or yttrium) phosphors (T. F. Soules and M. V. Hoffman, Encyclopedia of Chemical Technology, Vol. 14, pp 527-545, 1981 and references quoted therein). Gadolinium and tungsten have very high atomic numbers and also have a high-energy absorption coefficient. The following combinations have been used for this purpose: GdOS:Tb(III), LaOS:Tb(III), LaOBr:Tb(III), LaOBr:Tm (III), and $Ba(FCl)_2$:Eu(II). A number of patents e.g. U.S. Pat. Nos. 5,069,982; 5,173,611; 4,387,141; and 4,205,234 are representative and have been issued. Among the hundreds of phosphors reported, the literature search reveals that most of them are blue-, green-, or long wave-UV emitting phosphors upon excitation by X-ray. Some of them emit long wavelength blue light, for example, U.S. Pat. No. 4,719,033. No one has so far reported an X-ray screen with a short-wave UV emitting (e.g., wavelength shorter than 275 nm) phosphor.

Converters, or phosphors, are usually used as a screen in the form of a fine powder dispersed in a polymeric binder. The screens are placed in contact with the emulsion of silver halide film during X-ray irradiation. The prior art does not describe a converter/phosphor, which is in the form of a transparent coating being a solid solution or complex of a converter with a polymeric binder. The use of these converters in the under coat, radiation sensitive coat and topcoat of the device is also not described. The phosphors emitting short wavelength UV light can be used as a screen to amplify the radiation image.

U.S. Pat. No. 5,206,118, to Sidney et al, describes a color changing film made of a halogen containing polymer in which is dispersed an acid sensitive leuco dyes. When exposed to high energy radiation, it develops color. U.S. Pat. No. 5,451,792 discloses a device with color reference chart and radiation sensitive coating containing a leuco dye and halogen compound.

A card type dosimeter with a piece of radiochromic film is described in U.S. Pat. No. 6,232,610. A radiation indicator for monitoring radiation is described in U.S. Pat. No. 5,359,200. TLD type dosimeters for monitoring radiation are described in U.S. Pat. Nos. 5,177,363, 5,508,523, 6,127,685, 4,506,157, 4,975,589, 5,179,281, 4,346,511 and 5,083,031.

SUMMARY OF THE INVENTION

We have developed a radiation dosimeter which develops color instantly. The color intensifies with dose. It is unaffected by normal ambient conditions, such as ambient light, for months and sunlight for some days. The dosimeter has acceptable resistance to normal humidity for months and to steam, or high temperature. It has minimal effect of temperature of irradiation. It develops the same color over a very wide temperature of irradiation, e.g., from minus 40° C. to plus 70° C. It has sufficient shelf life of months to several years depending upon the radiation sensitive formulation.

A piece of material, e.g., a plastic film coated with radiochromic material is often referred to as an element or radiation sensing strip. A dosimeter or a badge is defined a device which contains the element or sensing strip. The dosimeter may have a color reference chart for estimation of the dose.

These and other advantages, as will be realized, are provided in a radiation monitoring device. The device comprises a substrate and integral thereto an imaging layer. The imaging layer comprises a radiochromic material having capability of developing detectable color change when exposed to ionizing radiation having energy higher than 5 eV. The device further comprises a binder and a protective layer. A reference chart is provided comprising at least one color corresponding to the detectable color change at a predetermined level of ionizing radiation.

Another embodiment is provided in a radiation monitoring device comprising a radiation sensitive material comprising a radiochromic material having a capability of developing detectable color change when exposed to ionizing radiation and a shelf life extender.

A particularly preferred embodiment is provided in a radiation monitoring device comprising a substrate and a radiation sensitive material coated on the substrate. The radiation sensitive material comprises a radiochromic material having capability of developing detectable color change when exposed to ionizing radiation. The device further comprises a shelf life extender and a protective layer.

Provided is a radiation monitoring device comprising: a substrate; at least one imaging layer comprising a radiochromic material having capability of developing detectable color change when exposed to ionizing radiation having energy higher than 5 eV; a binder; a protective layer; and at least one reference chart comprising at least one color corresponding to said detectable color change at a predetermined level of ionizing radiation.

Further provided are shelf life extenders, such as heat stabilizers, quenchers of reactive species, radical and oxygen scavengers, antioxidants, inhibitors of reactive species, preventor of reactive species, thermo-oxidative preventors, photo-oxidative preventors, hydroperoxide decomposer, H-donors, metal destabilizers, UV stabilizers, UV absorbers, UV reflectors and alike to extend the shelf life of radiation sensitive formulation.

Further provided are formulations and devices to indicate false positive and shelf life indicators which develop color when exposed to UV/sun light and temperature for a prolonged time.

Further provided is a self-reading device. Dose to be estimated is printed under, inside or on the sensing strip. When exposed to the predetermine dose the number becomes almost invisible.

Particularly provided are self-reading devices comprising multiple detectors to indicate radiation as well as indicators for undesirable environmental parameters such as UV radiation, heat, etc. The combination of detectors allows the device to be monitored and removed from use if environmental factors cause a signal or if the device has expired.

A particular feature of the present invention is the ability to incorporate various logos and instructions on the device to indicate dates, user, radiation response procedures, dose levels, etc. and the device can be manufactured in a variety of shapes including planar, square, rectangular, trigonal and hexagonal.

The present invention finds particular utility in methods wherein radiation has to be measured. Particularly, the present invention is applicable for use in radiation monitoring such as in radiation sterilization, radiation therapy and industrial radiography. The invention is also well suited in laser monitoring such as in label making with laser; curing, crosslinking, or polymerization of materials by laser. The invention is also suitable for use in UV monitoring. A particular advantage is the ability to utilize the invention in three-dimensional imaging.

Provided is a sensor and the device for monitoring alpha particles where the sensor has either no protective layer or a very thin, e.g., about 20 micron thick UV absorbing layer. Alpha particles have very low penetration such as a maximum of about 40 microns for 4 MeV alpha particles from polonium 210. Therefore, the sensor should be without any protective layer or preferably a very thin, such as about 10-20 microns thick protective layer. The protective layer will be strongly UV absorbing such as a layer absorbing light below about 450 nm.

DESCRIPTION OF THE INVENTION

Figure 1:
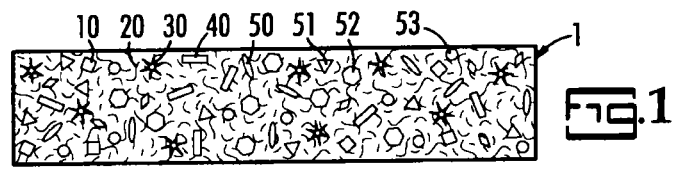
FIG. 1 is a schematic cross-section of radiation sensitive self supporting element.
Figure 2:
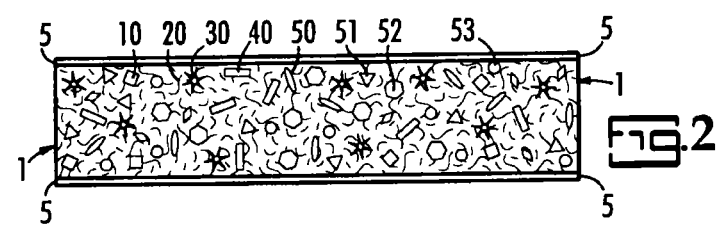
FIG. 2 is a schematic cross-section of radiation sensitive self supporting element with a protective layer on each side.

The invention can be best described by reference to the Figures. Referring to FIG. 1 the element could be a self supporting radiation monitoring device or a layered element, such as a film 1 comprised of at least one radiation sensitive composition 10, a polymeric binder 20, optionally a solvent or plasticizer 30, an activator 40, and other additives and shelf life extenders, such as UV absorbers 50, UV stabilizers 51, heat stabilizers 52 and converters 53 respectively. The radiation sensitive layer 1, could have a protective layer 5, on each side as shown in FIG. 2. The protective layer may be a plastic film, can be scratch resistance and can contain additives, such as a UV absorber and/or a UV reflective coat. The device could have more than one protective layer.

Figure 3:
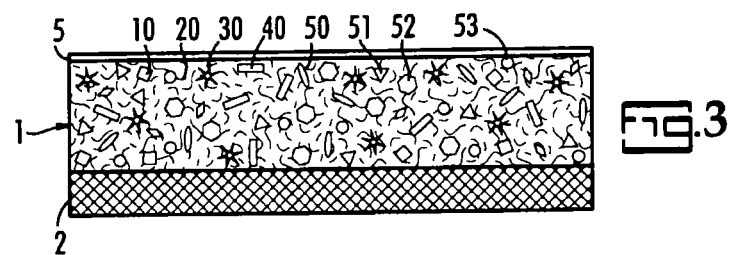
FIG. 3 is a schematic cross-section of the element where a substrate is coated on one side with the radiation sensitive layer.
Figure 4:
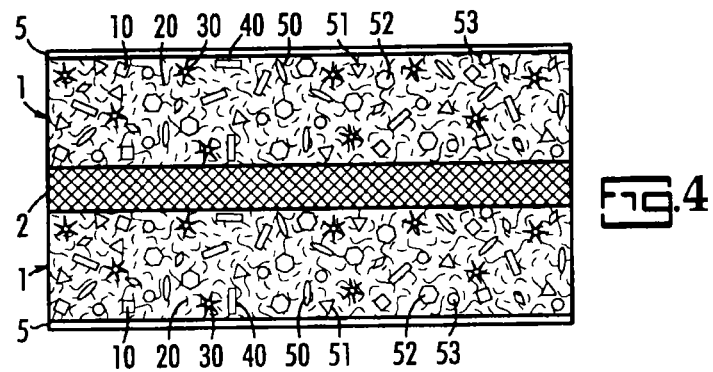
FIG. 4 is a schematic cross-section of the element where a substrate is coated on both sides with the radiation sensitive layer.

As shown in FIG. 3, a device can be made with a radiation sensitive layer 1 on a substrate 2 or, as shown in FIG. 4, with elements on both sides of the substrate 2. The radiation sensitive layer 1 could be comprised of at least one radiation sensitive composition 10, a polymeric binder 20, optionally a solvent or plasticizer 30, an activator 40, and other additives and shelf life extenders, such as UV absorber 50, UV stabilizer 51, heat stabilizer 52 and converter 53. The device could have more than one radiation sensitive layers each containing different radiation sensitive compositions. The radiation sensitive layer 1, could have a protective layer 5. As shown in FIG. 4, the element can also be made by coating the radiation sensitive film 1 on both sides of the substrate 2.

Figure 5:
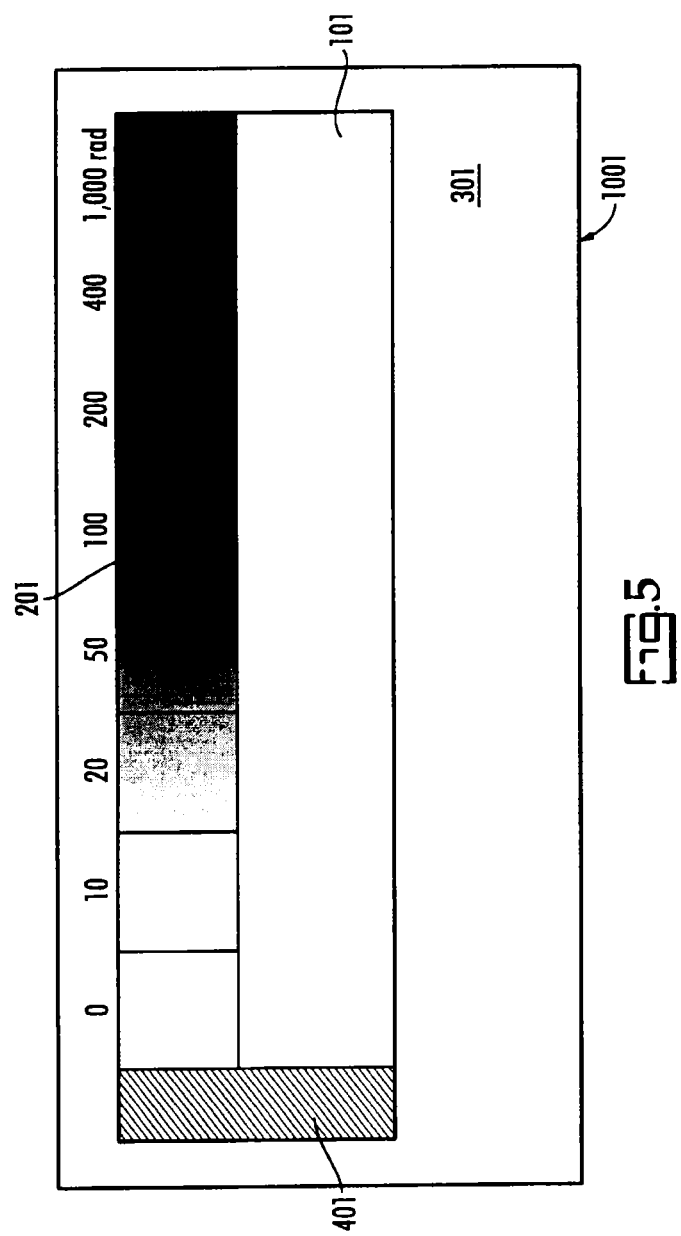
FIG. 5 is a schematic top view of a radiation dosimeter having a radiation sensitive element, a color reference chart on one side and an opaque protective layer at one end of the radiation sensitive element.

As shown in FIG. 5, the dosimeter 1001 can be composed of a radiation sensitive element 101 which may be similar to that shown in FIGS. 1-4 and a color reference chart 201 on an opaque substrate 301. The element may have a selective radiation blocker 401, e.g., aluminum foil for blocking low energy photons, such as UV light and low energy electrons, or lead and cadmium for blocking other higher energy radiations.

Figure 6:
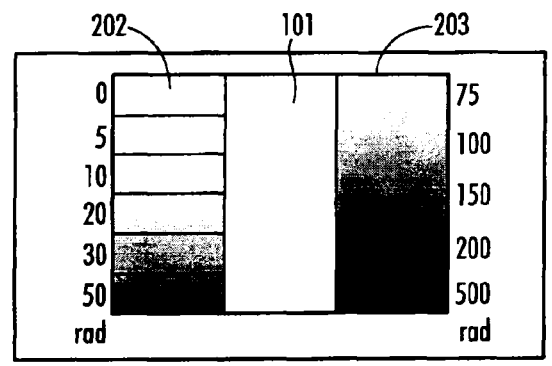
FIG. 6 is a schematic top view of a radiation dosimeter having a radiation sensitive element and a color reference chart on both the sides.

A preferred configuration of the dosimeter with color reference charts 202 and 203 printed on both the sides of a radiation sensitive element 101 is shown in FIG. 6.

Figure 7:
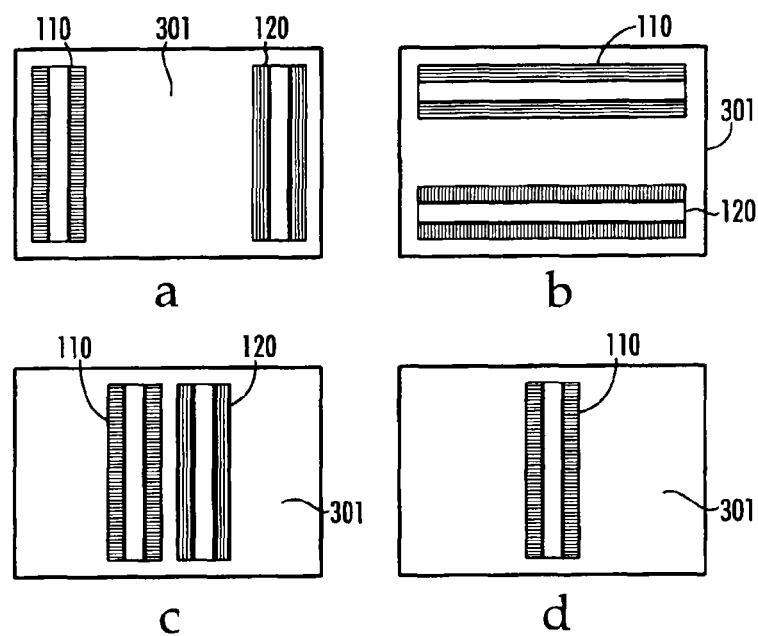
FIG. 7 is a schematic top view of a radiation dosimeter having two radiation sensitive elements providing two different colors, e.g., blue and red, with color reference chart at different location of the badge.

The dosimeter could have many configurations, shapes, sizes, variations and designs. One such configuration with different locations of the radiation sensitive element and color reference charts is shown in FIGS. 7a-7d. For example, there could be two radiation sensitive elements one developing blue color 110, at low dosages while the other developing red color 120, at high dosages which could be at any location on the substrate 301 as shown in FIGS. 7a through 7c. One radiation sensitive element could be on one side of the device while the other on the other is on a other side of the substrate 301 as shown in FIG. 7d.

Figure 8:
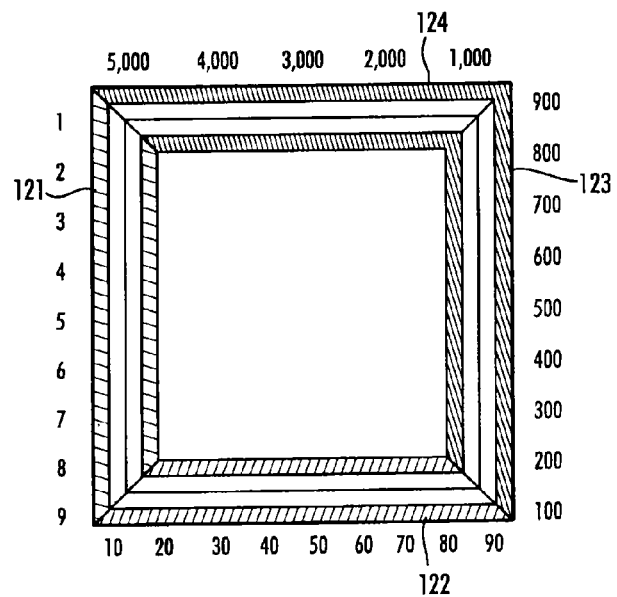
FIG. 8 is a schematic top view of a radiation dosimeter having eight radiation sensitive elements, four inside and four outside, with their color reference charts to cover a very wide dose range.

Yet another configuration to cover very wide dose range is shown in FIG. 8. The radiation dosimeter may have multiple radiation sensitive elements, 111 through 118 with corresponding color reference charts 121 through 128 respectively, wherein a wide range of dose can be determined and reported. The elements and the color reference charts could also be in circular form.

Figure 9:
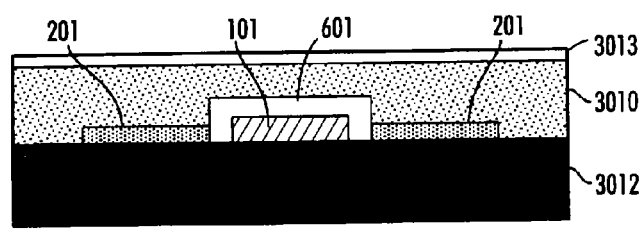
FIG. 9 is a schematic cross-section of a radiation dosimeter having a well for a radiation sensitive element.

The element has a definite thickness which may cause a bulge on the surface of the dosimeter. To prevent the bulging, a substrate layer 3010 may have a well or cavity 601 to fit the element 101 as shown schematically in FIG. 9. A support, 3012, may be employed. The color reference charts, 201, may be embedded in the substrate layer. A protective layer, 3013, such as a UV protective layer may cover the entire device.

Figure 10:
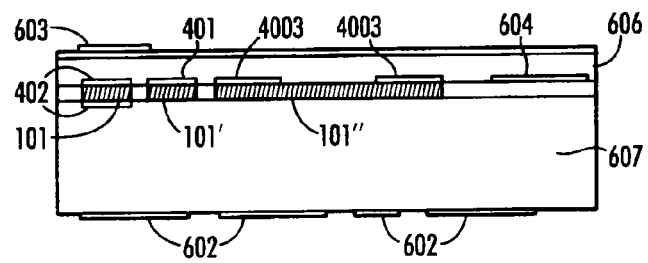
FIG. 10 is a schematic cross sectional view of a radiation dosimeter having one end covered with an opaque adhesive tape, such as aluminum tape, to protect from UV light and to indicate tampering.

FIG. 10 is a schematic cross sectional view of a radiation dosimeter having multiple radiation sensitive elements, 101. One element, or portion of a long element, may be sealed in a foil, 402, such as aluminum. Another element, or portion of a long element, 101', may have an opaque cover, 401, and still another element, or portion of a long element, may have at least one color reference chart, 4003, adjacent thereto. The opaque layers, such as aluminum tape, opaque coating, or layer, protects the element from UV light and acts as tamper evidences. The dosimeter may have other desired features, such as magnetic tape 603, to store information to be read electronically, security features 602, such as hologram and other printed information or instruction 604 for the users. A UV absorbing layer, 606, is preferred and the support, 607, can be plastic or metal.

Figure 11:
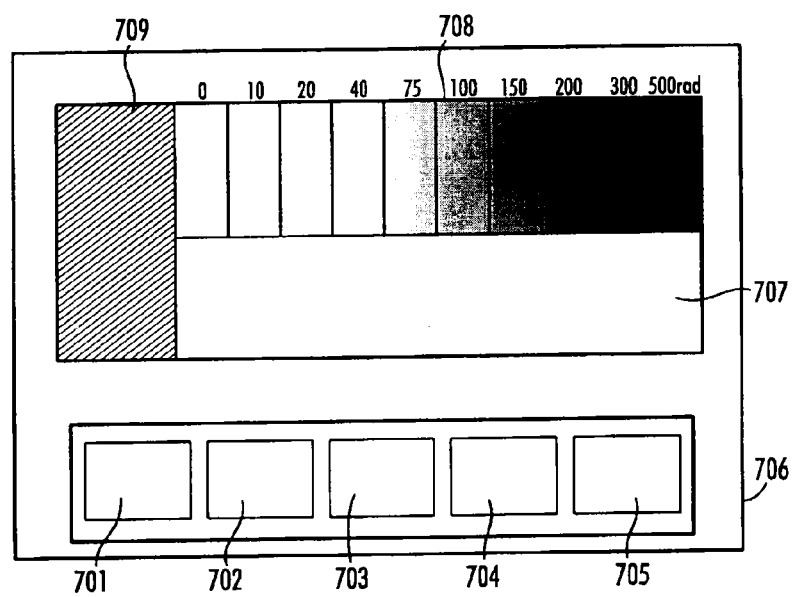
FIG. 11 is a schematic top view of a radiation dosimeter having a variety of other indicators such as time-temperature, temperature, UV and other desired features; such as a bar code, magnetic information tape, a hologram and other security and identification features.
Figure 23:
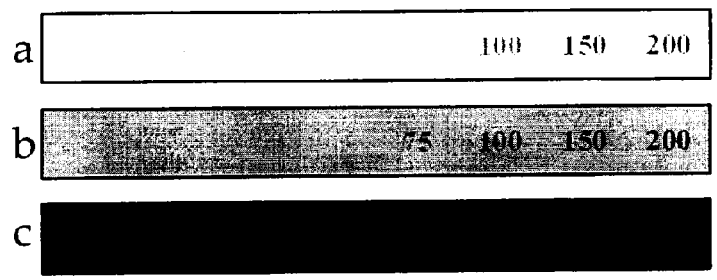
FIG. 23 is a schematic presentation of a self-reading element (a) unexposed, (b) exposed to a lower dose of X-ray and (c) exposed to a higher dose of X-ray.
Figure 24:
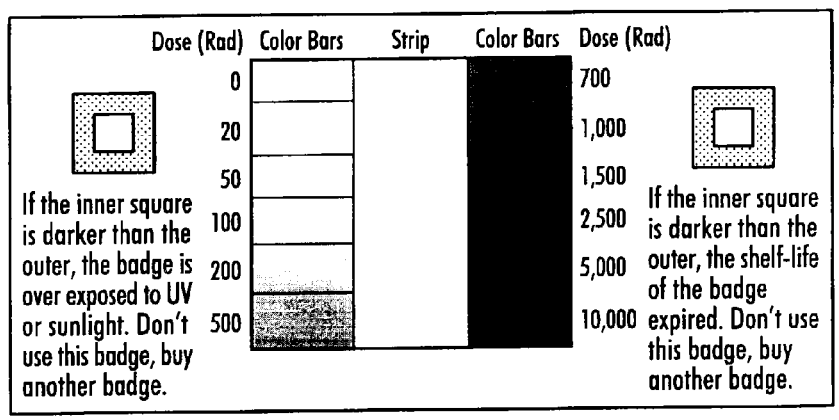
FIG. 24 is a schematic presentation of a radiation dosimeter badge having false positive and shelf life indicators on the sides of the radiation sensitive element.

The dosimeter may have multiple indicators as shown in FIG. 11. Indicators in a single device may include a time-temperature indicator 701, to indicate expiration of the shelf life, temperature indicator 702, to indicate if the dosimeter has been exposed above certain temperature, UV light indicator 703, to indicate exposure to UV/sunlight, security indicators 704, such as hologram and other similar indicators 705. A support, 706, contains the radiation sensitive device, 707, and color chart 708 either coated thereon or embedded therein. A metal foil, preferably aluminum or a filter, 709 can be used to block certain radiation. The location of these indicators could be anywhere on the dosimeter including over the radiation sensitive element as shown in FIGS. 23 and 24.

Figure 12:
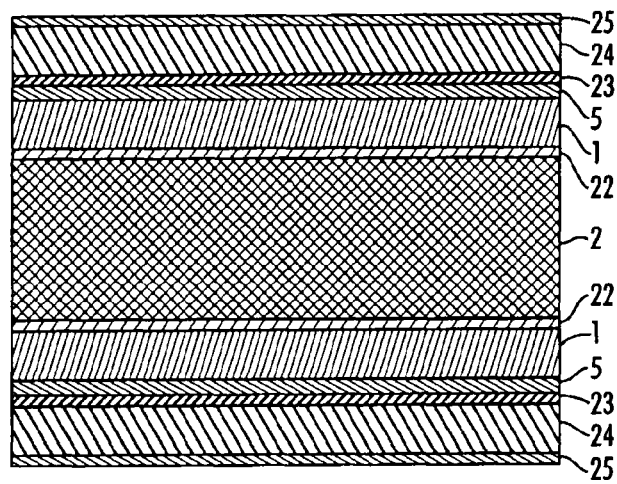
FIG. 12 is a cross sectional view of the element of diacetylene 344 made using example 3 having a layer of UV absorbing film on each side.

An element made on a larger scale is shown in FIG. 12. A polyester film substrate 2, having a sub-coat 22 to increase adhesion was coated on each side with radiation sensitive element 1 in the form of a film. A barrier layer 5 was applied on each radiation sensitive element 1. A UV absorbing polyester film 24 having a scratch resistant layer 25 and a pressure sensitive layer 23 was applied over the barrier coat 5. The preferred radiation sensitive element comprises diacetylene 344. In a preferred embodiment the barrier coat comprises a polyurethane layer to improve adhesion of the pressure sensitive layer, 23.

Figure 13:
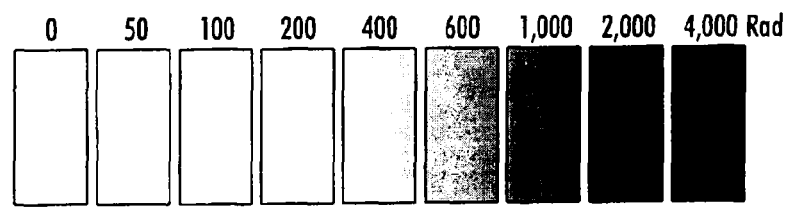
FIG. 13 is a representative illustration of pieces of elements of diacetylene 344 irradiated at different dosages of X-ray.

FIG. 13 is a representative illustration of pieces of elements of diacetylene 344 of example 3 irradiated at different dosages of X-ray. In FIG. 13, the gradient represents a color gradient with increased color density indicating an increase in exposure.

Figure 14:
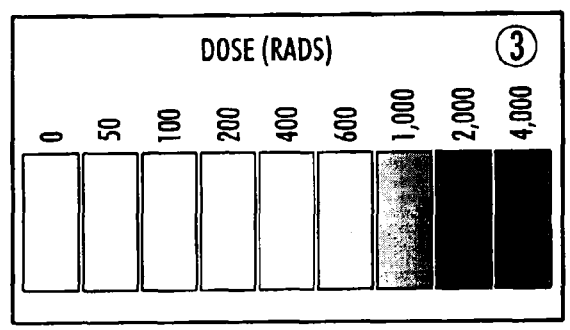
FIG. 14 illustrates a dosimeter with an element of diacetylene 344 with a color reference chart.

FIG. 14 is a representative illustration of a dosimeter with an element of diacetylene 344 of example 3, prior to exposure, with a color reference chart on one side of the element. In FIG. 14, the gradient represents a color gradient with increasing color density indicative of increase in exposure.

Figure 15:
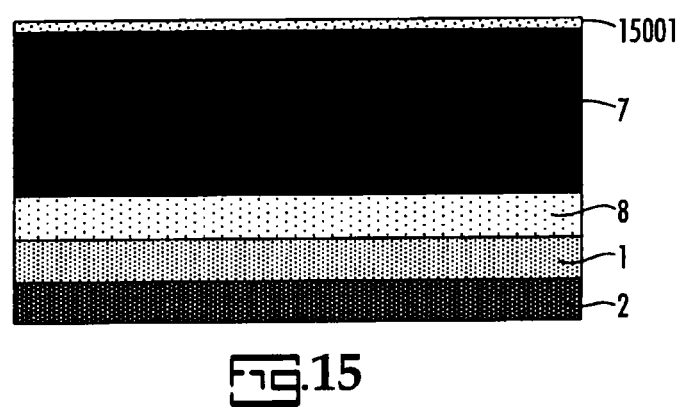
FIG. 15 is a schematic cross-section of a badge having a thin opaque substrate, an element, color reference charts, a thick transparent layer having a high concentration of UV absorbing and other additives and a protective layer.

A schematic cross-section of a badge having a thin opaque substrate 2, radiation sensitive element 1, an adhesive layer 8, a thick UV absorbing layer 7 and a UV reflective and scratch resistant layer 15001 is illustrated in FIG. 15. Thick UV absorbing and UV absorbing layer will provide prolonged life under UV/sunlight.

Figure 16:
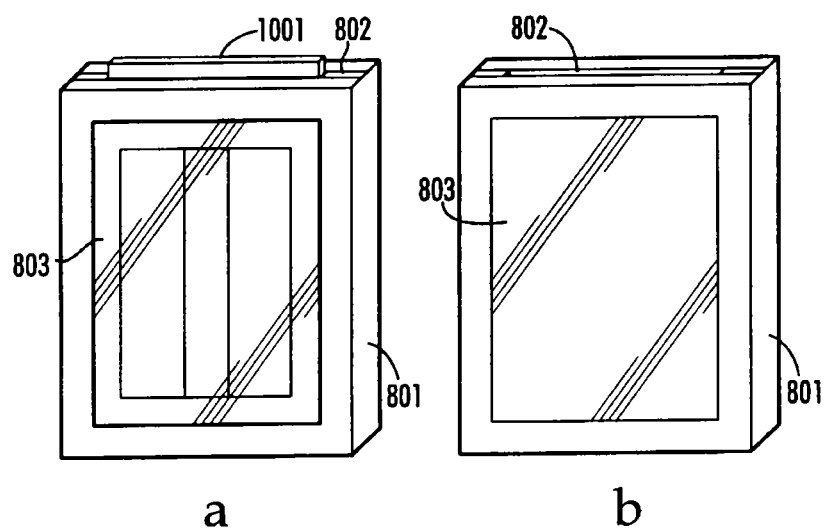
FIG. 16 is a schematic top view of a holder having a pocket for the dosimeter badge, with and without the dosimeter badge to protect from UV light.
Figure 17:
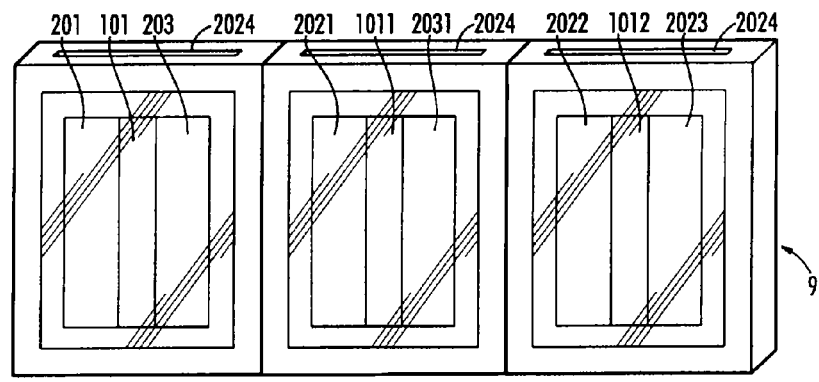
FIG. 17 is a schematic top view of a holder having three pockets for the dosimeter badge having different dose ranges.
Figure 18:
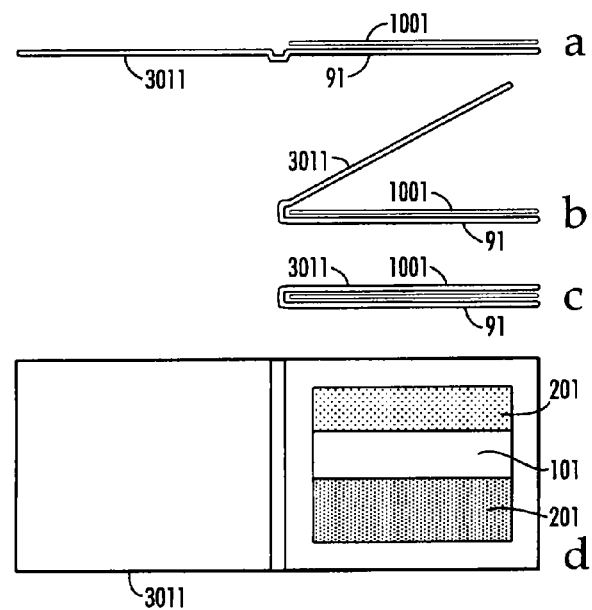
FIG. 18 is a schematic cross section (a, b and c) and top view (d) of a foldable holder for the dosimeter badge to protect from sun light.

In order to protect the dosimeter from UV/sunlight, the dosimeter can be covered with an opaque layer, placed in a one or more opaque or semi-opaque pockets. FIG. 16a illustrates a radiation sensitive dosimeter, 1001, inside a holder, 801. The holder, 801, comprises a slot, 802, which receives the radiation sensitive dosimeter. An optional transparent face, 803, allows the radiation sensitive to be viewed. FIG. 16b illustrates the holder of FIG. 16a without the radiation sensitive dosimeter. Dosimeters with different dose ranges and/or colors can be prepared wherein multiple radiation sensitive elements, 101, 1011 and 1012, and corresponding color reference charts 201, 203, 2021, 2031, 2022 and 2023 respectively can be inserted into a slot of a multi-card holder 9 as shown in FIG. 17. The dosimeter 1001 can be affixed inside a foldable holder 91 as shown in side view in FIGS. 18a through 18c and in a schematic top view in FIG. 18d. In FIG. 18, the radiation sensitive element, 101, and color reference chart, 201, is as described relative to FIG. 17. The cover, 3011, is preferably opaque.

Figure 19:
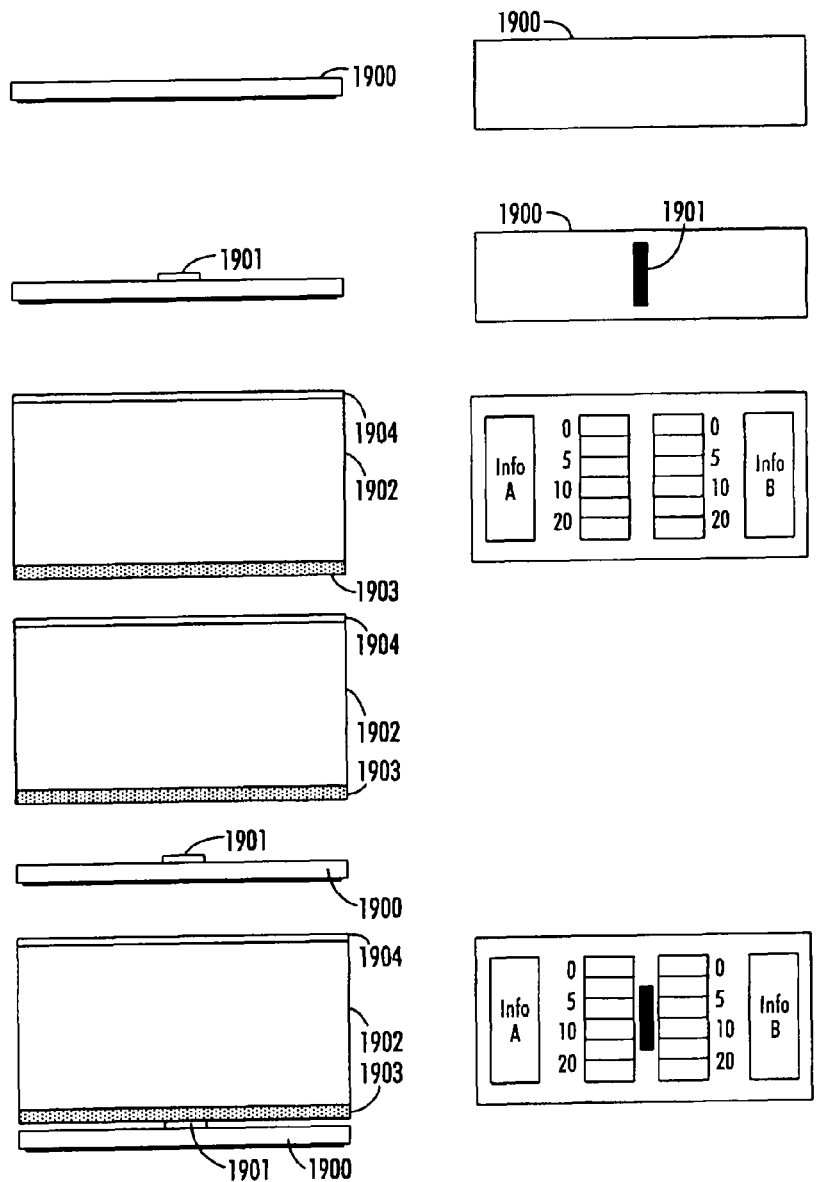
FIG. 19 is a schematic presentation of a process of making a dosimeter badge by coating and printing methods.

A schematic presentation of a process of making a dosimeter badge, by coating and printing methods, is shown in cross-sectional views (left hand side) and corresponding top views (right hand side) in FIG. 19. As shown in FIGS. 19(a) and 19(a'), a protective sheet, 1902, comprising UV absorbers, transparent PVC, polyvinylacetate, polystyrene or polyester film is prepared with an adhesive coat, 1903, applied thereto and preferably a scratch resistant layer, 1904. The color reference chart is preferably integral to the protective coat and preferably between the protective sheet and scratch resistant layer. A radiation sensitive element, 1901, is applied to the substrate, 1900, by any coating technique known in the art, as shown in FIGS. 19(b) and 19(b'). The protective sheet [FIGS. 19(a) and 19(a')] layer is then applied on to the radiation sensitive layer [FIGS. 19(b) and 19(b')] to make the dosimeter as shown in FIGS. 19(c) and 19(c').

Figure 20:
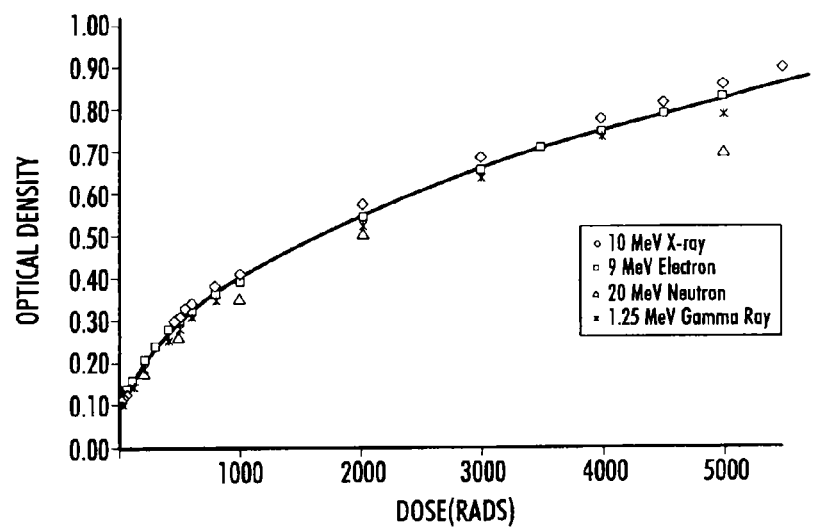
FIG. 20 is a plot of optical density (OD) versus dose for an element comprising diacetylene 344.

A plot of optical density (OD) versus X-ray dose of an element made from diacetylene 344, according to example 3, is shown in FIG. 20. The data indicates that a wide range of exposure can be monitored.

Figure 21:
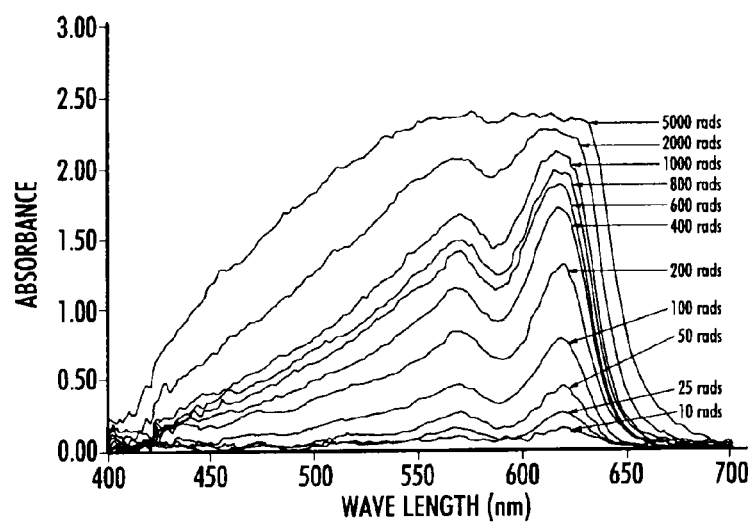
FIG. 21 is a typical set of visible spectra of the element of diacetylene 344 irradiated with different dosages of 10 MeV X-ray.

FIG. 21 shows a typical set of visible spectra of the element of diacetylene 344, of example 3, irradiated with different dosages of 10 MeV X-ray.

Figure 22:
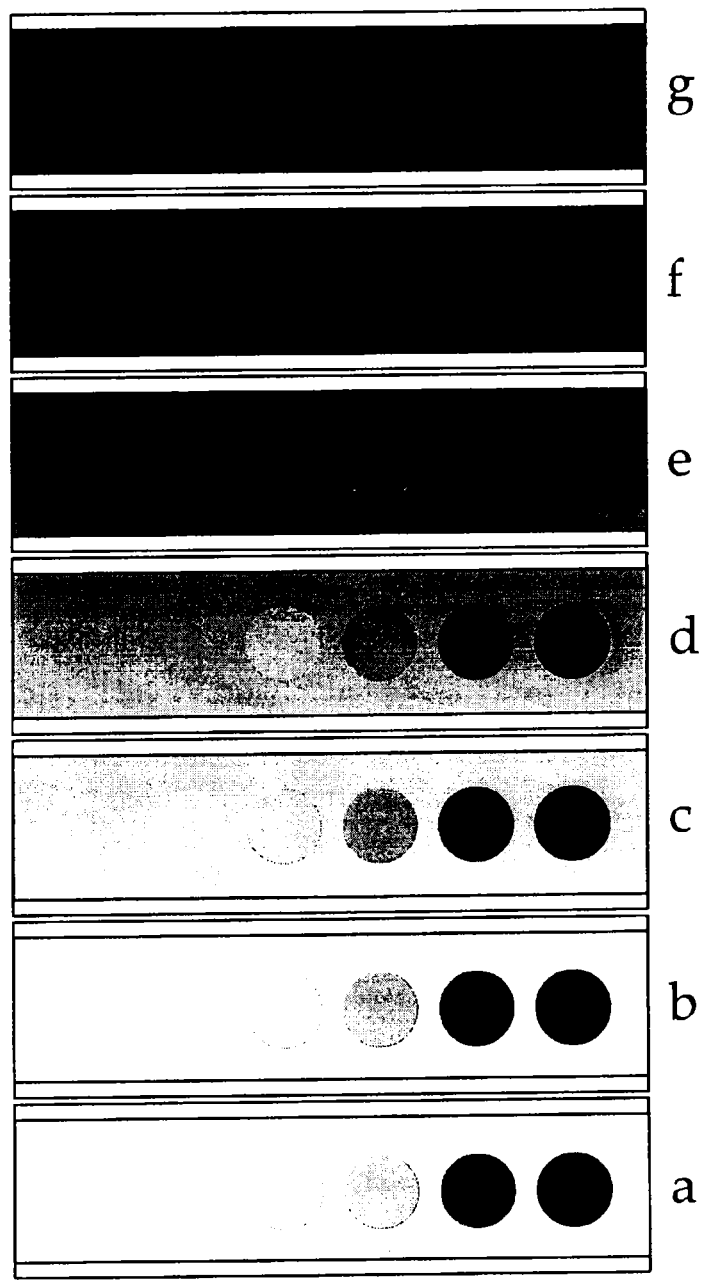
FIG. 22 illustrates a self-reading radiation dosimeter of diacetylene 4BCMU irradiated for different period of UV light.

FIG. 22 represents a series of a self-reading radiation dosimeter, of diacetylene 4BCMU, irradiated with increased periods of UV light from a to g. As the UV exposure increases (FIGS. 22b through 22g) the dots become almost invisible.

The color reference chart can be eliminated by printing, or exposing, the element with UV light as shown schematically in FIG. 23. All numbers will be visible before the exposure to X-ray as shown in FIG. 23a. When exposed to X-ray, some numbers depending upon the dose, as shown in FIG. 23b, will disappear. The dose can be estimated from the lowest readable number. For example, in FIG. 23a no dose is recorded. In FIG. 23b, approximately 75 rads are recorded and in FIG. 23c approximately 200 rads is recorded. In the embodiment of FIG. 23 the optical density of the indicia, preferably numbers, decreases with increasing dose.

The dosimeter can indicate tampering. It is sensitive to time and temperature of annealing and to UV/sunlight. These two parameters can provide false positive signals. Thus the dosimeter needs false positive indicator. These indicators could be formulations which change color with time and temperature of annealing and UV/sunlight.

Figure 25A:
FIG. 25. Schematic presentation of a dosimeter badge having a false positive indicator in form of "X" before (a) and after (b) the over exposure to UV/sun light and/or over exposure to heat.
Figure 25B:
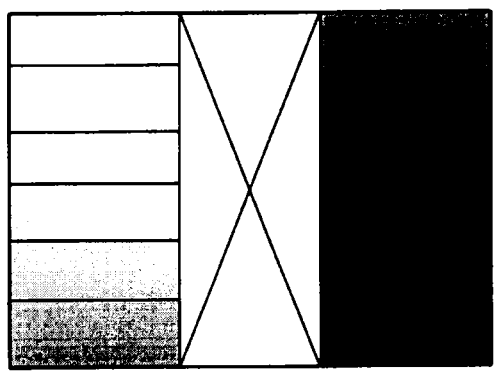
Figure 26A:
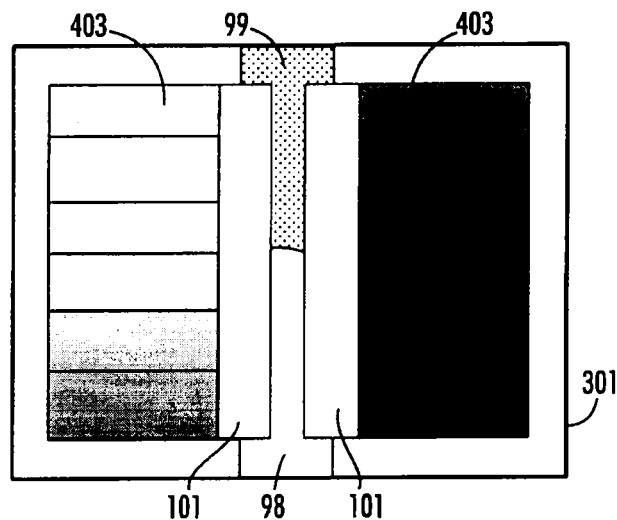
FIG. 26. Schematic presentation of a dosimeter badge having a false positive indicator in form of a bar before (a) and after (b) the over exposure to UV/sun light and/or over exposure to heat.
Figure 26B:
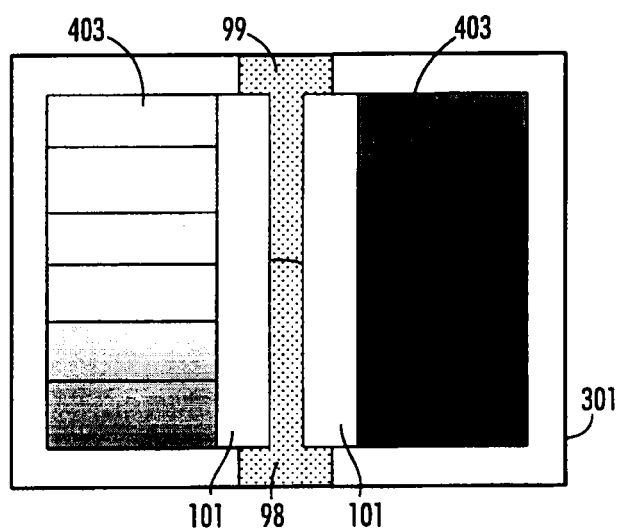

The false positive signal, tamper or shelf life indicators with their own color reference charts could be either on the side of radiation sensitive element as shown schematically in FIG. 24 or they could be printed or attached on the radiation sensitive element as shown in FIGS. 25 and 26, before (FIGS. 25a and 26a) and after (FIGS. 25b and 26b) the over exposure to UV/sun light or heat. These indicators can be printed on the radiation sensitive element and would appear in form of "X" (as shown in FIG. 25b) if over exposed to UV/sun light or heat. In devices of FIGS. 25 and 26, comprise a radiation sensitive element, 101, on a substrate, 301, color reference charts, 403, provide a comparison for determining the dose. An invisible false positive indicator will become visible, 97, as "X" as shown in FIG. 25b or as a bar, 98, in FIG. 26b. The shelf life, false positive, or tampering can be monitored by appearance and color intensity of "X" or the bar, 98, and can be compared with a color reference bar 99.

Figure 27:
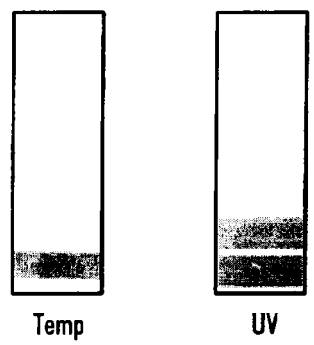
FIG. 27 is a false-positive indicator annealed at 60° C. for a different period of time (a) and exposed to short wavelength (254 nm) UV light for a different period of time (b).
Figure 28:
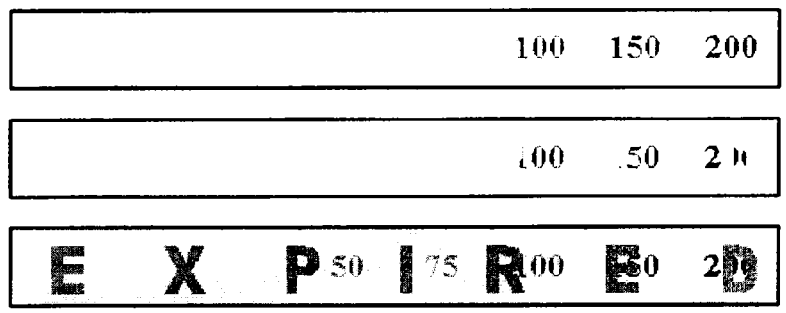
FIG. 28 is a top schematic view of an element with a false-positive indicator showing the word "EXPIRED".

Some compounds, such as pentamethoxytriphenylmethanol (PTM) develop red color in halopolymers, such as polyvinylchloride when exposed to UV/sunlight (FIG. 27b) and also develop the same red color with time and temperature of storage (FIG. 27a). This type of indicators are preferred as they develop the same color both annealing and UV exposure. This type of indicators can be printed on the element as shown in FIG. 28 as a message (e.g., "EXPIRED") or simply "X" or on the side of the element. The development or change of the color indicates false positive and/or expiration of shelf life.

A preferred class of radiation sensitive materials that can be used for making the shaped-articles are diacetylenes having general formula, R'—C≡C—C≡C—R", where R' and R" are the same or different substituent groups. Though this class of diacetylenes is preferred, other diacetylenes having the following general formulas can also be used: higher acetylenes: R'—(C≡C)$_n$—R", where n=3-5; split di and higher acetylenes: R'—(C≡C)$_m$—Z—(C≡C)$_o$—R", where Z is any diradical, such as —(CH$_2$)$_n$— and —C$_6$H$_4$—, and m and o is 2 or higher; and polymeric di and higher acetylenes: [-A-(C≡C)$_n$—B—]$_x$, where A and B can be the same or different diradical, such as —(CH$_2$)$_b$—, —OCONH—(CH$_2$)$_b$—NHCOO—, and —OCO(CH$_2$)$_b$OCO—, where R' and R" can be the same or different groups.

The preferred diacetylenes include those where R' and R" are selected from: (CH$_2$)$_b$—H; (CH$_2$)$_b$OH; (CH$_2$)$_b$—OCONH—R1; (CH$_2$)$_b$—O—CO—R1; (CH$_2$)$_b$—O—R1; (CH$_2$)$_b$—COOH; (CH$_2$)$_b$—COOM; (CH$_2$)$_b$—NH$_2$; (CH$_2$)$_b$—CONHR1; (CH$_2$)$_b$—CO—O—R1; where b=1-10, preferably 1-4, and R1 is an aliphatic or aromatic radical, e.g. C$_4$-C$_6$ alkyl or phenyl or substituted phenyl, and M is a cation, such as Na$^+$ or (R1)$_3$N$^+$.

The preferred diacetylenes are the derivatives of 2,4-hexadiyne, 2,4-hexadiyn-1,6-diol, 3,5-octadiyn-1,8-diol, 4,6-decadiyn-1,10-diol, 5,7-dodecadiyn-1,12-diol and diacetylenic fatty acids, such as tricosa-10,12-diynoic acid (TC), pentacosa-10,12-diynoic acid (PC), their esters, organic and inorganic salts and cocrystallized mixtures thereof. The most preferred derivatives of the diacetylenes, e.g. 2,4-hexadiyn-1,6-diol, are the urethane and ester derivatives.

Preferred urethane derivatives are alkyl, aryl, benzyl, methoxy phenyl, alkyl acetoacetate, fluoro phenyl, alkyl phenyl, halo-phenyl, cyclohexyl, toyl and ethoxy phenyl of 2,4-hexadiyn-1,6-diol, 3,5-octadiyn-1,8-diol, 4,6-decadiyn-1,10-diol, 5,7-dodecadiyn-1,12-diol. The prefer urethane derivatives are methyl, ethyl, propyl and butyl derivatives of 2,4-hexadiyn-1,6-diol, 3,5-octadiyn-1,8-diol, 4,6-decadiyn-1,10-diol, 5,7-dodecadiyn-1,12-diol.

The following are some of the preferred derivatives of 2,4-hexadiyn-1,6-diol: urethane (—OCONH—) derivatives, R'CH$_2$—C≡C—C≡C—CH$_2$R', including: hexyl urethane: 166, R'=OCONH(CH$_2$)$_5$ CH$_3$; pentyl urethane: 155, R'=OCONH(CH$_2$)$_4$ CH$_3$; butyl urethane: 144, R'=OCONH(CH$_2$)$_3$ CH$_3$; ethyl urethane: 122, R'=OCONHCH$_2$CH$_3$; methyl urethane: 111, R'=OCONHCH$_3$; ester (—OCO—) derivatives, R'''CH$_2$—C≡C—C≡C—CH$_2$R''', including:

butyl ester: 144E, R'''=OCO(CH$_2$)$_3$CH$_3$; ethyl ester: 122E, R'''=OCOCH$_2$CH$_3$; methyl ester: 111E, R'''=OCOCH$_3$; symmetrical diacetylenes including: 156: R'—C≡C—C≡C—R'', where R'=CH$_2$OCONH(CH$_2$)$_5$CH$_3$ and R''=CH$_2$OCONH(CH$_2$)$_4$CH$_3$; cocrystallized mixtures including: containing 80 weight percent or above of 166; 85:15 mixture of 166 and 156; 90:10 mixture of 166 and 156 and 4:1 mixture of tricosadiynoic acid and pentacosadiynoic acid(TP41).

The further preferred diacetylenes are derivatives of 3,5-octadiyn-1,8-urethane, 4,6-decadiyn-1,10-urethane and 5,7-dodecadiyn-1,12-urethane, e.g., hexyl urethane: R'=OCONH(CH$_2$)$_5$CH$_3$; pentyl urethane: R'=OCONH(CH$_2$)$_4$CH$_3$; butyl urethane: R'=OCONH(CH$_2$)$_3$ CH$_3$; propyl urethane: R'=OCONH(CH$_2$)$_2$ CH$_3$; ethyl urethane: R'=OCONHCH$_2$CH$_3$; methyl urethane: R'=OCONHCH$_3$.

The most preferred diacetylenes are the urethane derivatives such methyl, ethyl, propyl and butyl urethane derivatives of 4,6-decadiyn-1,10-diol, e.g., diacetylene 344 [R'—C≡C—C≡C—R' where R'=OCONH(CH$_2$)$_3$CH$_3$.

The urethane derivatives can be prepared by reacting diacetylene-diol, e.g., 2,4-hexadiyn-1,6-diol with an appropriate isocyanates (e.g. n-hexylisocyanate) in a solvent, such as tetrahydrofuran, using catalysts, such as di-t-butyltin bis (2-ethylhexanoate) and triethylamine as indicated below:

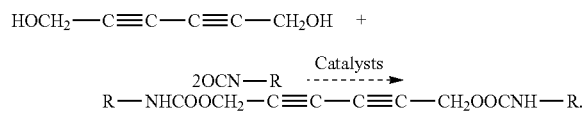

Ester derivatives can be prepared by reacting e.g., 2,4-hexadiyn-1,6-diol with appropriate acid chlorides in a solvent, such as dichloromethane, using a base, such as pyridine as the catalyst; i.e.,

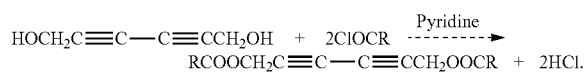

Asymmetrical diacetylenes can be prepared by the Cadiot-Chodkiewicz type reaction methods.

Though individual diacetylenes can be used, it is desirable to alter the reactivity of diacetylenes by cocrystallization. Cocrystallization can be achieved by dissolving two or more diacetylenes, preferably conjugated, prior to molding. For example, when TC and PC are co-crystallized, the resulting cocrystallized diacetylene mixture, such as TP41 (4:1 mixture of TC:PC) has a lower melting point and significantly higher radiation reactivity. The reactivity can also be varied by partial neutralization of diacetylenes having —COOH and —NH$_2$ functionalities by adding a base, such as an amine, NaOH, Ca(OH)$_2$, Mg(OH)$_2$ or an acid, such as a carboxylic acid, respectively.

Other preferred diacetylenes are amides of fatty chain acid, such as TC and PC. The preferred amides are: TCAP=CH$_3$(CH$_2$)$_9$—C≡C—C≡C—(CH$_2$)$_8$—CONH—(CH$_2$)$_3$CH$_3$; PCAE=CH$_3$(CH$_2$)$_{11}$—C≡C—C≡C—(CH$_2$)$_8$—CONH—CH$_2$CH$_3$; PCAP=CH$_3$(CH$_2$)$_{11}$—C≡C—C≡C—(CH$_2$)$_8$—CONH—(CH$_2$)$_3$CH$_3$; PCACH=CH$_3$(CH$_2$)$_{11}$—C≡C—C≡C—(CH$_2$)$_8$—CONH—C$_6$H$_5$; and TCACH=CH$_3$(CH$_2$)$_9$—C≡C—C≡C—(CH$_2$)$_8$—CONH—C$_6$H$_5$.

In order to maximize radiation reactivity, 166 can be cocrystallized with other diacetylenes, e.g. 155, 157, 154 and 156, which are described above. Though certain diacetylenes, such as 155, increase the reactivity of 166, the partially polymerized cocrystallized diacetylenes provide a red color upon melting. However, 156 increases the radiation reactivity of 166 and provides a blue color upon melting the partially polymerized diacetylene mixture. 166 can be cocrystallized with different amounts of 156. Preferred is where the amount is 5-40 weight percent of 156 to 166, most preferred are 90:10 and 85:15 respective weight ratios of 166:156. As used herein "9010" and "8515" refer to these specific cocrystallized mixtures.

Other asymmetrical derivatives, including different functionalities, e.g., ester as one substituent and urethane as the other, can also be prepared. A procedure for synthesis of a 90:10 mixture of 166 and 16PA is given in U.S. Pat. No. 5,420,000. Using the general procedures given in U.S. Pat. No. 5,420,000, it is possible to prepare a variety of other asymmetrical derivatives and their mixtures for cocrystallization.

Polymers having diacetylene functionality [e.g., {—R'—(C≡C)$_n$—R''—}$_x$, where R' and R'' can be the same or different diradical, such as —(CH$_2$)$_n$—, —OCONH—(CH$_2$)$_n$—NHCOO— and —OCO(CH$_2$)$_n$OCO— in their backbones are also preferred because of the fact that they are polymeric and do not require a binder.

The preferred diacetylenes are those which have a low (e.g., below about 150° C.) melting point and crystallize rapidly when cooled at a lower temperature, e.g. room temperature.

Another class of preferred diacetylenic compounds is those having an incorporated metal atom and they can be used as built-in converters. Diacetylenes having functionalities, such as amines, ethers, urethanes and the like can form complexes with inorganic compounds. It is possible to synthesize diacetylenes having an internal converter, which is covalently bonded, such as boron and mercury, lithium, copper, cadmium, and other metal ions. For example, the —COOH functionality of TC, PC and TP41 can be neutralized with lithium ion and synthesis of R—C≡C—C≡C—Hg—C≡C—C≡C—R is reported (M. Steinbach and G. Wegner, Makromol. Chem., 178, 1671 (1977)). The metal atom, such as mercury atom thereby incorporated into the diacetylene can emit short wavelength irradiation upon irradiation with photons and electrons.

The following terminologies are used for defining the reactivity (polymerizability) of a diacetylene. The polymerizable form of a diacetylene(s) is referred to as "active". If a diacetylene is polymerizable with radiation having energy higher than 4 eV, wavelength shorter than 300 nm, then it is referred to as "radiation active". If it is polymerizable upon thermal annealing then it is referred to as "thermally active". A form of diacetylene, which displays little or no polymerization, is referred to as "inactive". If it displays little polymerization with radiation (having energy higher than 4 eV) then it is referred to as "radiation inactive" and if it is significantly nonpolymerizable upon thermal annealing, then it is referred to as "thermally inactive". Diacetylenes having reactivity/polymerizability characteristics in between these definitions are referred to as "moderately active". The most preferred form of diacetylene is one, which is highly radiation reactive and displays little or no thermal reactivity. However, diacetylenes, which are radiation active also usually, have some thermal reactivity. Hence, the preferred form of diacetylene is one, which is highly to moderately radiation active with little or no thermal reactivity. Thermal reactivity can be decreased and radiation reactivity can be increased by cocrystallization and molecular complexation. As an alternative, the shaped-articles can be stored at a lower temperature to slow down the thermal reactivity.

Polymerization, and hence the color development, of diacetylene is known to be independent of dose rate and energy of radiation. At a lower dose the color development is linear with dose. Diacetylenes are usually nontoxic. Many diacetylenes show little or no post radiation effect.

Though diacetylenes are the most preferred radiation sensitive materials, other radiation sensitive materials can also be used for making the devices using the procedure and formulations described here. The radiation sensitive materials/formulations described in Imaging Systems, K. I. Jacobson and P. E. Jacobson, John Wiley and Sons, NY 1976 can also be used to make radiation sensitive shaped-articles. In addition to silver halides, e.g., AgCl, AgBr, AgI, silver molybdate, silver titanate, silver mercaptide, silver benzoate, silver oxalate, and mixtures thereof; salts and organic, inorganic and organometallic complexes of metals, such as iron, copper, nickel, chromium and transition metals, e.g., mercury oxalate, iron oxalate, iron chloride, potassium dichromate, copper chloride, copper acetate, thallium halides, lead iodide, lithium niobate, and mixtures thereof; aromatic diazo compounds, polycondensates of diazonium salts, the naphthoquinone diazides, photopolymers and photoconductive materials, are also preferred radiation sensitive compositions for making the devices.

The other major class of radiation sensitive materials that can be used in the pre-shaped radiation sensitive device of the present invention are radiochromic dyes, such as new fuschin cyanide, hexahydroxy ethyl violet cyanide and pararose aniline cyanide, leuco crystal violet, leuco malachite green and carbinol dyes, such as malachite green base and p-roseaniline base and those described in U.S. Pat. Nos. 2,877,169; 3,079,955; and 4,377,751.

These radiochromic dyes and other dyes which change color with change in pH, e.g., with acids can be used in combination with materials which produce acid upon irradiation, e.g., organic halocompounds, such as trichloroethane, ethyltrichloroacetate, chlorinated paraffins and chlorinated polymers. The acid produced can react with the pH sensitive dye and change color. Certain iodinium salts, such as, diphenyliodinium hexafluoroarsenate, and diphenyliodinium chloride produce protonic acids, such as, HCl, HF, $HBF_4$ and $HASF_6$ upon irradiation with high energy radiation (J. Crivello, Chemtech, October 1980, page 624; "The Chemistry of Halides, Pseudohalides, and Azides", S. Patai (Ed.), John Wiley, New York, 1983). We mixed iodinium and sulfonium compounds with some pH dyes including the radiochromic dyes. The sulfonium, iodinium and alike compounds, in which the primary photochemical reaction produces a super acid and this super acid is employed catalytically to generate other acids. Thus the color development is amplified. Such systems, which have been described in U.S. Pat. No. 6,242,154 and references cited therein.

A large number of dyes listed in Table 1 were mixed with a few selected polymeric binder and a halo-compound (trichloromethylbenzylacetate) and halopolymers, such as polyvinylchloride and polyvinylidine chloride and were irradiated with short UV light and X-ray. Some pH sensitive dyes changed colors.

TABLE 1

List of dyes tested with halo-compound, such as trichloromethylbenzylacetate and halopolymers, such as polyvinylchloride and polyvinylidine chloride.

Acid alizarin violet N, acid black 24, acid black 48, acid blue 113, acid blue 120, acid blue 129, acid blue 161, acid blue 25, acid blue 29, acid blue 40, acid blue 41, acid blue 45, acid blue 80, acid blue 93, acid fuschin, acid green 25, acid green 27, acid green 41, acid orange 74, acid red 1, acid red 114, acid red 151, acid red 88, acid violet 17, acid violet 7, acid yellow 99, acridine orange, acridine orange base, acridine orange G, acridine yellow G, acriflavine hydrochloride, alcian blue 8GX, alcian yellow, alizarin, alizarin blue black SN, alizarin complexone, alizarin complexone dihydrate, alizarin red, alizarin violet 3R, alizarin yellow GG, alizarin yellow R, alkali blue 6B, alkali fast green 10GA, alphazurine A, aluminon, aminoacridine hydrochloride, aminoanthraquinone, aminophthalhydrazide, aniline blue, astra blue 6GLL, auramine O, azocarmine, azocarmine B, azure A, azure B, azure B thiocyanate, azure C, basic blue 3, basic blue 41, basic blue 66, basic fuchsin, basic red 29, basic yellow 11, benzo purpurin 4B, biebrich scarlet NA salt, bismarck brown B, bismarck brown Y, blue tetrazolium, bordeaux R, brilliant blue B, brilliant blue G, brilliant cresyl blue ALD, brilliant crocein MOO, brilliant green, brilliant sulphaflavine, brilliant yellow, bromochlorophenol blue, bromocresol green, bromocresol purple, bromophenol blue, bromopyrogallol red, bromothymol blue, bromoxylenol blue, calmagite, carbol fuchsin, carminic acid, carotene, celestine blue, Chicago sky blue, chlorophenol red, chrome azurol S, chromotrope 2B, chromotrope 2R, chromoxane cyanine B, chrysoidin, chrysophenine, cibacron brilliant red 3BA, Congo red, copper(II) phthalocyanine, cresol purple, cresol red, cresol, cresolphthalein, cresolphthalein complexone, crystal violet, curcumin, darrow red, diaminoacridine hemisulfate, diazo red RC, dibromofluorescein, dichlorofluorescein, dichloroindophenol, dicinnamalactone, diethylaminomethyl coumarin, diethyloxacarbocyanine iodide, diethylthiatricarbocyanine iodide, dihydroxy benzenesulfonic acid, dilithium phthalocyanine, dimethyl methylene blue, dimethylglyoxime, dimethylindoaniline, dinitro diphenylamine, diphenylthiocarbazone, direct blue 71, direct green 6, direct red 23, direct red 75, direct red 81, direct violet 51, direct yellow 62, disodium phthalocyanine, disperse blue 14, disperse blue 14, disperse blue 3, disperse orange, disperse orange 11, disperse orange 25, disperse yellow 7, emodin, eosin B, eosin Y, eriochrome black T, eriochrome blue black B, erioglaucine, erythrosin B, ethyl eosin, ethyl orange, ethyl red, ethyl violet, Evans blue, fast black, fast blue B salt, fast blue BB, fast blue RR, fast blue RR salt, fast corinth V salt, fast garnet GBC base, fast green FCF, fast red aluminum salt, fast red violet LB salt, fast violet B salt, fat brown RR fat green GDC salt, flavazin I, fluorescein, fluorexon, gallocyanine, guinea green B, hematoxylin, hydroxy naphthol blue, 1,4-hydroxy-naphthoquinone, indigo, indigo carmine, indoline blue, iron(II) phthalocyanine, janus green B, lacmoid, leishman stain, leuco crystal violet, leucomalachite green, leucoquinizarin, light green SF yellowish, lissamine green B, litmus, luxol fast blue, malachite green base, malachite green hydrochloride, malachite green oxalate, metanill yellow, methyl eosin, methyl green, methyl orange, methyl red, methyl violet 2B, methyl violet B base, methyl yellow, methylene blue, methylene green, methylene violet 3RAX, methylesculetin, methylthymol blue, mordant blue 9, mordant brown 24, mordant brown 4, mordant orange, mordant orange 1, mordant orange 6, mordant red 19, mordant yellow 10, morin hydrate, murexide, naphthochrome green, naphthol AS, naphthol blue black, naphthol green B, naphthol yellow, naphtholbenzein, naphtholbenzene, naphtholphthalein, neutral red, new coccine, new fuchsin, new methylene blue N, nigrosin, Nile blue A, Nile blue chloride, nitrazine yellow, nitro red, nitro-phenanthroline, nitrophenol-2, nitrophenol-3, nitrophenol-4, nitrophenylazo-resorcinol, nuclear fast red, oil blue N, oil red EGN, oil red O, orange G, orange II, palatine chrome black 6BN, palatine fast yellow BLN, pararosaniline acetate, pararosaniline base, pararosaniline chloride, patent blue VF, pentamethoxytriphenylmethanol, phenanthroline, phenazine, phenol red, phenolphthalein, phenolphthalein diphosphate, phenothiazine, phenylazoaniline, phenylazodiphenylamine, phenylazoformic acid, phenylazophenol, phloxine B, phthalocynine, pinacyanol chloride, plasmocorinth, ponceau S, primuline, procion red MX-5B, procion yellow H-E3G, prussian blue, purpurin, pyridlazo naphthol, pyridylazoresorcinol sodium salt, pyrocatechol violet, pyrogallol red, pyronin B, quinaldine red, quinizarin, quinoline yellow, reactive black 5, reactive blue 15, reactive blue 2, reactive blue 4, reactive orange 16, resazurin, resorcin crystal violet, rhodamine B, rhodamine B base, rhodamine GG, rhodamine S, rhodanine, rosalic acid, rose bengal, rose bengal lactone, safranine O, solvent blue 35, solvent blue 59, solvent green 3, styryl 7, sudan black B, sudan orange G, sudan red 7B, sulfobromophthalein sodium salt, sulforhodamine B, tartrazine, tetrabromophenol blue, tetrabromo phenolphthalein, tetrabromo TABLE 1-continued List of dyes tested with halo-compound, such as trichloromethylbenzylacetate and halopolymers, such as polyvinylchloride and polyvinylidine chloride.

phenolphthalein, tetraiodo phenolphthalein, tetraphenyl-butadiene, tetrazolium violet, thiazol yellow G, thioflavin S, thioflavin T, thionin, thymol blue, thymolphthalein, thymolphthalein monophosphate, thymolphthalein monophosphate, toluidine blue O, triphenylmethyl bromide, tropaelin O, trypan blue, turmeric, vanillin azine, variamine blue RT salt, variamine blue RT salt, victoria blue B, victoria blue B, victoria pure blue BO, wright stain, xilidine ponceau 2R,, xylenol blue, and xylenol orange Some of these dyes are fluorescence dyes and some of them changed their fluorescence upon irradiation.

The term "converter(s)" is used for any material, substance or mixture, which can be complexed or doped with other substances, which when irradiated with high energy radiations, both ionizing and nonionizing, produces relatively lower energy radiation, either of the same or different type, via any process including scattering, attenuation, fluorescence, phosphorescence, and conversion. Inorganic and organometallic compounds are preferred as converters because they have the ability to transfer/convert high-energy radiation into lower energy radiation via many processes, such as scattering, absorbance, fluorescence, and phosphorescence. The selection of a converter depends upon the type of radiation to be monitored and its energy. For example, lead and barium salts are good converters for monitoring X-ray radiation and boron, lithium salts are good converters for measuring thermal neutrons.

When high-energy radiation strikes a metal, secondary electrons and other radiations of longer wavelengths are emitted. The emission of these secondary radiations become greater in materials with a high atomic number. Barium salts are especially preferred because they are nontoxic. Elements having high atomic number (Z), such as lead, are also preferred. Other converters include alloys, salts, and free metals of zinc, tin, silver, tungsten, molybdenum, platinum, gold, copper, iodine, and bromine.

The resulting image can be amplified by incorporating converter materials into the radiation sensitive mixture, under coat, topcoat, and preferably into all these. The converters will absorb high energy X-ray, radiation, electrons, and neutrons and convert the absorbed radiation into secondary low energy ionizing radiation. These secondary low energy ionizing radiations and nuclear particles, such as alpha particles emitted by the converter can initiate a reaction in the radiation sensitive materials. The secondary radiation, irrespective of its source can be absorbed by the converter materials and emit tertiary ionizing radiation which in turn can also initiate a reaction in the radiation sensitive materials. When the secondary radiations are electrons, use of electroluminescence materials as converters can amplify the image.

The image of a thin shaped-article e.g., film, can be further amplified by placing it into intimate contact with one or two screens made from converter materials. The screens in their simplest form can be a plain metal foil and/or coated with a radioluminescence, electron luminescence or fluorescence phosphor material, which emits radiation of usually lower energy. The X-ray image can be amplified by using phosphor materials, which emit energy higher than 4 eV as screen materials. Phosphor materials, which emit long wavelength UV light, can be made to emit higher energy radiation by appropriate dopants, quantity of dopants and doping processes. An appropriate voltage can also be applied to the screens to produce secondary electrons, which in turn can also initiate a reaction in the radiation sensitive materials, thereby also amplifying the image.

Any material, which is an organic, inorganic and/or organometallic compound, which emits radiation of wavelength lower than 300 nm, (energy higher than 4 eV) including those emitted by fluorescence and phosphorescence, upon irradiation with high energy radiation can be used as a converter for the undercoat, radiation sensitive coat, top coat and the screens. In order to maximize the sensitivity of the film, the selection of a proper converter is required. A converter which has a strong ability to absorb high-energy radiation and emit high intensity radiation of significantly lower energy, but higher than 4 eV, is preferred.

Substances commonly known as cathode/electro luminescence materials, i.e., are materials which when contacted with electrons emit lower energy radiation. Electroluminescence phosphors, such as hafnium pyrophosphate and those substituted with zirconium, germanium and silicon, which emit UV light or can me made to emit UV light by doping are preferred phosphors. These materials can also be used as converters if they emit radiation having energy higher than 4 eV, because the secondary electrons can induce cathode luminescence materials to emit UV and X-ray radiation, which in turn can initiate the polymerization of diacetylenes.

A material which emits radiation having a wavelength shorter than 1 nm can be used as a converter. Preferred are those, which emit UV radiation in the range of 300 to 1 nm. UV radiation is rapidly absorbed by the diacetylene functionality and causes their polymerization. Hence, a preferred converter should emit radiation of energy between 300 and 100 nm. Materials commonly known as phosphors include those from the II-VII Periodic Table group phosphors (e.g. ZnS, ZnCdS) and a rare earth phosphor (e.g. $Gd_2O_2S, Y_2O_2S$) and three elemental oxide phosphors (e.g. $CaWO_3$, $ZnSiO_4$). Converters, such as barium lead sulfate, naphthalene-sodium iodide doped with TI, $ZrP_2O_7$ (zirconium phosphate), which can emit UV light, can be used. Properly doped phosphors, such as barium fluorochloride and lanthanum oxybromide, terbium activated rare earth oxysulfide ($X_2O_2S$ where X is gadolinium, lanthanum or yttrium), GdOS:Tb(III); LaOS:Tb (III); LaOBr:Tb(III); LaOBr:Tm(III); $Ba(FCl)_2$:Eu(II); $SrB_4O_7$:Eu (strontium europium borates); $BaSi_2O_5$:Pb (barium silicate); $(CeBa)MgAl_{11}O_{19}$ (cerium, barium-magnesium aluminate); strontium pyrophosphate activated with europium, phosphates of zirconium, germanium, silicon and hafnium; and yttrium tantalates either unactivated or activated, can emit short wavelength UV light. The preferred phosphor is the one, which emits short wavelength UV light (e.g., 300-50 nm).

For monitoring neutrons, compounds having a high neutron cross-section are preferred converters. The neutron cross-section for boron decreases as the energy of neutrons increases. Naturally occurring boron compounds have about 20% boron-10. Amines form a complex with boric acid. Boric acid (BA) is nontoxic and inexpensive. Shaped-articles containing boron and lithium, especially boron, as a converter can be used for monitoring thermal neutrons and boron-neutron capture therapy. Elements having high neutron cross-section and emitting electrons and gamma rays, e.g., gadolinium can also be used as a converter for neutrons.

Although any solid substrate having a smooth surface can be used for coating radiation sensitive shaping formulations and making film, preferred substrates are flexible and transparent plastic film, and natural (cellulose) and synthetic (e.g., spun bonded polyolefins, e.g., Tyvek®) papers. Plastic films, such as polyethylene, polypropylene, polyvinylchloride, polymethylmethacrylate, polyurethanes, nylons, polyesters, polycarbonates, polyvinylacetate, cellophane and esters of cellulose can be used as the transparent substrate. Metal foils, such as aluminum can also be used.

The most preferred substrates are 5-300 microns thick films of polyethylene terephthalate. Self-supporting film of FIG. 1, plaque and block do not require substrate.

Strong adhesion of the radiation sensitive layer with the substrate film is required. If the coating does not adhere to the base film, it usually flakes off. In order to increase the adhesion of the coating to the substrate, a thin coating, known as a subcoating, undercoat or substratum, which has ability to bond with substrate, such as polyester base film and the radiation sensitive coating, is applied on the polyester film. The nature/composition of the substratum will depend upon the nature/composition of the binder.

The layer containing the radiation sensitive material may be coated with a barrier material. The purpose of a barrier layer is to minimize diffusion of undesirable chemicals, e.g., diffusion of chemicals from an adhesive layer and those from environment including oxygen, water and water vapor and also minimize the effect of other undesirable radiation, such as UV light. A barrier layer may be a polymeric layer, such as polymers used as binder and listed herein. Barrier layer may contain additives, such as UV absorber. Between all these layers proposed here, one may apply a prime layer to get good bonding between them.

Diacetylenes, such as 166, 344, 4BCMU, PC, TC and esters and amide of TC and PC were dissolved in molten polymers, such as polybutylene, polymethylmethacrylate, polybutylmethacrylate, polybutylmethacrylate/isobutylmethacrylate, polyethylene, poly(ethylene-co-acrylic acid), poly(ethylmethacrylate), polyethylene/vinylacetate, poly(isobutylmethacrylate), polyvinylbutyral, polyvinylbutyral, polyvinylchloride, polyvinylstearate, poly(ethylene-co-acrylic acid), poly(ethylene-co-methacrylic acid), polybutadiene, polyvinylacetate, poly(ethyelene-co-butylacrylate-co-carbon monoxide), poly(o-cresyl glycidyl ether)-formaldehyde, poly(ethyelene-co-1-butene), poly(ethyelene-co-methylacrylate), polyethylene-co-vinylacetate-co-carbon monoxide), polyhexamethyleneadipate, and polyhexamethylenevinylene. Molten mixtures were pressed into thin films and plaques and then cooled to room temperature. Depending upon the polymer and diacetylene, opaque, translucent and transparent shaped objects were obtained. The melt casted shaped-articles, such as thin film, plaque and blocks were exposed to X-ray. Most of the shaped-articles developed color upon irradiation. Other radiation sensitive materials can be used instead of diacetylenes. Most of the melt processable polymers can also be used for radiation sensitive materials other than diacetylenes. Preferred polymers for melt processing are those which provide transparent or translucent shaped-articles. The most preferred are polymethylmethacrylate, polyvinylchloride, polystyrene, polyester, poly(ethylene-co-acrylic acid), polyvinylacetate and their copolymers. The shelf life of the shaped objects made by this melt processing technique can be increased by adding shelf life extenders listed herein.

Commercial polymers are often modified, compounded, with plastic additives to improve performance. Plasticizers are primarily polymer additives. The major use of plasticizers is for polyvinyl chloride (PVC) and its copolymers. A plasticizer is a substance or material incorporated in a material (usually a plastic or elastomer) to increase its flexibility, workability, or dispensability. Generally, a plasticizer is a high boiling point organic liquid (solvent) or in some circumstances an organic solid. Common plasticizers are phthalates, glycol ethers, oleates, adipates, gluterates, phosphates, benzoates, chlorinated paraffins, recinoleates, azelates, hydrocarbon oils, sebacates, citrates, isobutyrates, sulfonamides, epoxy, ketones, abietates, trimellatates and polymerics, such as polyesters (Sears, J. Kern, Darby, Joseph R., The Encylopedia of Plasticzers, John Wiley & Sons, New York, 1982 and O'Brien, Joseph, Modem Plastics Encyclopedia, 1986-1987, "Plasticizer", Pages 166-168, McGraw Hill, 1986). The mixture of micro particles of polymer, such as PVC and plasticizer is generally referred to as plastisol.

A variety of solvents and plasticizer can also be added in formulations for proper crystallization of diacetylenes or dissolution of radiation sensitive dyes and to adjust the temperature of clarity of the block and plasticization of the binders. Use of solvent and plasticizer will depend upon several factors, such as nature and concentration of radiation sensitive materials, binders, and additives. We explored the use of several high boiling solvents, such as butoxy-2-ethylstearate, butyrolactone, diethyl fumarate, dimethyl maleate, dimethylcarbonate, dioctyl phthalate, ethylene glycol dimethyl ether, ethyl salicylate, polyethylene glycol dimethylether, propylene carbonate, triacetin, benzyl ether, dodecyl-1,2-methylpyrrolidone, ethoxyethylacetate, ethylene glycol diacetate, ethyltrichloroacetate, methylpyrrolidone, methyl sulfoxide, polyethylene glycols of different molecular weight, dimethylformamide, cyclohexane, p-dioxane, tetrahydrofuran and p-xylene. Preferred solvents are high boiling solvents, plasticizers and liquid oligomers. The most preferred solvents are dioctylphthalate, ethylene glycol diacetate and ethyl salicylate.

The use of plastisol offers many advantages. For example, they eliminate the solvent which needs to be evaporated. They lower the processing temperature if the element is to be made by melt processes. They also make plastic/binder softer and flexible. They also help in minimizing the effect of temperature of irradiation.

A topcoat of about 0.5-2 microns, also known as a supercoat, is usually applied to make the coating resistant to abrasion. The topcoat can contain many other additives, such as (1) a converter, such as lead iodide and sodium iodide, which is capable of producing radiation of lower energy when irradiated with the high-energy radiation thereby enhancing the image and (2) UV absorbers. Although the polymers in the radiation sensitive coat, sub-coat, and topcoat can be different, the converter material and UV absorbers can be the same or different depending upon the binder used. As the film does not require wet processing, any scratch resistant polymers can also be used as the topcoat. The protective coat can also contain other additives, such as an antistatic compound, scratch resistant and anti-reflective materials. This topcoat can be polyurethanes, polyepoxies, polysiloxanes, and polyacrylics which provide hard protective coat.

The dosimeter should have a shelf life of months to years. It is most preferred that the radiation monitoring device, or the radiation sensitive element, demonstrate an optical density of no more than 0.05 after storage at ambient conditions for one month. The shell life of the element/film/coating made from diacetylene and other radiation sensitive materials described herein, for monitoring X-ray mainly depends on the UV radiation and thermal reactivities. There is no report on how to control the thermal and UV reactivities of diacetylenes. We discovered that the shelf life of diacetylenes can be extended by adding shelf life extenders, such as heat stabilizers, quenchers (of the exited state), scavengers, antioxidants, inhibitors (of reactive species), oxygen scavenger, preventor (of reactive species), UV stabilizers, UV reflectors, and UV absorbers in the diacetylenic formulations. The compounds, such as heat stabilizers, quenchers (of reactive species), scavengers (e.g., radical and oxygen scavengers), antioxidants, inhibitors (of reactive species), preventor (of reactive species), thermo-oxidative preventors, photo-oxidative preventors, hydroperoxide decomposer, H-donors, metal destabilizers, UV stabilizers, UV absorbers, UV reflectors and alike are collectively or individually termed herein as shelf life extenders. The amount and nature of shelf life extenders required depends upon nature of diacetylene, solvent or polymeric binder used for crystallization of diacetylenes. Using the shelf life extenders we have been able to extend the shelf life of many diacetylenes, e.g., 4BCMU from weeks to months and almost one year at room temperature and from hours to a couple of days under the sunlight.

The concentration of the shelf life extenders required will depend on many factors such as nature of radiation sensitive material, solvent and non-solvent used to make the coating solution, dispersion or melt mixture and binder used. The shelf life extenders can be used from 0.1 to almost 75% of the total solid. We have found that 5-50% concentration is very effective. The preferred range is 5-30 weight percent of the shelf life extender to the total solid.

Polymerization diacetylenes could be due to initiation of polymerization by reactive species, such as radicals, radical ions and carbenes. Often certain impurities can also initiate polymerization of diacetylenes. If formation of the reactive species which initiate polymerization of diacetylenes are stopped from formation or destroyed if formed, the shelf life can be extended. We have found that polymerization inhibitors, such as phenols, polyphenols and substituted phenols, hydroquinone and its alkyl hydroquinone derivatives, e.g., methyl hydroquinone, catachol, pyrrogallol and their derivatives e.g., di-t-butyl catechol, benzoquinone, chloranil, ferric chloride, cupric chloride, sulfur, and radical inhibitors, such as diphenylpycrylhydrazine, galvanoxyl and triphenylverdazyl, aromatic amines, such as diphenylamine can be used for extending the shelf life.

We have also found that heat stabilizers commonly known as antioxidants, oxygen scavengers, thermo-oxidative preventors, photo-oxidative preventors, hydroperoxide decomposer, H-donors, reactive species quenchers, metal destabilizers and alike and their mixtures are very effective in extending the shelf life of diacetylenes. Alkyl sulfides, alkyl phosphites, aromatic amines, alkyl phenols, metal dithiophosphates and metal dithiocarbamates, tetramethylpiperidine can be used to extend the shelf life of diacetylenes. Butylated hydroxytoluene (BHT), 2,3-t-butyl-4-hydroxanisole, 2,6-di-tert-butyl-4-ethylphenol, bisphenolics, thiobisphenols, organophosphites and thioesters can be used as antioxidants for the dosimeter.

We have also found that aromatic amines, especially secondary aromatic amines and sterically hindered phenols are excellent H-donors and can be used as the shelf life extenders of diacetylenes. The examples of such H-donors include m-Xylylenediamine, diphenylamine, 1,3-bis(aminomethyl) cyclohexane, 1,3-bis(3-aminomethylphenyl-methylamino)-2-propanol, 1,3-bis(N,N-N-diglycidylaminomethyl)cyclohexane and N,N,N',N'-tetraglycidyl m-xylenediamine.

Organic compounds of trivalent phosphorus, such as e.g. phosphites or phosphonites, and organic compounds of sulfur, e.g. sulfides, metal salts of dialkyldithiocarbamates and dithiophosphates are widely used hydroperoxide decomposers. Among sulfur based hydroperoxide decomposers, esters of 3,3-thiodipropionic acid play an important role. The principal reaction is the thermolysis of the initially formed sulfoxide to a sulfenic acid. A variety of subsequent oxidation reactions starting from sulfenic acid contribute to further hydroperoxide decomposition and in a later stage of transformations, inorganic sulfur acids and sulfur oxides are formed. All acidic species formed can decompose ROOH in an overstoichiometric manner. These hydroperoxide decomposers can also be used as the shelf life extenders for the dosimeter.

Radical scavengers, such as benzofuranone and its derivative can also be used as shelf life extenders.

In order to minimize the formation of peroxide, it is important that diffusion of oxygen is minimized. Polymeric materials which minimize permeation of oxygen can be used as binders and protective coat or film. Oxygen can also be scavenged by oxygen scavengers, such as amines, phenols, quinones, aldehydes, carbohydrazines, unsaturated organic compounds and reducing agents. The example of oxygen scavengers include: aldehydes, hydroxyalkylhydroxylamine, N,N,-bis-(2-hydroxyethyl)hydroxylamine, N,N-bis(2-hydroxypropyl)hydroxylamine, N,N-bis(2-hydroxybutyl)hydroxylamine, 1-aminopyrrolidine, 1-amino-4-methylpiperazine, anthrone, elagic acid, aldehydes, such as acetaldehyde, gltarldehyde and furfural, hydroquinone, 2,3-dimethyl-1,4-hydroquinone, 2-tert-butylhydroquinone, catechol, 4-tert-butyl catechol, pyrogallol, 1,2,4-hydroxybenzene, gallic acid, methyl gallate, ethyl gallate, propyl gallate, 2-aminophenol, 1,4-naphthoquinone, 1,2-naphthoquinone, 1,4-naphthohydroquinone, 1,2-naphthohydroquinone, 2,6-naphthoquinone, naphthopurpurine, 5,8-dihydro-1,4-naphthoquinone, 5,6,7,8-tetrahydro-1,4-naphthoquinone, 3,4-dihydroxy-1,4-naphthoquinone, 4-amino-1,2-naphthoquinone, 2-amino-1,4-naphthoquinone, cyclohexylamine, 2-amino-2-methyl-1-propanol, monoethanolamine, diethanolamine, morpholine, monoisopropanolamine, diethylethanolamine, diethylpropanolamine, dimethylethanolamine, and dimethylpropylamine, diethylhydroxylamine (DEHA), morpholine, sodium metabisulfite, sodium sulfite, dimethyl sulfoxide, 2,6-di(t-butyl)-4-methylphenol (BHT), 2,2'-methylene-bis(6-t-butyl-p-cresol), triphenylphosphite, tris-(nonylphenyl)phosphite, dilaurylthiodipropionate, vitamin E (alpha-tocopherol), octadecyl 3,5,-di-tert-butyl-4-hydroxyhydrocinnamate, tetrakis [methylene(3,5-di-tert-butyl-4-hydroxyhydrocinnamate)] methane, tannin and quarternary ammonium chloride, such as tetraethylammonium chloride. We have found that this kind of oxygen scavengers are effective in increasing the shelf life of the dosimeter.

Materials known as quenchers can absorb the energy from the excited groups, calming them, so to speak, and thereby retard their development as destructive free-radicals. HALS (hindered amine light stabilizers), a widely used class of UV stabilizers are thought to act partially as quenchers. Antioxidant action from UV stabilizers, such as HALS are used widely to achieve UV degradation resistance. Unlike UV absorbers, this class of compounds reacts with peroxides and free-radicals formed by exposure of the material to UV light; scavenging them and thereby neutralizing their harmful effects. We have found that HALS are also effective in extending the shelf life.

UV stabilizers or quenchers, such as Poly[4,4-methylenebis(phenyl isocyanate)-alt-1,4-butanediol/poly(ethylene glycol-co-propylene glycol/polycaprolactone], Poly[N,N-bis(2,2,6,6-tetramethyl-4-piperidinyl)-1,6-hexanediamine-co-2,4-dichloro-6-morpholino-1,3,5-tria, 1,5,8,12-Tetrakis [4,6-bis(N-butyl-N-1,2,2,6,6-pentamethyl-4-piperidylamino)-1,3,5-triazin-2-yl]-1,5,8,12-tetraazadode and 5,5-Methylenebis(2-hydroxy-4-methoxybenzophenone) can also be used for the dosimeter.

Ultraviolet radiation is divided into three groups of wavelengths. UVC (less than 290 nm), UVB (290-320 nm), and UVA (320-400 nm). Diacetylenes depending upon substituent group develop color when exposed to all UV lights to a greater or lesser degree. The diacetylenes and the element made from it can be protected either by incorporating UV absorbers and UV stabilizers in the element or by applying a coat having UV absorbing polymers. Aromatic polymers, such as polystyrene, polyethylene terephthalate, aromatic polyurethanes and poly(bis-phenol carbonate) are good UV absorbers. The UV absorbing capability can be further increased and broadened by adding proper UV absorbers, such as benzophenones (hydroxy benzophenones), benzotriazoles (hydroxy benzotriazoles), benzoates, oxanilides and salicylates are widely used as UV absorbers. We have found that the use of UV absorbing polymers, UV absorbers and UV stabilizers are very effective in increasing the shelf life. Micronized (to micron and submicron sizes) titanium, iron and zinc oxides can also be used UV absorbers. We have found that nano-particles, for example, those of zinc oxide, tin oxide and titanium dioxide are very effective UV absorbers.

Examples of UV absorbers include, Benzamide, benzophenone hydrazone, 3,3',4,4' benzophenone tetracarboxylic dianhydride, benzotriazole, 2,2' biphenol, 4,4' biphenol, bisphenol A, 2-(2H-benzotriazole-2-yl-4-methyl phenol), coumarin, ethylhexyl p-methoxycinnamate, 2-ethylhexyl salicylate, oxybenzone, p-aminobenzoic acid its derivatives, diester and/or polyester of a naphthalene dicarboxylic acid, cinnamates (octylmethoxy cinnamate and cinoxate), salicylates (methyl salicylate), anthranilates, such as menthyl anthranilate, 2-ethylhexyl-2-cyano-3,3-diphenyl acrylate, 2-phenyl benzimidazole-5-sulfonic acid, digalloyl trioleate, 3-(4-methyl benzylidene) camphor, 4-isopropyl dibenzoyl methane, butyl methoxy dibenzoyl methane, 2-ethyl-2-cyano-3,3'-diphenyl acrylate, cupferron, ethylsalicylate, hydroxy methoxy benzophenone, hydroxybenzophenone, hydroxycinnamic acid, sulfosalicylic acid, tetrahydroxy benzophenone, fluorescin, fast blue BB, phenothiazine, 4-nitrophenol, 7-hydroxy-4-methylcoumarin, 2-(2H-Benzotriazol-2-yl)-4-(1,1,3,3-tetramethylbutyl)phenol, 2-(2H-Benzotriazol-2-yl)-4,6-di-tert-pentylphenol, Poly[2-(4-benzoyl-3-hydroxyphenoxy)ethyl acrylate], 2-tert-Butyl-6-(5-chloro-2H-benzotriazol-2-yl)-4-methylphenol, 2-(2H-Benzotriazol-2-yl)-4,6-bis(1-methyl-1-phenylethyl)phenol, 2,2-Methylenebis[6-(2H-benzotriazol-2-yl)-4-(1,1,3,3-tetramethylbutyl)phenol], 2-(2H-Benzotriazol-2-yl)-6-dodecyl-4-methylphenol, 2-Phenyl-5-benzimidazolesulfonic acid, 2-(2'-hydroxy-5-octylphenyl benzotriazole), 3,4 diaminobenzophenone, 2,4 dihydroxybenzophenone, 3,5 dihydroxy benzoic acid, 2,2' dihydroxy 4,4' dimethyl benzophenone, 2,2' dihydroxy 4 methoxy benzophenone, 2,3 dihydroxy naphthalene, diphenylamine, di-tert-butyl-4-methyl phenol, 4-hydroxybenzophenone, 2-hydroxy-4-methoxy benzophenone, 2-hydroxy-4n-octyloxybenzophenone, lauryl gallate, phenyl hydroquinone, 4,4'(1,4 phenylene diisopropylidine)bisphenol, 4,4'(1,3 phenylene diisopropylidine) bisphenol, salicylanilide, 2,2',4,4' tetrahydroxy benzophenone, 2,3,4 trihydroxybenzophenone, trimethyl hydroquinone, and 1,1,1 tris(4-hydroxyphenyl)ethane.

UV absorbers and UV stabilizers can be added in the active layer containing diacetylenes and the active layer can be coated with UV absorbers and UV stabilizers. One can use a mixture of UV absorbers and UV stabilizers.

The shelf life of the dosimeter can be extended by incorporating UV reflective materials in the binder, barrier layer and the top layer. The dosimeter can also be protected from UV light by having multiple UV reflective layers. We also found that plain holographic and dichroic films and polarizers are also effective in reducing effect of UV light. We have found that these approaches are effective in minimizing the effect of UV light. A surface can be made UV reflective by sputter coating certain inorganic materials. A UV reflective layer can be obtained from organosilicon compounds (U.S. Pat. No. 6,486,338) and cholesteric liquid-crystalline polymers (U.S. Pat. Nos. 5,827,449 and 6,159,454). Liquid-crystalline materials having a cholesteric phase with a pitch of less than 400 nm, comprising a) liquid-crystalline organosiloxanes containing dianhydrohexitol derivatives as chiral groups, and b) chiral monomeric additives which induce the same helicality as the respective liquid-crystalline organosiloxanes can be used. Multilayer polymeric films and other optical bodies as described in U.S. Pat. Nos. 6,498,683 and 6,531,230, can also provide protection from UV light.

Many compounds are fluorescent. They are good UV absorbers. They absorb UV light and emit light of longer wavelength. There are a large number of fluorescence compounds which can be used as UV absorbers to extend the shelf life of the dosimeter; coumarins, rhodamines, acridines, coumestrols, fluoresceins, pyrenes, stillbenes, resorufins, eosins, xanthanes, naphthalimides, and polymethines are the major classes of fluorescence compounds which can be used to protect the dosimeter from UV/sunlight. The following compounds commonly known as fluorescence probes can be used: 2-hydroxybiphenyl, fluram, fluoresceinamine, anthracene, 1,2-bis(2-aminophenoxy)ethane-N,N,N',N'-tetraacetic acid tetrasodium salt, phenanthrene, anthracene-9-carboxylic acid, phthaldialdehyde, phthaldialdehyde, 2',7'-dichlorofluorescin diacetate, 1-ethylnaphthalene, 9-fluorenylmethyl carbazate, triphenylene, naphthalene, phenanthridine, coumarin, dihydrofluorescein diacetate, p-terphenyl, 3-(4-hydroxyphenyl)propionic acid, 1,2-bis(2-aminophenoxy)ethane-N,N,N',N'-tetraacetic acid, 1-arginine-4-methyl-7-coumarinyl amide hydrochloride, trioxsalen, p-quaterphenyl, 5(6)-carboxyfluorescein diacetate N-succinimidyl ester, fluorescein diacetate, 5(6)-carboxyfluorescein diacetate, 5(6)-carboxy-2',7'-dichloro fluorescein diacetate n-succinimidyl ester, 2-ethylnaphthalene, 2,5-diphenyloxazole, 4-nitrophenyl phosphate disodium salt, 4-nitrophenyl phosphate disodium salt, 4-nitrophenyl phosphate disodium salt, 5-methoxypsoralen, 3,3-dimethyl-2-(4-dimethylaminostyryl)-1-octadecylindolium perchlorate, 4-methylumbelliferyl palmitate, 4-methylumbelliferyl enanthate, 4-methylumbelliferyl oleate, 4-methylumbelliferyl acetate, 4-methylumbelliferyl acetate, 4-methylumbelliferyl butyrate, 4-methylumbelliferyl-n-acetyl-alpha-d-neuraminic acid sodium salt dihydrate, N,N'-bis(salicylidene)ethylenediamine, 4-methylumbelliferyl-beta-d-galactopyranoside, 4-methylumbelliferyl-beta-d-glucuronide trihydrate, 4-methylumbelliferyl-beta-d-glucopyranoside, 4-methylumbelliferyl-n-acetyl-beta-d-glucosaminide dihydrate, 4-methylumbelliferyl-alpha-d-glucopyranoside, 4-methylumbelliferyl-alpha-d-galactopyranoside, 8-nonanoyloxypyrene-1,3,6-trisulfonic acid trisodium salt, 6-(p-toluidino)-2-naphthalene sulfonic acid, 6-(p-toluidino)-2-naphthalene sulfonic acid sodium salt, 4-methylumbelliferyl phosphate, 4-methylumbelliferyl phosphate disodium salt, 2-naphthol, 7-hydroxy-4-methyl-2(1H)-quinolone, quinine hydrochloride dihydrate, calcein blue, N-succinimidyl 7-hydroxy-4-coumarinylacetate, 4-methylumbelliferyl 4-guanidino benzoate hydrochloride monohydrate, 7-ethoxycoumarin, 4-heptadecyl umbelliferone, glutaryl-1-phenylalanine 4-methyl-7-coumarinylamide, 4-(trifluoromethyl)umbelliferyl-beta-d-glucopyranoside, 4-(trifluoromethyl) umbelliferyl-beta-d-galactopyranoside, umbelliferone, 1-alanine-4-methyl-7-coumarinylamide trifluoroacetate, 3,4-dimethylumbelliferone, 1-leucine-4-methyl-7-coumarinyl amide hydrochloride, N-succinimidyl 7-hydroxy-4-methyl- 3-coumarinylacetate, firefly luciferin sodium salt, firefly luciferin, trans, trans-1,4-diphenyl-1,3-butadiene, 4-benzylamino-7-nitrobenzofurazan, 4-bromomethyl-7-methoxycoumarin, 1,4-diacetoxy-2,3-dicyanobenzene, 7-methoxy-4-methylcoumarin, 7-ethoxy-4-methylcoumarin, 3-carboxyumbelliferyl-beta-d-galactopyranoside, 1-naphthol, 2-(1-naphthyl)-5-phenyloxazole, 1,5-diaminonaphthalene, 4-methylumbelliferyl-N,N'-diacetyl-beta-d-chitobioside monohydrate, 3-carboxyumbelliferyl-beta-d-galactopyranoside N-succinimidyl ester, 3-(2-benzothiazolyl)umbelliferone, 3-phenylumbelliferyl phosphate hemipyridine salt, 7-ethoxy-4-(trifluoromethyl)coumarin, 2-(4,4,4-trifluoroacetoacetyl)naphthalene, 7-methoxy-4-(trifluoromethyl)coumarin, 4-methylumbelliferyl sulfate potassium salt, dansyl cadaverine, 9,10-bis-N-(2-dimethylaminoethyl)methylamino methylanthracene bis-zinc chloride complex, 11-(5-dimethylamino naphthalene-1-sulfonyl amino) undecanoic acid, psoralen, dansylhydrazine, N-(iodoacetaminoethyl)-1-naphthylamine-5-sulfonic acid, 4-chloro-7-nitrobenzofurazan, 4-chloro-7-nitrobenzofurazan, 4-chloro-7-nitrobenzofurazan, dansyl-1-tyrosyl-1-valyl-glycine trifluoroacetate, 3-(dansylamino) phenylboronic acid, bisbenzimide, 3-phenylumbelliferone, 4-methylumbelliferyl-N,N',N'''-triacetyl-beta-chitotrioside, bisbenzimide, 7-methoxycoumarin, 1-methylpyrene, 2-4-(iodoacetamido) phenyl-6-methylbenzothiazole, xanthotoxin, 6,7-diethoxy-4-methylcoumarin, 2,3-diaminonaphthalene, 1-pyrenebutyric acid, 4,4'-diisothiocyanato stilbene-2,2'-disulfonic acid disodium salt, 6-(1-pyrenyl)hexanoic acid, 1-pyrenedodecanoic acid, 1-pyrenedecanoic acid, 7-hydroxycoumarin-3-carboxylic acid, pyrene-1-carboxylic acid, 4-dimethylamino-1-naphthyl isothiocyanate, quinine sulfate dihydrate, 6-methoxy-1-(3-sulfopropyl)quinolinium monohydrate, pyrene-1-sulfonic acid sodium salt, pyrene-1-carboxaldehyde, 3-bromomethyl-7-methoxy-1,4-benzoxazin-2-one, quinine anhydrous, 2-amino-5-(6-carboxylndol-2-yl)-phenol-N,N,O-tetraacetic acid potassium salt, 4-(6-methyl-2-benzothiazolyl)phenyl isocyanate, 4-methylumbelliferyl-alpha-d-mannopyranoside, 3-(2-benzoxazolyl)umbelliferyl octanoate, 2-(2-amino-5-methylphenoxy)methyl-6-methoxy-8-aminoquinoline-N,N,N',N'-tetraacetic acid tetrakis (acetoxymethyl ester), cholesteryl pyrene-1-carboxylate, 1,6-diphenyl-1,3,5-hexatriene-4'-propionic acid, 6,7-dimethoxy-4-(trifluoromethyl)coumarin, 3-(2-benzoxazolyl) umbelliferyl acetate, n-hexadecylpyrene-1-sulfonamide, 1,6-diphenyl-1,3,5-hexatriene, 7-amino-4-methyl-3-coumarinylacetic acid, pyrene, phthalocyanine, phthalocyanine, 7-amino-4-methylcoumarin, 4-bromomethyl-6,7-dimethoxycoumarin, dihydroethidium, 1-(ethoxycarbonyl methyl)-6-methoxy quinolinium bromide, 1,6-diphenyl-1,3,5-hexatriene-4'-trimethylammonium tosylate, 5-dimethylamino naphthalene-1-sulfonyl fluoride, 1,8-diamino naphthalene, 8-amino naphthalene-1,3,6-tri sulfonic acid disodium salt, 1,4-bis(5-phenyl-2-oxazolyl)benzene, N-succinimidyl 7-methoxycoumarin-3-carboxylate, 7-hydroxy-n-octadecylcoumarin-3-carboxamide, 4-(4-dimethylamino styryl)-1-octadecylpyridinium perchlorate, 4-chloro-7-sulfobenzofurazan ammonium salt, 3-octadecanoyl umbelliferone, 7-methoxycoumarin-3-carboxylic acid, 7-hydroxy-4-methyl-3-coumarinylacetic acid, 6,7-dihydroxy-4-methylcoumarin, anthracene-9-carbonyl cyanide, hydroxystilbamidin-bis-methansulfonate, N,N-dimethyl-6-propionyl-2-naphthylamine, fura-2, N,N-dimethyl-6-dodecanoyl-2-naphthylamine, 6,8-diacetoxypyrene-1,3-disulfonic acid disodium salt, 2-(4-dimethylaminostyryl)-3-octadecylbenzo thiazolium perchlorate, 7-hydroxy-4-coumarinylacetic acid, 6,7-dihydroxy-4-(trifluoromethyl) coumarin, 8-hexadecanoyl oxypyrene-1,3,6-trisulfonic acid trisodium salt, 8-dodecanoyl oxypyrene-1,3,6-trisulfonic acid trisodium salt, cholesteryl anthracen-9-carboxylate, 5,6-benzocoumarin-3-carbonyl chloride, 3-acetyl umbelliferone, 5-dimethylamino naphthalene-1-sulfonyl chloride, 8-anilino naphthalene-1-sulfonic acid ammonium salt, 4-methyl umbelliferone (beta), 11-(pyrene-1-sulfonylamino) undecanoic acid, 3,3'-diethylthia carbocyanine iodide, monochlorobimane, trans-4'-hydrazino-2-stilbazole dihydrochloride, 3,6,8-tris(dimethylamino sulfonyl)-1-pyrenyl phosphate pyridine salt, 1-(4-methoxyphenyl)-6-phenyl hexatriene, 9,10-anthracendiyl-bis-(methylen)-dimalonsaure, 12-(anthracene-9-carbonyloxy)stearic acid, 8-oleoyloxypyrene-1,3,6-trisulfonic acid trisodium salt, 8-octanoyloxypyrene-1,3,6-trisulfonic acid trisodium salt, 8-butyryloxypyrene-1,3,6-trisulfon acid trisodium salt, 8-butyryloxy-N,N,N',N,N'',N''-hexa methylpyrene-1,3,6-trisulfonamide, 12-oxo-12-(1-pyrenyl)dodecanoic acid, 4-(trifluoromethyl)umbelliferone, 6,7-dihydroxy-4-coumarinylacetic acid, 3,3'-dioctylthia carbocyanine iodide, 7-octadecyloxy-3-3-(3-sulfopropyl)-2-benzothiazolylio coumarin, 3-(2-benzothiazolyl)-7-octadecyloxy coumarin, 3-methyl-2-7-octadecyloxy-3-coumarinyl benzothiazolium methosulfate, 8-tetradecyloxypyrene-1,3,6-trisulfonic acid trisodium salt, dibromobimane, 8-acetoxy-N,N,N',N',N'',N''-hexamethylpyrene-1,3,6-trisulfonamide, n-(7-dimethylamino-4-methyl-3-coumarinyl)maleimide, 7-(diethylamino) coumarin-3,4-dicarboxylic acid, monobromobimane, N-(1-leucyl)-2-aminoacridone, N-(s-benzyl-1-cysteinyl)-2-aminoacridone, n-(n-succinyl-1-phenylalanyl)-2-aminoacridone, n-(n-glutaryl-1-phenylalanyl)-2-aminoacridone, n-(n-tosyl-1-phenylalanyl)-2-aminoacridone, benzofluoranthene, perylene, octadecyl 7-hydroxycoumarin-3-carboxylate, 8-hexadecyloxy pyrene-1,3,6-trisulfon acid trisodium salt, 8-dodecyl oxypyrene-1,3,6-trisulfonic acid trisodium salt, 8-hydroxypyrene-1,3,6-trisulfonic acid trisodium salt, 7-acetoxy-1-methylquinolinium iodide, 8-octadecyloxy pyrene-1,3,6-trisulfonic acid trisodium salt, 8-decyloxy pyrene-1,3,6-trisulfonic acid trisodium salt, 8-methoxypyrene-1,3,6-trisulfonic acid trisodium salt, 1-(4-nitrophenyl)-6-phenylhexatriene, 6,8-dihydroxypyrene-1,3-disulfonic acid disodium salt, 7-hydroxy-1-methylquinolinium iodide, protoporphyrin, protoporphyrin-dimethyl ester, 7-(diethylamino) coumarin-3-carboxylic acid, N-succinimidyl 3-(2-benzothiazolyl)umbelliferone-4-carboxylate, 3-(5-chloro-2-benzoxazolyl)-4-cyanoumbelliferyl phosphate pyridine salt, thioflavine, 10-(3-sulfopropyl)acridinium betain, 10-(3-sulfopropyl)acridinium betain, 3-(5-chloro-2-benzoxazolyl)-4-cyanoumbelliferone, N-succinimidyl 7-hydroxycoumarin-3-carboxylate, 7-(diethylamino) coumarin-3-carbohydrazide, 8-(beta-d-galactopyranosyl oxy)-N,N,N',N',N'',N''-hexamethylpyrene-1,3,6-trisulfonamide, actinomyc in, 2-(4-dimethylaminostyryl)-3-methylbenzoxazolium perchlorate, 8-aminopyrene-1,3,6-trisulfonic acid trisodium salt, 2-aminoacridone, phenazine, lucifer yellow dipotassium salt, lucifer yellow dilithium salt, lucifer yellow dilithium salt, N-succinimidyl 7-(diethylamino) coumarin-3-carboxylate, 7-(diethylamino) coumarin-3-carbonyl azide, 8-isothiocyanato pyrene-1,3,6-trisulfonic acid trisodium salt, 9-(2-carboxy-2-cyanvinyl)-julolidin-N-succinimidylester, 9-(2,2-dicyanvinyl)-julolidin, 9-(2-carboxy-2-cyanvinyl)-julolidin, 4-nitro-4'-(octadecylamino) stilbene, 4-(dioctadecylamino)-4'-nitrostilbene, proflavine hemisulfate dihydrate, 3-(2-benzothiazolyl)-7-(diethylamino) coumarin-4-carboxylic acid, benzo ninhydrin monohydrate, 8-hydroxypyrene-1,3,6-trisulfonic acid trisodium salt, N,N'-dimethyl-9,9'-biacridinium dinitrate, N,N'-dimethyl-9,9'-biacridinium dinitrate, tris(4,7-diphenyl phenanthrolin) ruthenium(ii)bis-complex, 3-(2-benzothiazolyl)-7-(diethylamino) coumarin, 2-(4-dimethylaminostyryl)-1-methylquinolinium iodide, 11-(7-nitrobenzofurazan-4-ylamino) undecanoic acid, 6-(7-nitrobenzofurazan-4-ylamino) hexanoic acid, 12-(7-nitrobenzofurazan-4-ylamino) dodecanoic acid, resorufin-beta-d-galactopyranoside, resorufin phosphate pyridine salt, resorufin-beta-d-glucopyranoside, 4-fluoro-7-nitrobenzofurazan, 1,3'-diethyl-4,2'-quinolyl thiacyanine iodide, doxorubicin hydrochloride, 4-(4-dipentadecyl aminostyryl)-1-methylpyridinium iodide, 2-(4-diethylamino styryl)-1-methylpyridinium iodide, dimidium bromide, ethidium bromide solution, ethidium bromide, ethidium bromide, ethidium bromide, fluorescein-5(6)-carboxamido caproic acid, 2',7'-bis(2-carboxyethyl)-5(6)-carboxyfluorescein, propidium iodide, 2-(4-dimethylaminostyryl)-1-methylpyridinium iodide, 3,3'-diheptyloxa carbocyanine iodide, 3,3'-diethyloxa carbocyanine iodide, 3,3'-dipropyloxa carbocyanine iodide, 3,3'-dipentyloxa carbocyanine iodide, 3,3'-dioctadecyloxa carbocyanine perchlorate, 3,3'-dihexyloxa carbocyanine iodide, 3,3'-dibutyloxa carbocyanine iodide, 4-(4-diethylaminostyryl)-1-methylpyridinium iodide, fluorescein isothiocyanate dextran, 5(6)-carboxyfluorescein, fluorescein sodium, fluorescein (free acid), fluorescein-5(6)-carboxamidocaproic acid n-succinimidyl ester, fluorescein isothiocyanate dextran, fluorescein isothiocyanate dextran, 5-carboxy-fluorescein n-succinimidylester, 5-carboxy-fluorescein, 6-carboxy-fluorescein, 6-carboxy-fluorescein N-succinimidylester, fluorescein-5-thiosemicarbazide, 5-(iodoacetamido) fluorescein, ethidium homodimer, 10-dodecylacridine orange bromide, 10-octadecylacridine orange bromide, calcein disodium salt, 10-nonylacridine orange bromide, fluorescein mercuric acetate, rhodamine 110 chloride, N'-octadecyl fluorescein-5-thiourea, fluo 3, 5(6)-carboxy-2',7'-dichloro fluorescein, 3-(2-benzoxazolyl)-4-cyanoumbelliferone, 9-(2-carboxyphenyl)-6-dimethylamino-3-xanthenone sulfate, rhodamine 116 perchlorate, eosin, rhodamine 5-3(4)-(aminocarbonyl)-4(3)-carboxybenzene sulfonyl fluoride, rhodamine B 5-3(4)-(aminocarbonyl)-4(3)-carboxybenzene sulfonyl fluoride, eosin yellowish, 5,10,15, 20-tetrakis(1-methyl-4-pyridinio) porphyrin tetra(toluene-4-sulfonate), eosin 5-isothiocyanate, rhodamine 19 perchlorate, rhodamine 6 G, rhodamine 6 G tetrafluoroborate, rhodamine 800, 3,3'-diocta decylthiacarbocyanine perchlorate, resorufin butyrate, resorufin acetate, 5(6)-carboxytetra methylrhodamine N-succinimidyl ester, 5(6)-carboxytetra methylrhodamine N-succinimidyl ester, 5(6)-carboxytetra methylrhodamine, tetramethyl rhodamine B isothiocyanate, rhodamine B isothiocyanate, 6-carboxy-tetramethyl rhodamine N-succinimidylester, 5-carboxy-tetramethyl rhodamine N-succinimidylester, 6-carboxy-tetramethyl rhodamine, 5-carboxy-tetramethyl rhodamine, n-octadecanoyl-nile blue, streptavidin-B-phycoerythrin, biotin-B-phycoerythrin, 1,1'-dioctyl-3,3,3',3'-tetramethyl indocarbocyanine iodide, 3,3'-dihexylthia carbocyanine iodide, 1,1'-dihexyl-3,3,3',3'-tetramethylindocarbo cyanine iodide, bengal rose b, tetramethylrhodamine methyl ester perchlorate, 1,1'-dipropyl-3,3,3',3'-tetramethyl indocarbocyanine iodide, 1,1'-dipentyl-3,3,3',3'-tetramethyl indocarbocyanine iodide, 1,1'-dibutyl-3,3,3',3'-tetramethyl indocarbocyanine iodide, tetramethyl rhodamine ethyl ester perchlorate, 2-(4-dimethylaminostyryl)-1-octadecyl pyridinium perchlorate, 1,1'-dioctadecyl-3,3,3',3'-tetramethyl indocarbocyanine perchlorate, rhodamine B, rhodamine B octadecyl ester perchlorate, meroeyanine 540, 3,3'-dipropyl thiacarbocyanine iodide, sulforhodamine b 5-acid fluoride, 3,3'-dipentyl thiacarbocyanine iodide, 1,1'-diethyl-3,3,3',3'-tetramethyl indocarbocyanine iodide, 3,3'-dibutylthia carbocyanine iodide, sulforhodamine B 2-acid fluoride, 3,3'-diheptylthia carbocyanine iodide, sulforhodamine B acid chloride, sulforhodamine B monosodium salt, rhodamine 101, 5(6)-carboxy-x-rhodamine, sulforhodamine Q 5-acid fluoride, 6-carboxy-X-rhodamin-N-succinimidylester, 5-carboxy-x-rhodamin-n-succinimidylester, 5-carboxy-X-rhodamine (5-ROX), 6-carboxy-X-rhodamine (6-Rox), 5(6)-carboxy-X-rhodamine N-succinimidyl ester, 3,3'-diethyloxa dicarbocyanine iodide, sulforhodamine Q 2-acid fluoride, sulforhodamine 101 acid chloride, sulforhodamine 101 free acid, naphthofluorescein, biotin-c-phycocyanin, cresyl violet perchlorate, 5(6)-carboxy naphthofluorescein N-succinimidyl ester, octaethylporphine, azure A, fluorescent red 646, fluorescent red 646, fluorescent red 646, 1,1'-dioctadecyl-3,3,3',3'-tetramethylindo dicarbocyanine perchlorate, meso-tetraphenylporphyrin, azure B, 3,3'-dipropyl thiadicarbocyanine iodide, 3,3'-diethyl thiadicarbocyanine iodide, 4,5-benzo-5'-(n-succinimidyl-oxycarbonyl-methyl)-1'-ethyl-3,3,3',3'-tetramethyl-1-(4-sulfobutyl)indodicarbocyanine, 4,5-benzo-5'-(iodoacetaminomethyl)-1',3,3,3',3'-pentamethyl-1-(4-sulfobutyl)indodicarbocyanine, 1,1'-bis (4-sulfobutyl)-11-(4-isothiocyanatophenylthio)-3,3,3',3'-tetramethyl-10,12-trimethyleneindo tricarbocyanine monosodium salt, 3,3'-diethyloxa tricarbocyanine iodide, 3,3'-diethylthia tricarbocyanine iodide, 2,5-bis(4-biphenylyl)-1,3,4-oxadiazole, 1-naphthylacetic anhydride, 5-dimethylamino naphthalene-1-sulfonamide, diphenylmaleic anhydride, carbazole-9-carbonyl chloride, n-(3-fluoranthyl) maleimide, n-4-(2-benzimidazolyl)phenyl maleimide, 6-hydroxy-2-naphthyl disulfide, 2-(2-amino-5-methylphenoxy) methyl-6-methoxy-8-aminoquinoline-N,N,N',N'-tetraacetic acid tetrapotassium salt, 1,2-phenylene diamine dihydrochloride, 1,2-phenylene diamine, 1,2-phenylene diamine, 2-(4-maleimidophenyl)-6-methylbenzothiazole, meso-1,2-bis(4-methoxyphenyl)ethylenediamine, N-(1-pyrenyl)maleimide, 1,2-diacetylbenzene, 4',6-diamidino-2-phenylindole dihydrochloride, 4-methylumbelliferyl-alpha-1-fucopyranoside, isonicotinic hydrazide, 4-hydroxybenz hydrazide, 9-chloromethyl-anthracene, 4-methylumbelliferyl-beta-d-lactoside, diphenylborinic anhydride, 4,5-methylenedioxy-1,2-phenylene diamine dihydrochloride, malonamide, Z-glycyl-1-proline-4-methyl-7-coumarinylamide, 1,3-cyclo hexanedione, 8-ethoxy-N,N,N',N',N",N"-hexamethylpyrene-1,3,6-trisulfonamide, 4-(trifluoromethyl)umbelliferyl phosphate disodium salt, 4-(trifluoromethyl)umbelliferyl enanthate, 4-(trifluoromethyl)umbelliferyl oleate, 7-fluorobenzofurazane-4-sulfonic acid ammonium salt, 4-(trifluoromethyl)umbelliferyl butyrate, 2-methoxy-2,4-diphenyl-3(2h)-furanone, 4-(trifluoromethyl)umbelliferyl acetate, 8-methoxy-N,N,N,N',N",N"-hexa methylpyrene-1, 3,6-trisulfonamide, 8-acetoxypyrene-1,3,6-trisulfonic acid trisodium salt, 4-hydrazino-7-nitrobenzofurazane, 5(6)-carboxy-2',7'-dichloro fluorescein diacetate, 4',5'-bis N,N-di (carboxymethyl)aminomethyl fluorescein, 2',7'-bis(2-carboxyethyl)-5(6)-carboxy fluorescein tetrakis (acetoxymethyl)ester, fluorescein dilaurate, fluorescein dibutyrate, fluorescein diacetate 5-isothiocyanate, 5(6)-carboxyeosin diacetate, 5-maleimido-eosin, naphthofluorescein diacetate, 5(6)-carboxynaphtho fluorescein diacetate N-succinimidyl ester, 4-dimethylamino-4'-nitrostilbene, 1,4-bis(2-methylstyryl)benzene, 1,4-bis(4-methyl-5-phenyl-2-oxazolyl)benzene, 2-(4-biphenylyl)-5-phenyl-1,3,4-oxadiazole, 2-(4-tert-butylphenyl)-5-(4-biphenylyl)-1,3,4-oxadiazole, 2-(p-tolyl)benzoxazole, 2-(4-biphenylyl)-6-phenylbenzoxazole, 4-hydroxycoumarin and 2,5-diphenyl-1, 3,4-oxadiazole.

Similarly fluorescent brighteners, also commonly known as optical brighteners, can be used as UV absorbers to extend the shelf life of the dosimeter. Optical brighteners, e.g., derivatives of stilbene and benzoxazol, are substances that are added to a textile or paper to increase the apparent light reflectance in the visible region by the conversion of ultraviolet radiation into visible light and so to increase the apparent brightness or whiteness. Fluorescent whitener of color index (C.I.) C.I.24, C.I.31, C.I.33, C.I.71, C.I.85, C.I.113, C.I.140, C.I.184, C.I.199, C.I.199, C.I.199:1, C.I.199:1, C.I.199:1, C.I.220, C.I.220, C.I.351, C.I.367, C.I.378 can be used. Optical brighteners, such as amino-anilino-triazyl stilbene, 4-4'-diaminostilbene-2-2'-disulphonic acid, 4-4'-dinitrostilbene-2-2'-disulphonic acid, 2,2'-(2,5-thiophenediyl)bis[5-tert-butylbenzoxazole] and 2,5-thiophenediylbis(5-tert-butyl-1, 3-benzoxazole) can be used to extend the shelf life of the dosimeter.

The diacetylenes/dosimeter can also be protected from UV and sunlight by adding photochromic materials instead of or along with UV absorbers. Photochromic compounds change color when exposed to ultraviolet light. These compounds are colorless indoor and turn into a vibrant color outdoor. These compounds become intensely colored within seconds in direct sunshine and return to clear within minutes indoors. Even on days when the sky is fairly overcast, approximately 80% of the UV light will still get through the clouds and photochromic compounds will change quite significantly. Photochromic compounds can be used in various forms, such as paints, inks, and plastics, such as polyvinyl chloride, polypropylene cellulose acetate butyrate, polyvinylacetate, urethanes, acrylics and are soluble in most organic solvents.

The photochromic compounds can be selected from the general classes of spiroxazines, spiropyrans and chromenes with photochromic properties imparted. A very large number of photochromic dyes of this type have been described in the literature and are commercially available. Usable spiroxazine dyes have been described notably in U.S. Pat. Nos. 3,562,172, 4,634,767, 4,637,698, 4,720,547, 4,756,973, 4,785,097, 4,792,224, 4,816,584, 4,831,142, 4,909,963, 4,931,219, 4,936,995, 4,986,934, 5,114,621, 5,139,707, 5,233,038, 4,215,010, 4,342,668, 4,699,473, 4,851,530, 4,913,544, 5,171,636, 5,180,524, 5,166,345 and in EP-A 0,508,219, 0,232,295, and 0,171,909, among others. Usable chromenes have been described in U.S. Pat. Nos. 567,605, 4,889,413, 4,931,221, 5,200,116, 5,066,818, 5,244,602, 5,238,981, 5,106,998, 4,980,089, 5,130,058, and in EP-A 0,562,915, among others. Useful spiropyrans have also been described in the following general works: (1) Photochromism, G. Brown, Editor, Techniques of Chemistry, Wiley Interscience, Vol. III, 1971, Chapter III. pages 45-294, R. C. Bertelson and (2) Photochromism, Molecules & Systems, Edited by H. Dun, H. Bouas-Laurent, Elsevier 1990, Chapter 8: Spiropyrans, pages 314-455, R. Guglielmetti. The teachings of all these patents and documents are incorporated here by reference. We prepared a thin coating of a mixture of photochromic materials available as catalog #33672 (colorless to blue), catalog #7106 (colorlessto red), catalog #0265 (colorless to purple), catalog #749 (colorless to pink) and catalog #5-3 (colorless to yellow) all obtained from PPG Industries, One PPG Place, Pittsburgh, Pa. 15272. The mixture of photochromic materials was coated in polymethylmethacrylate and polyvinylacetate on a polyester film. The coatings were almost colorless and changed to dark/black when exposed to sunlight. The shelf life of the dosimeter under the sunlight was extended when the dosimeter is protected with a photochromic layer.

In order to extend the shelf life we added the following shelf life extenders in several diacetylenes, such as 344, 166 and 4BCMU. Most of them were effective in extending the shelf life. Some selected shelf life extenders were added in a more than 50 different diacetylenes including alkyl and aromatic urethane derivatives of 2,4-hexadiyn-1,6-diol, 3,5-octadiyn-1,8-diol, 4,6-decadiyn-1,10-diol and 5,7-dodecadiyn-1,12-diol. We often used a mixture of shelf life extenders for a mixture of diacetylenes.

TABLE 2

List of some shelf life extenders tested diacetylenes, such as 344, 166 and 4BCMU.

1,1,1 -tris(4-hydroxyphenyl)ethane , 1,2,4-triazole, 1,3-cyclohexanedicarboxylic acid, 1,5 dihydroxy naphthalene, 10 -nonadecanone, 1-amino-l-deoxy-d-sorbitol, 1-butylimidazole, 1-dodecyl-2-pyrrolidinone, 1-methyl-2-pyrrolidinone, 2-(2H-benzotriazol-2-yl)-6-dodecyl-4-methylphenol, 2,2'-biphenol, 2,2'-dihydroxy 4,4' dimethoxy benzophenone, 2,2'-dihydroxy 4-methoxybenzophenone, 2,2',4,4'-tetrahydroxybenzophenone, 2,2,6,6-tetramethyl 4-piperidinol, 2,3-dihydroxy naphthalene, 2,3,4-trihydroxybenzophenone, 2,3-dihydroxynaphthalene, 2,4-dihydroxybenzophenone, 2,4,6-trihydroxybenzaldehyde, 2,5-di-t-butyl hydroquinone, 2,7-dihydroxynaphthalene, 2-benzoyl benzoic acid, 2-butanone oxime, 2-hydroxy 4-methoxy benzophenone, 2-hydroxy-4-n-octoxybenzophenone, 3-hydroxy diphenyl amine, 3,3',4,4'-benzophenone tetracarboxylic dianhydride, 3,4-diaminobenzophenone, 3,5-dihydroxy benzoic acid, 3-acetamidophenol, 4-(benzeloxy) phenol, 4-(dimethylamino)-benzaldehyde, 4,4'-biphenol, 4,4'-(1,3-phenylene diisopropylidine)bis phenol, 4,4'-(1,4-phenylene diisopropylidine)bis phenol, 4,4'-isopropylidene, 4-acetamidophenol, 4-bromobenzaldehyde, 4-hydroxybenzophenone, 4-hydroxybenzophenone, 4-phenylphenol, 4-pyridinealdoxime, 4-tert-amylphenol, 7-hydroxy-4-methyl coumarin, acetamide, acetanilide, acetone oxime, adipamide, adipic acid, alpha-d-cellobiose octaacetate, aluminum acetylacetonate, aminocaproic acid, ammonium formate, ammonium thiocynate, amylphenol, ascorbic acid, ascorbic acid-6-palmitate, azodicarbonamide, 2,3-thiophenyl bis(5-t-butyl 1,3 benzoxazole), benzamide, benzilic acid, benzoic acid, benzoic acid, ammonium salt, benzophenone, benzophenone hydrazone, benzoquinone dioxime, benzotriazole, benzyl ether, beta-d-glucose pentaacetate, bis (3,4-epoxy cyclohexyl methyl) adipate, bis(2,2,6,6-tetramethyl-4-piperidyl) sebacate, bis(2-ethyl hexyl) maleate, bisphenol A, 2-(2H-benzotriazole-2yl)4-methyl phenol, 2-2'-hedroxy-5-octylphenyl benzotriazole, butanone oxime, camphor, citric acid, cyanuric acid, delta-gluconolactone, d-gluconic acid, diethanolamine, diethyl maleate, diphenylamine, d-isoascorbic acid, di-tert-butyl-4-methyl phenol, diethylamino methyl coumarin, methylesculin, ethyl acetoacetate, sodium salt, ethyl myristate, ethyl salicylate, ethylene carbonate, ethylene glycol diglycidyl ether, ethylenediaminetetraacetic acid, gamma-butyrolactone, glutanic acid, glycerol, glycoxal trimeric dihydrate, hydroquinone, hydroxybenzoic acid, imidazole, inositol, laural gallate, lauric acid, lauryl gallate, lecithin, methoxyhydroquinone, methyl 2,4-dihydroxybenzoate, methyl-3,4,5-trihydroxybenzoate, methyl-3,5-dinitrosalicylate, n-(4-hydroxyphenyl)-2-naphthylamine, n,n' diphenyl-1,4-phenylene diamine, n-4-hydroxyphenyl 2 naphthal amine, n-acytylglycine, n-phenyl-2-naphthylamine, octadeccanamide, oxamide, phenyl ether, phenyl hydroquinone, phthalide, poly(1,2 dihydro-2,2,4-trimethyl quinoline, poly(4-hydroxy-2,2,6,6-tetramethyl-4-piperidine ethanol-alt-1,4-butane-dioic acid), poly(ethyleneimine), propylene carbonate, pyrogallol, resorcinol, resorcinol diacetate, rutin hydrate, salicylaldehyde, salicylaldoxime, salicylanilinde, sorbitol hexaacetate, succidimide, tannic acid, t-butyl hyroquinone, tert-butyl acetoacetate, thiourea, trans-stilbene, tribenzylamine, triethanolamine, trimethylhydroquinone, triphenyl methanol, triphenyl phosphate, tris (2-chloroethyl) phosphite, tris (hydroxymethyl) aminomethane, uracil, dimethyl sulfoxide, sodium sulphite, hydroxyalkylhydroxylamine, morpholine, and urea.

Most of the dosimeters commercially available have either positive or negative effect of temperature of radiation (Standards on Dosimetry for Radiation Processing, ASTM International, 100 Barr Harbor Drive, West Conshohochen, Pa., 2002). Some of them display a higher dose while the others display lower dose if the temperature is higher and vice versa. There is need for a color changing dosimeter which has essentially no effect of temperature of radiation, because the user of the dosimeter could be in Alaska in winter or could be in Arizona in summer. This type of dosimeter either should not be used or needs corrections for the temperature, if the temperature of irradiation is known. Hence, it is essential that the color developed for a given dose be the same within normal operating, storage or use temperatures, e.g., minus 40° C. to plus 70° C.

We have found that by adding certain additives, such as oligomers, such as low molecular weight polyester, polyethylene glycol and polypropylene, amides, esters, urethanes, plasticizers and solvents, such as bis(ethyl hexyl) sebacate, by varying the hardness of the binder, by cocrystallization of diacetylenes, by using a proper mixture of diacetylenes and by using proper method of crystallization of diacetylenes, the effect of temperature of irradiation can be minimized and even can be eliminated.

Some of the dosimeters use liquids while others have maximum temperature of storage (Standards on Dosimetry for Radiation Processing, ASTM International, 100 Barr Harbor Drive, West Conshohochen, Pa., 2002). For example, GAF chromic film dosimeter (International Specialty Products, Wayne, N.J.) must be kept below 50-60° C. Hence, there is a need for a dosimeter which is not affected by ambient maximum and minimum temperatures. Some types of personal dosimeters may be laundered where the temperature in the washer and/or drier may reach as high as 90-100° C. Hence, there is a need for a dosimeter which is not affected by ambient storage or accidental heating to anticipated higher temperatures. We have found that the dosimeter can be made laundry resistant by selecting radiation sensitive materials, such as diacetylenes having melting point higher than 100° C.

As a personal dosimeter, the dosimeter must not be affected by ambient light for days to months and under direct sunlight for at least for sometime, such as hours to days and still remain readable under any light. Most of the dosimeters are affected by direct sunlight. They are either protected with opaque material or develop color/dose if exposed to sunlight. Hence, there is need for a dosimeter which is not affected by ambient light for days to months or by direct sunlight from hours to days so it can be easily read. We have found that the effect of UV and sunlight can be minimized by adding UV absorbers, using UV absorbing polymers for the active layer and by applying a coat or layer which absorbs or reflect UV light.

The dosimeter also must not be affected by ambient humidity and accidental high humidity, such as in a normal laundry. Some of the film dosimeter use gelatin as a binder or the radiation sensitive materials are affected by humidity and water. Hence, there is a need for a dosimeter which is not affected by normal ambient humidity for months and accidental exposure of very high humidity at high temperatures for a short time. Effect of humidity can be minimized by using water insoluble binders and polymeric binders which are less permeable to moisture.

Some of the dosimeters, such as Gafchromic film of ISP, Wayne, N.J., don't develop full color instantly. They show some post radiation effect. It takes about a day to develop the rest of the 10-20% of the color. It is desirable to have a dosimeter which develops full color almost instantly. We have found that the dosimeters described here develop full color almost instantly, i.e., in less than a second to minutes.

We have discovered that the presence of solvents, plasticizer and certain solid additives help increase the shelf life and minimize the effect of temperature of radiation. Most of the coatings are obtained by evaporation of solution and hence are limited to certain thickness. Certain polymers, such as polyvinylchloride (PVC) and its copolymers have ability to hold solvents commonly known as plasticizers. Presence of plasticizers and additives help in increasing the radiation sensitivity, minimizing effect of temperature of irradiation and increasing the shelf life. Many polymers have relatively poor stability when melted or heated above certain temperatures. PVC is one of them. It undergoes dehydrochlorination. A variety of heat stabilizers are such organo metallic compounds, such those of tin, zinc, and barium are added to neutralize hydrochloric acid.

In order to facilitate processing of the molten polymers, such as PVC viscosity reducers, such as white spirit, poly (ethylene glycol)monolaurate, alkylphenols, low molecular weight paraffins are added. The heat stabilizers and viscosity reducers have effect on crystallization and properties of diacetylene.

Diacetylenes are known to polymerize only in the solid state. Diacetylenes sometimes crystallize into inactive form or form a solid solution with certain binders. Proper conditions for crystallization of diacetylene must be used for crystallization so that they crystallize into radiation active phases, i.e., phases which polymerize upon irradiation. Proper crystallization of diacetylenes can be achieved by using proper solvents, heat stabilizers, additives, binder and by using proper methods of crystallization and annealing. For example, a diacetylene can be crystallized into an active phase from one solvent while into an inactive form from the other. Similarly, a diacetylene can be made active and crystallize into active phase by annealing from low a low temperature to a higher temperature for a sufficiently long time or vice versa.

Crystallization of diacetylenes can be increased by adding nucleating agents which are usually finely dispersed particles. The same nucleating agents can help in preventing crystallization of polymeric binder because of their high molecular weight.

Diacetylenes develop a variety of colors, such as blue, purple, violet, red, orange and yellow colors upon polymerization. Proper colored element/dosimeter can be achieved by mixing two or more diacetylenes or by cocrystallization of two or more diacetylenes.

Some diacetylenes display positive while others display negative coefficient of temperature of radiation. The effect of temperature of irradiation can be minimized or eliminated by selecting two or more diacetylenes having proper negative and positive coefficient of temperature of radiation. For example, the effect of temperature of radiation can be minimized by mixing two blue diacetylenes, one having positive coefficient of temperature of radiation while the other having negative coefficient of temperature of radiation.

The radiation sensitive element remains active and can keep on accumulating dose unless fixed. In order to archive the exposure/results, the dosimeter needs to be fixed. The dosimeter can be fixed, e.g., by heating the element/dosimeter till diacetylene becomes inactive, crystallizes in to an inactive phase or forms a solid solution with binder or dissolution with other additives and does not re-crystallize in active form. For example, diacetylene 166 can be fixed by heating above about 90° C. and many diacetylenes can be fixed by forming a solid solution with proper binder, e.g., 4BCMU and 344 with polyvinylacetate and polymethylmethacrylate. Many additives, such as trihydroxybenzoic acid which react and/or dissolve the diacetylene can also be used to fix the dosimeter.

We have found that certain compounds, oligomers, such as low molecular weight polyester, polyethylene glycol and polypropylene, amides, esters, urethanes, plasticizers and solvents, such as bis(ethyl hexyl) sebacate when added with diacetylenes, such as 344 and 4BCMU, minimize the coefficient of temperature of radiation.

We have found that effect of temperature of radiation can be minimized by using proper processes for crystallization of diacetylenes from solvent and binder. Processes to be used depend on the nature and concentration of diacetylene, solvent/plasticizer, additives and binder.

Diacetylenes are colorless compounds. Hence, the starting color of the dosimeter can be changed by adding proper dyes or pigments. For example, for a blue diacetylene, addition of a yellow dye provides yellow→yellow green→green→green blue→blue color changes as the diacetylene polymerizes upon irradiation. Similarly, for a red diacetylene, addition of a blue dye will provide blue→purple/violet→red color changes as the diacetylene polymerizes upon irradiation.

The diacetylene used in the element/dosimeter usually would have a coating or a layer of plastic film. These coating and films usually reflect light and hence it becomes difficult to observe the color and to read the color density with a spectrophotometer or an optical densitometer. The reflectance of light can be minimized by using antireflective, antiglare coatings or polarizing films available commercially.

The adhesion of different layers of the elements and the dosimeters can be increased by using proper adhesives or using adhesion promotors in a layer of the element/dosimeter. Adhesives could be pressure sensitive or hot melt type.

The dosimeter badge can be assembled in a variety of ways. Processes to be used to make them will depend upon the design of the badge, the nature of the element and other components and the intended use. The steps of one such process are illustrated in FIG. 19.

The shape of the elements and badges depend upon the use. They could be square, rectangular, triangular, hexagonal etc (with or without rounded corners) or could be oval or circular. They could have many designs and formats. For example, they could be in the form of tape, bandage, patch, sticker, film, plaque and rod.

By selecting proper binder, shelf life extenders, and other additives, a diacetylene can be made to form a solid solution with the polymeric binder. Diacetylenes will not polymerize in the solid solution form and hence the element and the badge made from it can essentially be stored indefinitely. The diacetylene can be made active by annealing the element above or near the melting point or dissolution temperature of the diacetylene. Under this condition, the diacetylene would melt/dissolve and form a separate phase. Upon cooling, the phase separated diacetylene will crystallize. The active form of crystalline diacetylenes can be polymerized upon radiation. We have found that many diacetylenes form a solid solution with certain binders/plasticizers and can be phase separated at a higher temperature and crystallized into an active phase upon annealing or cooling.

It is not necessary to use a binder solution or melt polymers to make the element. The active layer can be prepared by using monomers, oligomers and mixtures thereof which can be polymerized with UV or visible light. UV curable inks and coating formulation are commercially available.

A large number of monomers and oligomers are used to make polymers. They include unsaturated monomers, such as olefins, vinyls, acrylates, and methacrylates, such as methylmethacrylate, methylacrylate, styrene, acrylic acid, butane diol 1,4-dimethacrylate, diethylene glycol diacrylate, diethylene glycol dimethacrylate, ethylene glycol dimethacrylate, hexanediol-1,6-dimethacrylate, methylstyrene-alpha-pentaerylthriol triacrylate, polyethylene glycol dimethacrylate, polypropylene glycol dimethacrylate, triethylene glycol dimethacrylate, 4-(Vinyloxy) butyl benzoate, bis[4-(vinyloxy)butyl]adipate, bis[4-(vinyloxy)butyl]succinate, 4-(vinyloxymethyl)cyclohexylmethyl, bis[4-(vinyloxy)butyl] isophthalate, bis[4-(vinyloxymethyl)cyclohexylmethyl], tris [4-(vinyloxy)butyl]trimellitate, 4-(vinyloxy)butyl stearate, bis[4-(vinyloxy)butyl]hexanediylbiscarbamate, bis[[4-[(vinyloxy)methyl]cyclohexyl]methyl], bis[[4-[(vinyloxy)methyl]cyclohexyl]methyl], and bis[4-(vinyloxy)butyl](4-methyl-1,3-phenylene). These and other monomers and oligomers that can be polymerized by radical and cationic polymerization using peroxide and ultraviolet light are described in "Chemistry and Technology of UV and EB Formulations for Coatings, Inks, & Paints" by Oldring, P. K. T., Ed.; SITA Technology: London. A large number of monomers, oligomers and polymers commercially available are listed in catalogs, such as Aldrich Chemical, Milwaukee, Wis.

We dissolved radiation sensitive materials, such as diacetylenes in monomers and oligomers, such as butane-1,4-diol dimethacrylate, diethylene glycol diacrylate, diethylene glycol dimethacrylate, ethylene glycol dimethacrylate, hexane-1,6-diol dimethacrylate, polyethylene glycol diacrylate, pentaerythrol triacrylate, polypropylene glycol diacrylate, polypropylene glycol dimethacrylate, triethylene glycol dimethacrylate and diallyldiglycolcarbonate and polymerized using catalysts, such as benzoyl peroxide and promotors, such as N,N-Dimethyl-p-toluidine and with long wavelength UV light using benzoin methyl ether as a catalyst. The resultant shaped-articles were irradiated with X-ray. The shaped-articles developed color. The preferred monomers and oligomers are olefins, vinyl and acrylates. The most preferred monomers and oligomers are methylmethacrylate and polyethylene glycol dimethacrylate.

If one uses photoinitiators, such as 5,7-diiodo-3-butoxy-6-fluorone the polymerization can be achieved with visible light.

When a person receives about 1,000 rads of high energy radiation, such as gamma ray, the mortality is almost assured. As a personal dosimeter, it should be able to read dose over very wide dose range, e.g., 0-10, 0-50, 0-100, 0-200, 0-500 and 0-1,000 rads just by comparing the color developed by the radiation sensitive element with a color reference chart with reasonable accuracy, such as 10-20% of the total dose. The color reference chart can be created by matching the color of the radiation sensitive element irradiated at different dosages with the color reference chart. The color reference chart should have a gradation of colors matching to the color developed by the radiation sensitive element over the dose range. The color on the reference chart could be continuous from very light (colorless) to very dark or in steps. The dose, the action to be taken and/or effect of radiation at that dose can be printed on the color reference chart. As a personal dosimeter, it should warn or alert the person using it from the color developed by the element. The color of the reference chart must match the color of the element under all normal light conditions, such as incandescent, fluorescence, sunlight and shade. This can be achieved by mixing proper dyes and pigments for the color reference chart till they match the spectra of the diacetylenes used.

Along with the dose number messages, such as what that dose can do and what action should be taken.

If required, the dose can be accurately monitored with a spectrophotometer or an optical densitometer. A calibration curve can be created by irradiating the element with different dosages of high energy radiation and plotting optical density versus dose. An instrument can be designed to read the bar code and other information along with the dose.

The dosimeter can have many security features and convenient features, such as bar codes to identify the dosimeter and magnetic strip to store and read info on the dosimeter. The dosimeter could have many other security features, such as hologram and UV fluorescence coatings.

The dosimeter can be printed with some basic information, such as introduction, how to use and read the dosimeter, effect of radiation and action to be taken in case of radiation exposure, suppliers, batch number, logo of the user group, whom to contact in case of emergency or dispute, name of the user or space to write such name, etc.

It is very difficult to create a color reference chart from commercially available inks that match the color of the irradiated element under any and all light conditions. However, it possible to create a color reference chart using the same diacetylene polymerized into the desired colors to create a color reference chart, either with X-ray or UV light. The color reference chart created by this method would match the color of the element under any and all light conditions. We created a color reference chart by exposing a series of elements made from a thin coating of a diacetylene 344 as with 254 nm UV light for different periods of time. This color reference chart matched the color element of diacetylene 344 irradiated with different dosages of X-ray under any and all lights, including some uncommon lights, such as sodium and mercury lights. The diacetylene to make the color reference chart (referred to as color reference chart-diacetylene) which polymerizes to the same colors (i.e., having almost the same visible spectra) as the diacetylene used for making the element (referred to as element-diacetylene) but the color reference chart-diacetylene (1) should be significantly (e.g., 100 times) less sensitive to X-ray and (2) should have the least thermal reactivity. A color reference chart created from such a diacetylene will not develop color with X-ray but will match the color of the irradiated element under any and all lights.

We have also found that it is possible to eliminate the color reference chart entirely. In order to demonstrate the feasibility of the concept, we exposed an element through a circular mask with increased exposure of 254 nm UV light. Circular dots of increasing intensities were obtained (FIG. 22a). The rest of the element was unexposed. The whole element was then irradiated with the UV light and 100 KeV X-ray for different periods of time and the element was photographed. The images on the photograph are represented in FIGS. 22b through 22g. As the radiation dose increased, the pre-exposed dots started disappearing as shown in photographs in FIGS. 22b through 22g.

The results indicates that if the numbers are printed instead of the dots with a UV lamp through a mask or printed with a UV laser, with the UV exposure proportional to the dose of X-ray to be monitored, the numbers will disappear. The dose can be read from the lowest readable number. A schematic presentation of such an element is shown schematically in FIG. 23. The dose to be monitored can be printed first either with a mask or a laser (e.g., FIG. 23a). The element can then be covered with a UV absorbing film to protect it from UV/sun light. When the element is exposed to X-ray, the element (including the number) will start developing color. At one point, there will be little difference between the UV exposed number and the surrounding element. At that point/dose, the UV exposed number will be of almost the same color-intensity as that the rest of the element and the number will become almost invisible (e.g., as shown in schematically in FIG. 23b). At a higher dose, corresponding other numbers will become almost invisible (e.g., as shown in FIG. 23c). This type of dosimeter will be self-reading and smaller in size because it would not need a color reference chart.

Someone can leave the dosimeter under intense sunlight, UV or laser light. Hence, the dosimeter should, preferably, indicate such accidental or intentional tampering by having a UV indicator. The UV indicator will change color if the indicator is over exposed to UV/sunlight. The dosimeter should have a temperature indicator in case it is not supposed to exceed a predetermined temperature which could have an adverse effect on its performance. Hence, the dosimeter should preferably have a temperature indicator. The dosimeter usually has a shelf life of months to years. The dosimeter should have a shelf life, normally known as time-temperature, indicator to indicate when its useful life is expired. Hence, the dosimeter should have a time-temperature or shelf life indicator. A part of the dosimeter element can be covered with a thin aluminum foil or sandwiched between two thin aluminum foils. In case of tampering with UV light, the foil can be removed and the dose can be read.

Diacetylenes and many other radiation sensitive systems used for making the dosimeter polymerize/develop colors under two undesirable conditions, (1) UV exposure, e.g., from sunlight and (2) thermal annealing e.g., storage at room temperature. There is a need for UV/sunlight indicator. If the element is over exposed to UV/sunlight it would indicate via color change. The formulations which are sensitive to UV/sunlight but not to X-ray dose range of the element can be used as UV/sunlight indicator. The color development due to storage at RT determines the shelf-life. An expiration date can be printed on the dosimeter but there is no assurance that it will be stored at room temperature (~25° C.) by its user. If stored at a higher temperature for a prolonged time, the color development can be misinterpreted as an exposure to X-ray radiation. Hence, there is a need for a time-temperature indicator to indicate expiration of shelf-life. The time-temperature indicator will determine the integral value of time and temperature of storage.

The color developments due to the sunlight and storage are referred to as false-positives. It is not possible to eliminate the effect of prolonged UV exposure (unless protected with an opaque cover) and storage under ambient conditions (unless stored in a freezer). Hence, there is a need for monitoring shelf-life and UV exposure.

Time-temperature indicators for monitoring shelf-life, e.g., that of perishables are reported in the literature (e.g., U.S. Pat. No. 5,053,339). Many dyes, e.g., leucocrystal violet change/develop color when exposed to UV/sunlight. Some formulations, such as pentamethoxytriphenylmethane in halopolymers, such as polyvinyl chloride change color when subjected to exposure to UV/sunlight and time-temperature.

A message, such as "expired" (e.g., as shown schematically in FIG. 28) or just "X" can be printed on the element with false-positive indicator. It will be colorless (pale yellow) and will be essentially invisible. The message will start appearing in color, e.g., red when, (1) the shelf-life of the element expires, (2) over heated at a higher temperature, e.g., 60° C. for a prolonged time and/or (3) over exposed to UV/sunlight. All these three effects will make the element develop color which can be misinterpreted as radiation exposure. This false-positive indicator could also be printed on the side of the element rather than on the element.

Possible Variations and options available to the above listed formulations, devices and processes are: the element could be in the form of a wedge shape; by using proper diacetylenes or mixture of diacetylenes specific colors, such as blue, purple, red yellow etc can be obtained, by selecting proper UV absorbers, or a mixture thereof, better protection from UV and sunlight can be obtained; by selecting proper binder/polymer and solvent/plasticizer, it is possible to increase the shelf life and minimize the effect of temperature of radiation; by selecting proper self life extenders such as stabilizers, quenchers (of reactive species), scavengers (e.g., radical and oxygen scavengers), antioxidants, inhibitors (of reactive species), preventor (of reactive species), thermo-oxidative preventors, photo-oxidative preventors, hydroperoxide decomposer, H-donors, metal destabilizers, UV stabilizers, UV absorbers, UV reflectors and alike, the shelf life can be extended to months and years; lower dose can be monitored by increasing the thickness of the element/coating and concentration of diacetylenes; proper crystal form can be obtained by melting and annealing the element; the element can be made by coating a substrate from solution or casting/molding from melt; the dosimeter could utilize one or more elements, either of the same color or different colors; the element could be coated directly on the substrate or can be cut and mounted on the substrate; the dosimeter could have a variety of more than one tampering indicators, such as UV/sunlight, temperature and shelf life indicators; the color reference chart could be "go/no-go" type one color or many bars or gradual color changes as needed; matching of the color reference chart with the element can be obtained by mixing proper dyes or pigments till the spectra overlap; thickness of the first/opaque and top/clear layers can be varied; dosimeter could be flexible or very rigid; the size of the dosimeter could be very small to very large; dosimeter can have an openable opaque layer to protect from sunlight; element can also be made per teaching of our U.S. provisional patent application 60/403,599 (filing date Aug. 14, 2002) can be used to make the dosimeter; the dosimeter could have holder similar to those used for the TLD dosimeter; the dosimeter can be selective to certain radiation and energy can be obtained by using proper metal filter; the dosimeter could be in a closed opaque container; equipment and instrument can designed to read the color/OD of the element and other information, such as barcode and magnetic strip, data stored, transmitted and printed as needed.

The preferred dosimeter should specific criteria. The materials should be nontoxic and reasonably priced. The substrate of the badge should preferably be opaque and not brittle or too flexible. The top layer should be transparent, of 5-200 microns thickness so the element can be read and protected from sunlight. The thickness of dosimeter/badge, preferably, should be between about 25-2,500 microns. The size of the dosimeter could be from a few millimeter long strip to any large size. Preferred size is that of the credit card. The card should be very light so it can be carried in a pocket. The shelf life should be from a week to several years, preferably one to two years. It should be unaffected by ambient conditions, such as light, humidity and temperature. It should develop reasonable color so the dose interest can be estimated from the color reference chart or electronic equipment, such as spectrophotometer or an optical densitometer. It should monitor all kinds of radiation, such as X-ray and neutrons, higher energy electron, protons etc.

The radiation sensitive devices described here offer many major advantages over other similar devices. They will be the simplest devices; just a piece of plastic. They will be inexpensive. Radiation sources can be imaged in three dimensions. They will be tissue equivalent and hence no corrections will be required. They will be a self-developing and instant device. The images can be fixed for archiving the results. They can be used as a personal and area dosimeter. They will be highly sensitive. They will be able to monitor very low dose ~1 mGy. Dose can be determined with an accuracy better than 5% with a spectrophotometer/colorimeter. They can be used over a wide dose range (1 mGy to 100,000 Gy). The color development of the device will be essentially independent of the energy and the dose rate. They will monitor all kinds of high-energy radiations, such as UV, X-ray, gamma ray, protons, electrons, alpha particles and neutrons. They use no toxic chemicals. They will be unaffected by ambient conditions, e.g., temperature and humidity.

EXAMPLES

The following Examples are illustrative of carrying out the claimed invention but should not be construed as being limitations on the scope and spirit of this invention. All experiments on radical or cationic polymerization of monomers and oligomers were carried out under an oxygen-free environment (i.e., under an atmosphere of nitrogen).

Example 1

Synthesis of diacetylene-344, 4,6-decadiyn-1,10-bis (n-butylurethane), R—C≡C—C≡C—R, where R=(CH$_2$)$_3$OCONH(CH$_2$)$_4$H In a 5,000 ml round bottom flask equipped with a stirrer and an addition funnel were added 400 gram (2.4 mole) of 4,6-decadiyn-1,10-diol and 1300 ml of anhydrous THF. The mixture was stirred to dissolve the diol. To the solution were added 1 gram of dibutyltin bis(2-ethyl hexanoate) and 10 ml of triethylamine as the catalysts. To the mixture was added 500 gram (5.05 mole) of n-butyl isocyanate over 45 minutes. Temperature of the reaction was maintained at ~15° C. with ice-cold water. The mixture was stirred for one additional hour and then the temperature was raised to 50° C. The reaction was allowed to proceed for about half an hour and then 40 ml of methanol was added to destroy the excess unreacted isocyanate. The content was then cooled to −20° C. in a freezer over night. The diacetylene-344 was filtered cold and recrystallized first from ethylacetate followed by recrystallization from isopropanol. The yield after recrystallization was 810 gram (93%). The crystals were dried under vacuum, m.p. 112° C.

Using the procedure described here a number of urethane derivatives of 2,4-hexadiyn-1,6-diol, 3,5-octadiyn-1,8-diol, 4,6-decadiyn-1,10-diol, 5,7-dodecadiyn-1,12-diol were synthesized using aliphatic and aromatic isocyanates.

Example 2

Preparation of Emulsion of Diacetylene-344 for the Pilot Plant Coating

Preparation of Solution of Polyvinylacetate (PVA)

In a 10 liter stainless steel beaker was added 2250 g of ethanol and 750 g of DI water and mixed. To the mixture was added 1,000 g of PVA (Aldrich Chemical, Mol. Wt. 500,000) under vigorous stirring for a few hours. The mixture was then stirred periodically. A highly viscous clear solution was obtained.

Preparation of the Emulsion:

In a five liter stainless beaker was added 1350 g of the above stock solution of PVA and 335 g of diacetylene-344 under stirring. The mixture was heated to ~80° C. The solution was slowly poured into about 3 gallons of liquid nitrogen while stirring with a mechanical stirrer. The mechanical stirrer made the solidified emulsion in to a powder.

The solid emulsion was spread in to four aluminum (60× 30×3 cm$^3$) trays and allowed to warm up at room temperature overnight. The trays were covered with a plastic film with holes. The emulsion was then transferred in to a wide mouth plastic jar and diluted with 3:1 ethanol:water to obtained ~900 cP viscosity.

Example 3

Pilot Plant Coating

The dosimeter-film was prepared by using a pilot coating facility (model number NRC3-300) of Yasui Seiki Co, Bloomington, Ind. The coating parameters, such as viscosity of the solutions, size of the coating bar, coating/film speed, coating thickness and drying rate/temperature were varied to obtain transparent uniform coating. The film was then coated on the back side under the identical conditions. The PVA/diacetylene-344 coats were then top coated with polyvinylacetate in ethanol:water (7:3) solutions using #60 cylinder, first on one side and then on the other. These and other parameters were varied until a uniformly coated dry film was obtained. The following were the optimized parameters used for making the transparent film of diacetylene-344 at Yasui Seiki Company.

| Coating Parameters | |
| --- | --- |
| Reference Sample | Dosimeter 344 |
| Web/film | 12" wide, 100 micron thick clear subbed Cronar$^R$ film. |
| Emulsion | 1:1 Mixture of PVA:diacetylene-344 in 3:1 ethanol:water. |
| Viscosity of the emulsion | ~900 cP. |
| Coating technique | Reverse roll gravure. |
| Coating rods | #30 (30 cells/inch) helical gravure. |
| Coating rod speed | 36 rpm. |
| Web speed | 1.3 meter/minute. |
| Drying path | Total 24 feet, 7 feet before oven, 17 feet in oven. |
| Drying temperatures | Three zones, (First: 40° C.; Second: 45° C., and Third: 50° C.). |
| Wet thickness of the coating | 35-40 microns. |
| Dried thickness of the diacetylene-344/PVA coat | 15 microns. |
| Top/barrier coat | PVA in 7:3 ethanol:water. |
| Thickness of top coat: | ~1-2 microns. |

Example 4

Effect of Dose

The dosimeter was irradiated with different dosages of 10 MeV X-ray, 1.25 MeV gamma ray, 9 MeV electrons and 20 MeV neutrons. The dose rate and energy were kept constant. The colorless dosimeter developed a very faint, but noticeable blue color at 25 rads. The blue color intensified with dose. Color development was monitored with a spectrophotometer and an optical densitometer. FIG. 20 shows plot of OD versus dose. The OD values reported here are average of several readings. This plot was used as a calibration curve for determination of unknown dose.

Example 5

Effect of X-Ray Dose

The dosimeter was irradiated with different dosages, 10, 25, 50, 100, 200, 400, 500, 600, 800, 1,000, 2,000, 3,000, 4,000, and 5,000 rads of 10 MeV X-ray. The dose rate of 300 rads per minute was kept constant. A piece of 2.5 centimeter thick Lucite® was used as the build-up. The source to surface distance was 100 cm and the field size was 20×20 cm². The dose of 25 rads was detectable using dosimeter-344.

A typical set of visible spectra of the dosimeter irradiated with different dosages of 10 MeV X-ray is shown in FIG. 21. The dose is indicated on each spectrum. It is possible to monitor as low as 10 rads of X-ray using a spectrophotometer and a sensitive optical densitometer.

The dosimeter was also irradiated with 10, 25, 50, 100, 200, 400, 500, 600, 800, 1,000, 2,000, 3,000, 4,000, and 5,000 rads of 1.25 MeV gamma-ray from cobalt-60. For a given dose, the color of the dosimeter irradiated with gamma ray (1.25 MeV) and 10 MeV X-ray was essentially the same.

Example 6

Effect of Electron Dose

The dosimeters were irradiated with different dosages, 10, 25, 50, 100, 200, 400, 500, 600, 800, 1,000, 2,000, 3,000, 4,000 and 5,000 rads of 9 MeV electrons. The dose rate of 270 rads per minute was kept constant. A piece of 2.0 centimeter thick Lucite® was used as the build-up. The source to surface distance was 100 cm and the field size was 20×20 cm².

The visible spectra of the dosimeter irradiated electrons were also essentially identical to those shown in FIG. 21 for X-ray. It is possible to monitor as low as 10 rads of electrons using a spectrophotometer or an optical densitometer.

Example 7

Effect of Neutron Dose

The dosimeters were also irradiated with different dosages, 25, 50, 100, 200, 500, 1,000, 2000 and 5000 rads of 20 MeV fast neutrons. The dose rate was 40 rads/minute. For a given dose, the color of the dosimeter was slightly lighter than those irradiated with X-ray and electrons. It is possible to monitor as low as 25 rads of fast neutrons visually.

Example 8

Calibration Plot

Plots of OD versus dose for X-ray, gamma ray, electrons and neutrons are shown in FIG. 20. The lower OD for neutrons indicates that diacetylenes are slightly less sensitive to fast neutrons. FIG. 20 was used for determination dose of the dosimeter irradiated with an unknown dose.

Example 9

Test with Blind Samples

In order to test the ability of the dosimeter to determine the dose using the calibration plots of FIG. 20, some samples were irradiated with different dosages. OD was determined and the dose was estimated from the plots of FIG. 20. The results are summarized in Table 3.

TABLE 3

Dose determination of blind samples using plots of FIG. 20.

| Radiation | OD (±0.01) | Actual Dose (Rads) | Estimated Dose (Rads) |
| --- | --- | --- | --- |
| 9 MeV Electrons | 0.11 | 20 | 25 |
| 9 MeV Electrons | 0.22 | 220 | 210 |
| 9 MeV Electrons | 0.43 | 1,220 | 1,200 |
| 10 MeV X-ray | 0.11 | 20 | 25 |

TABLE 3-continued

Dose determination of blind samples using plots of FIG. 20.

| Radiation | OD (±0.01) | Actual Dose (Rads) | Estimated Dose (Rads) |
|---|---|---|---|
| 10 MeV X-ray | 0.22 | 220 | 210 |
| 10 MeV X-ray | 0.43 | 1,220 | 1,200 |

As can be seen from Table 3, dose can be determined with accuracy better than 10%.

Example 10

Effect of Energy

Effect of energy of X-ray was studied by using different X-ray sources. The dosimeter was irradiated with 500 rads of (1) 100 KeV X-ray using Faxitron® 804 of Hewlett-Packard, (2) 1.25 MeV gamma ray from Cobalt-60 using AECL Theratron-780 and (3) 10 MeV X-ray Varian Clinac-18 linear accelerator. OD of the irradiated samples was determined. Table 4 shows OD of dosimeter-344 for different energies of X-ray. The OD for all samples is 0.28±0.02. The data in Table 4 show that the color development is essentially independent of energy of X-ray.

TABLE 4

OD of dosimeter-344 irradiated with 500 rads of X-ray of different energies.

| X-ray Energy (MeV) | Dose Rate (Rads/min) | OD |
|---|---|---|
| 0.1 | 156 | 0.27 |
| 1.25 | 125 | 0.29 |
| 10 | 300 | 0.30 |

Example 11

Electrons

The dosimeter was irradiated with 500 rads of 6, 9, 12 and 15 MeV electrons. The dose rate (280±10 rads/minute) was kept almost constant. The dose rates for 6, 9, 12 and 15 MeV X-ray were 290, 270, 290, and 270 rads per minute respectively. OD of the irradiated samples was determined. Table 5 shows OD for different energies of electrons. The OD was 0.29±0.01. The data in Table 5 shows that the color development is independent of energy of electrons.

TABLE 5

OD of dosimeter-344 irradiated with 500 rads of electrons of different energies.

| Electron Energy (MeV) | Dose Rate (Rads/min) | OD |
|---|---|---|
| 6 | 290 | 0.30 |
| 9 | 270 | 0.30 |
| 12 | 290 | 0.29 |
| 15 | 270 | 0.29 |

Example 12

Neutrons

The dosimeter-344 was irradiated with 500 rads of thermal neutrons at Rutgers University, Piscataway, N.J. The OD of samples irradiated with thermal neutron was slightly lower (~5%) than that irradiated with fast neutrons.

Example 13

Effect of Dose Rate

The dosimeter was irradiated with 500 rads of (1) 10 MeV X-ray at the dose rate of 200, 300 400 and 500 rads per minute and (2) 9 MeV electrons at the dose rate of 160, 270, 350 and 430 rads/min. The optical density of the irradiated samples was determined. The results for electrons and X-ray are given in Tables 6 and 7 respectively. The OD for electron and X-ray irradiated samples was 0.29±0.02. The results indicate that there was no effect of dose rate.

TABLE 6

OD of dosimeter-344 irradiated with 500 rads of 10 MeV X-ray at different dose rates.

| Dose Rate (Rads/Min) | OD |
|---|---|
| 200 | 0.29 |
| 300 | 0.30 |
| 400 | 0.29 |
| 500 | 0.29 |

TABLE 7

OD of dosimeter-344 irradiated with 500 Rads of 9 MeV electrons at different dose rates.

| Dose Rate (Rads/Min) | OD |
|---|---|
| 160 | 0.29 |
| 270 | 0.30 |
| 350 | 0.29 |
| 430 | 0.30 |

Example 14

Lowest Detection Limit and Sensitivity

The dosimeter develops a very faint, but noticeable, blue color at 25 rads. About 10 rads of dose can be monitored with a spectrophotometer or a sensitive densitometer. The visual lowest detection limit is ~20 rads.

Example 15

Uncertainty

Twenty five samples were selected randomly from the 30 meter roll of the film and were irradiated with 500 rads of 10 MeV X-ray at dose rate of 300 rads per minute. After irradiation, OD was determined. Twenty two samples have the OD of 0.29±0.02. The uncertainty due to non-uniformity of the coating is ~7%. Three samples had OD of 0.32, 0.26 and 0.25, which indicates some patches of non-uniform coating.

Example 16

Accuracy in Dose Monitoring

In order to determine accuracy, the dosimeter was irradiated with 400, 450, 500, 550, and 600 rads of 10 MeV X-rays and 9 MeV electrons and 1.25 MeV gamma ray. If placed next to each other, 500 rad sample can be differentiated from 450 and 550. Furthermore, 500 rad sample can be more easily differentiated from 400 and 600 rad samples easily. Thus visual uncertainty is between 10 and 20%.

Example 17

Post Irradiation Effect

Reactive species, such as radicals, formed during radiation, often remain trapped in crystalline materials and show some post irradiation effect. In order to determine post irradiation effect, the dosimeter was irradiated with 500 rads of 100 KeV X-ray. Optical density of the dosimeter was monitored at different times after irradiation. The first reading was taken a minute after irradiation. The results are reported in Table 7. The results indicate that there is very little increase in optical density of the dosimeter upon aging.

TABLE 8

Optical density of dosimeter-344 irradiated with 500 rads of X-ray at different post irradiation time.

| | Time (Hr.) | | | | | | |
|---|---|---|---|---|---|---|---|
| | 0.017 | 0.167 | 0.5 | 1.0 | 5.0 | 24 | 72 |
| OD (±0.01) | 0.28 | 0.28 | 0.28 | 0.28 | 0.29 | 0.28 | 0.28 |

The results of Table 8 indicate that post radiation effect is negligible.

Example 18

Development of Color-Matching Reference Chart and Badge

The color-matching reference chart was prepared by a local printer. Small strips of dosimeter-344 irradiated with different dosages of X-ray were mounted (as shown in FIG. 13) and scanned with a color scanner. The reference chart was printed on a white glossy paper. The color-matching reference chart for dosimeter element-344 (badge) is shown in FIG. 14.

Example 19

Synthesis of Diacetylene-4BCMU

Using the procedure described in example 1, diacetylene-4BCMU was synthesized by reacting 5,7-dodecadiyin-1,12-diol with n-butylisocyanatoacetate using dibutyltin bis(2-ethyl hexanoate) and triethylamine as the catalysts.

Example 20

Emulsion of Diacetylene 4BCMU

Using the procedure described in example 2, emulsion of diacetylene-4BCMU was prepared using polyvinylalcohol as a binder.

Example 21

Element of Diacetylene 4BCMU

Using the procedure of example 3, elements of diacetylene-4BCMU were made.

Example 22

Sensitivity of Element of Diacetylene 4BCMU

The element of diacetylene-4BCMU was more sensitive to radiation but had shorter shelf life (about one year at room temperature) than that of diacetylene-344 (which have an estimated shelf life more than 10 years).

Example 23

Effect of Temperature of Irradiation of Diacetylene-344

The element of diacetylene-344 was irradiated at −20° C. and plus 50° C. with 450 rads of 100 KeV X-ray. The increase in optical density of the sample irradiated at −20° C. was 0.22 while that irradiated at 50° C. was 0.03.

Example 24

Effect of Shelf Life Extenders

In a 10 ml test tube were added 0.5 g of diacetylene-344, 0.2 g of the shelf life extenders listed in Table 2 and many others and 5 g of 20% polyvinylacetate in ethanol:water (4:1 w:w). The mixtures were heated near boiling and then cooled in liquid nitrogen and then allowed to come to room temperature. The dispersions of the diacetylene-344 were coated on polyester film. Pieces of the coated films were annealed at room temperature, 60° C. and 70° C. and exposed to short UV (254 nm), long UV (~350 nm) and sunlight. The following were effective in extending the shelf life: ammonium thiocynate, adipamide, adipic acid, n-acytylglycine, acetone oxime, acetanilide, 3-acetamidophenol, acetamide, 1-amino-1-deoxy-d-sorbitol, 4-tert-amylphenol, benzoic acid, benzophenone, gamma-butyrolactone, benzotriazole, bis(3,4-epoxy cyclohexyl methyl)adipate, bis(2-ethyl hexyl)maleate, bis(2,2,6,6-tetramethyl-4-piperidyl)sebacate, 4-bromobenzaldehyde, 2-(2H-benzotriazol-2-yl)-6-dodecyl-4-methylphenol, benzamide, benzilic acid, benzyl ether, 4-(benzeloxy)phenol, 2-butanone oxime, tert-butyl acetoacetate, 1-butylimidazole, camphor, citric acid, 1,3-cyclohexanedicarboxylic acid, di-tert-butyl-4-methyl phenol, diethyl maleate, 2,3-dihydroxynaphthalene, 2,7-dihydroxynaphthalene, 1,4-diiodobenzene, diphenylamine, 1-dodecyl-2-pyrrolidinone, 4-(dimethylamino)-benzaldehyde, ethyl salicylate, ethylene carbonate, ethyl myristate, 2-hydroxy-4-n-octoxybenzophenone, 4-hydroxybenzophenone, hydroquinone, methyl hydroquinone, imidazole, lecithin, lauryl gallate, methyl-3,5-dinitrosalicylate, 1-methyl-2-pyrrolidinone, methyl-3,4,5-trihydroxybenzoate, octadeccanamide, oxamide, phenyl ether, n-phenyl-2-naphthylamine, 4-phenylphenol, 4-pyridinealdoxime, pyrogallol, resorcinol, resorcinol diacetate, rutin hydrate, salicylaldehyde, salicylaldoxime, salicylanilinde, trans-stilbene, succidimide, tannic acid, 2,2',4,4'-tetrahydroxybenzophenone, thiourea, 1,2,4-triazole, tribenzylamine, 2,4,6-trihydroxybenzaldehyde, triphenyl phosphate, tris(hydroxymethyl)aminomethane and urea.

Several other diacetylenes, such as urethane derivatives of 2,4-hexadiyn-diol, 3,5-octadiyn-dio, 4,6-decadiyn-diol and 5,7-dodecadiyn-diol were also tested with many shelf life extenders listed in this example and many others listed herein in using appropriate binders, such as polyvinylacetate, polystyrene, polyvinylchloride, polyvinyledene chloride, polyethylene oxide, polybutadiene, polymethylmethacrylate, poly-iso-butylmethacrylate, polyvinyl alcohol, cellulose nitrate and cellulose acetate in solvents, such as water:ethanol, ethylacetate, propylacetate, cyclohexane, nitromethane and tetrahydrofuran and commercially available aqueous emulsions and dispersions of polyacrylates, polyvinylacetates, polyurethanes, polyepoxide and polyvinyl chloride were studied. The results indicated that the shelf life of the diacetylenes can be extended with the shelf life extenders listed herein.

Example 25

Extension of Shelf Life of 4BCMU Using Shelf Life Extenders

In a 15 g of 20% polyvinylacetate solution in ethanol:water (3:1 w/w) were added 2.5 g of 4BCMU, 0.3 g of acetone oxime as a shelf life extender, 0.1 g 2,4-dihydroxybenzophenone as UV absorber, 0.1 g of sodium sulfite as a oxygen scavenger, 0.05 g of 2,6-di(t-butyl)-4-methylphenol as antioxidant and 0.05 g of bis(2,2,6,6-tetramethyl-4-piperidyl) sebacate as light stabilizer. The mixture was heated to 80° C. while stirring. The hot solution was poured into liquid nitrogen. A control sample (15 g of 20% polyvinylacetate solution and 2.5 g of 4BCMU) was also prepared under identical conditions. The frozen mass was allowed to warm up to about 20° C. and coated on 100 micron thick polyester film using #60 wire wound rod. The coating was allowed to dry at room temperature followed by drying at 40° C. in an oven.

Small pieces of both the coatings were annealed at 50° C. The optical density of the film was measured for different period of time. The change in OD is shown in Table 9.

TABLE 9

Change in optical density (±0.01) of control and that containing shelf life extenders in coatings of 4BCMU in polyvinylacetate.

| | Time (days) | | | | | |
|---|---|---|---|---|---|---|
| | 0 | 2 | 5 | 12 | 19 | 26 |
| Control | 0.00 | 0.00 | 0.01 | 0.01 | 0.02 | 0.03 |
| Shelf life extenders | 0.00 | 0.00 | 0.00 | 0.01 | 0.01 | 0.01 |

A 50 micron polyethylene terephthalate with a UV absorber obtained from Toray Plastics Inc., North Kingstown, R.I. was coated with 25 micron thick polystyrene containing 20% w/w 2,4-dihydroxy-benzophenone on one side and 40 micron thick an acrylic pressure sensitive adhesive obtained from Avery Dennison containing 10% w/w 2,4-dihydroxy-benzophenone on the other side. This UV absorbing film was applied on to the control and that containing shelf life extenders with the coating facing the pressure sensitive adhesive. Pieces of the laminated films were left under the sunlight and change in optical density was recorded for a different period of time. The change in OD is given in Table 10.

TABLE 10

Change in optical density (±0.01) of control and that containing shelf life extenders in coatings of 4BCMU in polyvinylacetate with and without UV absorbing film.

| | UV film | Time (hrs) | | | |
|---|---|---|---|---|---|
| | | 0 | 1 | 4 | 6 |
| Control | No | 0.00 | 0.15 | 0.21 | 0.29 |
| Shelf life extenders | No | 0.00 | 0.04 | 0.06 | 0.08 |
| Control | Yes | 0.00 | 0.03 | 0.05 | 0.07 |
| Shelf life extenders | Yes | 0.00 | 0.00 | 0.01 | 0.02 |

Example 26

Making of PVC Plastisol

In a one liter glass jar was added 200 g of a sebacate [bis-(2-ethylhexyl)sebacate] and 300 g of PVC plastisol powder (Geon 173 of Polyone Corporation, Kennesaw, Ga.) was added in portion under stirring. This plastisol is referred to as 1:1.5 plastisol. Commercially available heat stabilizers and shelf life extenders were added as needed.

PVC plastisols were made using different grades of PVC and its copolymers, plasticizers, such as adipate, benzoate, phthalate and polyesters, viscosity reducers, heat stabilizers and shelf life extenders. These plastisols having different concentrations of plasticizers, viscosity reducers, heat stabilizers and shelf life extenders were used for making radiation elements of different diacetylenes, such as diacetylene-344 and diacetylene-4BCMU.

Example 27

Making of an Element of Diacetylene 344 in PVC

In test tube were added 1 g diacetylene-344 and 5 g of 1:1.5 plastisol described in example 24 and mixed. The mixture was heated at 110° C. and coated with #70 wire wound rod on a polyester film. The film was then placed in an oven at ~140-150° C. for a few minutes. The coating became clear. A polyester film placed over the coating to sandwich the coating and allowed to cool slowly at room temperature.

Other parameters, such as effect of different plasticizers, polymers, such as PVC and its copolymers and polymethylmethacrylate, plasticizers, such as adipate, benzoate, phthalate and polyesters, viscosity reducers, heat stabilizers, shelf life extenders and processes, such as mixing, coating, thickess of the coating, rate of crystallization of diacetylene were studied. Effect of concentration of different diacetylenes, such as diacetylene-4BCMU and diacetylene-344 was also studied.

Example 28

Melt Mixing and Compression Molding 40 g of plastisol of example 24 and 20 g of diacetylene 344 were mixed in melt mixer (Brabender, Hackensack, N.J.) and mixed at 140° C. for five minutes. The molten mass pressed into thin films and plaque under a compression molder at 160° C. and allowed to cool slowly to room temperature.

Thin films and plaques of diacetylene 344 and other diacetyelenes were made with different ratios of diacetylene

Example 29

Irradiation of PVC/Diacetylene-344 Elements

The coating, film and plaques of diacetylene 344 in PVC plastisol were irradiated with 500 rads of 100 KeV X-ray at minus 20° C. and at plus 60° C. The color of both the samples was essentially identical. Visible spectra were also essentially identical, no noticeable difference in shape and intensity was noticeable. When left under sunlight the elements did not develop any noticeable color for a day. The element of diacetylene-344 also did not develop any noticeable color when left in an over at 60° C. for a week. The results indicate that this element of diacetylene-344 has sufficient stability under sunlight, no effect of temperature of irradiation and acceptable shelf life to be used as personal and area dosimeter.

Example 30

Making of Diacetylene-4BCMU Element

Using the procedure described in example 25 elements of diacetylene 4BCMU were made in PVC plastisol (PVC:adipate 1:3 w:w). The 4BCMU elements were irradiated with 450 rads of 100 KeV X-ray at −20° C. and +50° C. Both the samples had the same color development (OD of 0.19). The samples were also annealed at 35 and 50° C. The optical density was determined at different intervals. There was no increase in OD of the sample made under this example while that made under example 21 had an increase in optical density, e.g., 0.09 to 0.16 at 50° C. within a month. The results indicate that the shelf life can be increased by using proper system, such as PVC as a binder and adipate as a plasticizer.

Example 31

Use of Hot Melt Adhesives as Binder

About 2 g of an adhesive (HRJ-12531 Resin, a polyacrylates pressure sensitive adhesive of Schenectady Chemicals, Canada) was heated in a test tube at about 120° C. to melt. To the melt was added different diacetylenes, such as diacetylene-4BCMU and mixed using a mechanical stirrer. After about 15 minutes the melt was compressed into a plaque and allowed to cool at RT. The sample was irradiated with 500 rad of 100 KVP X-ray. The irradiated portion of the sample turned blue.

Example 32

Casting a Plague and Film Dosimeter from Melt

15×25 cm² glass plates were spray coated with the urethane conformal coating of Miller-Stephenson, Danbury, Conn. A mask of 900 microns was placed on one plate and both the plates were placed in an oven at ~95° C. A mixture of 3 g of diacetylene-4BCMU and 7 g of poly(ethylene-co-acrylic acid-15%) was melted in a test tube. The mixture was poured in the center of the glass plate with the mask and the other glass plate was pressed over it. Excess melt came out through the window of the mask. The assembly of the glass plates was allowed to cool at room temperature (RT). The plates were removed to get the plaque. The thick plaque was translucent. The sample was irradiated with 500 rad of 100 KVP X-ray. The irradiated portion of the sample turned blue. A number of other binders were tried with and without additives, such as plasticizers and solvents.

Example 33

Self-Supporting Thin Films from Melt 0.1, 0.2, 0.3, 0.4 and 0.5 gram of diacetylene-4BCMU was mixed with 5 g poly(ethylene-co-acrylic acid 15%). The mixture was heated at ~150° C. to melt and mixed with a mechanical stirrer. The molten mixtures were poured between two glass plates pre-coated with a mold release, using spacer of 150 microns and pressed to make a circle of about 5 centimeter diameter. The samples were cooled to RT and films, which were almost transparent, were removed from the glass plates. The films of diacetylene-4BCMU/polymer were exposed to 250 rads of 100 KVP X-ray. The films developed blue color. The color intensity was proportional to the concentration of diacetylene-4BCMU.

Effects of other variables, such as nature and concentration of diacetylenes, binders, solvents, plasticizers, and co-binder and effect of time and temperature of melting and annealing were studied.

Example 34

Melt Coating of Diacetylene 4BCMU on a Substrate 0.5 gram of diacetylene-4BCMU was mixed with 5 g poly (ethylene-co-acrylic acid 15%). The mixture was heated at ~150° C. to melt and mixed with a mechanical stirrer. The molten mixtures were poured on a polyester film mounted on a draw down coating unit in an oven at 80° C. The mixture was coated with #30 hot wire wound rod. The sample was cooled to RT. The coating was almost transparent. A piece of the coated film of diacetylene-4BCMU/polymer was exposed to 250 rads of 100 KVP X-ray. The coating developed blue color.

Example 35

Polyvinylacetate as a Binder

In a series of test tubes, 2 g of low molecular weight polyvinyl acetate was taken with varied amounts (0.1, 0.3, 0.6 and 0.9 g) of diacetylene-344. The mixtures were heated to 130° C. and mixed with a mechanical stirrer and poured on a 4 mil PET film on a glass plate at 120° C. Another PET film was placed on the molten mixture followed by a glass plate and 20 lb weight. The molten liquid spread in the form of circles. The glass plate assembly was brought to room temperature and allowed to cool. The films were removed, cut and irradiated with 250 rads of 100 KeV X-ray. The film developed light blue color.

Example 36

UV Curing of the Binder 1 g of diacetylene-344 was dissolved in 4 g of UV curable ink of Environmental Inks and Coating. The mixture was coated on polyester film using #60 wire wound rod. The coating was exposed to a long wavelength UV light for ten seconds to cure the coating. The coating became solid. The sample was annealed at 100° C. and cooled. The annealed sample was irradiated with 500 rads of 100 KeV X-ray. The coating developed blue color.

Example 37

Elimination of Color Reference Chart

A rectangular piece of element of diacetylene-4BCMU of example 21 mounted on a piece of paper was exposed to 254 nm UV light through circular mask for different period in a series of exposures. Circular dots of increasing intensities were obtained (FIG. 22a). The rest of the element was unexposed. The whole element was then exposed to 254 nm UV light for different period of time and the element was photographed (FIG. 22b through 22g). As the exposure of the whole element increased, the pre-exposed dots started disappearing as shown in FIGS. 22b through 22g.

A similar results were obtained when similar element was exposed 50 through 10,000 rads of 100 keV X-ray.

The results indicate that numbers are printed instead of the dots with a UV lamp or a UV laser, with exposure proportional to the dose of X-ray to be monitored, the numbers will disappear. The dose can be read from the lowest readable number. Instead of printing the numbers with UV light, the numbers of varying color intensity proportional to the dose can be printed with the same color ink on a substrate and the diacetylene formulation can be coated on it. This type of dosimeter will be a kind of self reading dosimeter and would not need a color reference chart. This type of dosimeter could be smaller in size. The number can also be printed with diacetylene ink.

Example 38

False Positive Indicators

A 2% solution of pentamethoxytriphenylmethanol (PTM) in polyvinylchloride solution in tetrahydrofuran was coated on polyester using #30 wire wound rod and dried in an oven at 60° C. This formulation is sensitive to both time-temperature (FIG. 27b) and UV (FIG. 27a). This formulation does not develop any noticeable color at least up to 10,000 rads of X-ray. However, when exposed to UV/sunlight it changes from colorless to red color (FIG. 27a). The formulation also develops color with time and temperature of storage (FIG. 27b). At a lower temperature it takes longer time to develop the same color. The time required for the color development due to exposure to UV/sun light and temperature for this formulation was varied by adding heat stabilizers, such as organo metallic compounds, such those of tin, zinc, and barium and bases, such as triethylamine. Hence, this formulation can be used for monitoring shelf-life and UV exposure of the dosimeter.

Example 39

Figure 29:
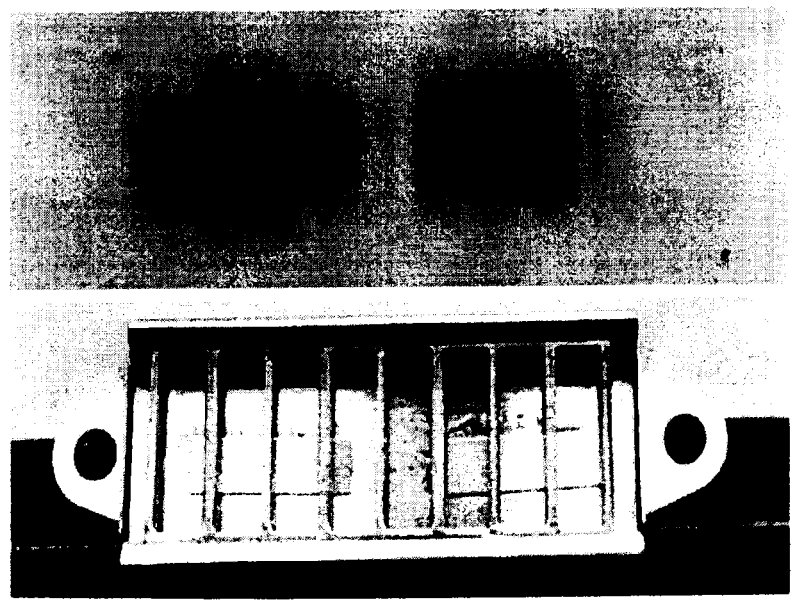
FIG. 29 is a representation of a 4BCMU film without a protective layer (upper) exposed to a commercially available polonium 210 antistatic source (bottom).

A commercially available antistat source (which is polonium 210, 200 microcuries, as shown in bottom portion of FIG. 29) was placed on sensor film of 4BCMU made according to Example 21. The source was removed after 5 minutes. The sensor showed an image of the source in blue color. Partially polymerized 4BCMU is blue. Alpha particles emitted by the source initiated polymerization of 4BMCU and created an image of the source.

The present invention has been described with emphasis on the preferred embodiments without limitation to the breadth of the invention which is more specifically set forth in the claims appended hereto.

The invention claimed is:

1. A radiation monitoring device comprising:
   a substrate; and
   a sensor comprising at least one radiation sensitive material having capability of developing detectable color change when exposed to ionizing radiation having energy higher that 5 eV, wherein a portion of the sensor is covered with an opaque material to detect tampering with UV or sunlight.

2. The radiation monitoring device of claim 1 wherein said opaque protective material has an adhesive layer.

3. The radiation monitoring device of claim 1 wherein the protective layer is a metal layer.

4. The radiation monitoring device of claim 1 wherein the protective layer is a metallized tape.

5. A process for monitoring tampering with a sensor by exposure to UV or sunlight comprising the steps of:
   partially covering the sensor with an opaque material;
   exposing the sensor to UV or sunlight; and
   removing the opaque material and monitoring a difference in optical density between covered and uncovered area of the sensor.

* * * * *